(12) United States Patent
Stroobants

(10) Patent No.: US 8,347,950 B2
(45) Date of Patent: Jan. 8, 2013

(54) MODULAR ROOM HEAT EXCHANGE SYSTEM WITH LIGHT UNIT

(75) Inventor: Marcel Stroobants, Lier (BE)

(73) Assignee: Helmut Werner PROVOST, Kontich (BE)

( * ) Notice: Subject to any disclaimer, the term of this patent is extended or adjusted under 35 U.S.C. 154(b) by 1321 days.

(21) Appl. No.: 11/934,885

(22) Filed: Nov. 5, 2007

(65) Prior Publication Data
US 2009/0114381 A1    May 7, 2009

(51) Int. Cl.
*F28D 1/02* (2006.01)
(52) U.S. Cl. ............. 165/55; 165/53; 165/57; 165/181; 165/182; 237/69; 237/79; 362/147; 362/149; 362/294
(58) Field of Classification Search ............. 165/53, 165/54, 55, 56, 57, 181, 182; 237/69, 79; 219/213; 362/149, 147, 294
See application file for complete search history.

(56) References Cited

U.S. PATENT DOCUMENTS

| | | | | |
|---|---|---|---|---|
| 2,069,816 A * | 2/1937 | Child | | 165/55 |
| 2,477,824 A * | 8/1949 | Reiss | | 165/55 |
| 2,487,287 A * | 11/1949 | Weber et al. | | 165/55 |
| 2,723,616 A * | 11/1955 | Hubbard | | 165/57 |
| 2,782,007 A * | 2/1957 | Glatt | | 165/53 |
| 2,858,077 A * | 10/1958 | Smith | | 165/55 |
| 2,909,981 A * | 10/1959 | Stock | | 165/55 |
| 2,927,780 A * | 3/1960 | Seeley | | 165/55 |
| 3,026,393 A * | 3/1962 | Quirk | | 165/55 |
| 3,097,287 A * | 7/1963 | Knoll et al. | | 219/213 |
| 3,141,499 A * | 7/1964 | Bunten | | 165/55 |
| 3,310,652 A * | 3/1967 | Williams, Jr. | | 165/55 |
| 3,409,766 A * | 11/1968 | Meckler | | 165/53 |
| 3,448,795 A * | 6/1969 | McNabney | | 237/79 |
| 4,086,468 A * | 4/1978 | Keldmann | | 165/55 |
| 4,216,823 A * | 8/1980 | Keldmann | | 165/55 |
| 4,383,575 A * | 5/1983 | Bobrowski | | 165/55 |
| 4,646,211 A * | 2/1987 | Gallant et al. | | 362/149 |
| 4,993,630 A * | 2/1991 | Reichel et al. | | 237/69 |
| 5,597,033 A * | 1/1997 | Cali | | 165/53 |
| 5,884,694 A * | 3/1999 | Tanenbaum | | 165/53 |
| 5,934,362 A * | 8/1999 | Barker, II | | 362/149 |
| 5,992,509 A * | 11/1999 | Fennesz | | 165/55 |
| 7,255,152 B2 * | 8/2007 | Friedlich | | 237/79 |

FOREIGN PATENT DOCUMENTS

EP      115674 A  *  8/1984
EP    1069390 A1 *  1/2001

* cited by examiner

*Primary Examiner* — John Ford
(74) *Attorney, Agent, or Firm* — Jerold I. Schneider

(57) ABSTRACT

A modular heat exchange system for use in a central heat exchange installation in buildings, including at least one heat exchange element equipped for exchanging heat between environmental air and a fluid which is conducted through the heat exchange element. The heat exchange element has a predetermined first shape with opposite lateral sides. At least one non-heat-exchange add-on element, equipped for adding a given additional functionality to the system, has a predetermined second shape with a complementary lateral side to one of the opposite lateral sides of the heat exchange element.

13 Claims, 56 Drawing Sheets

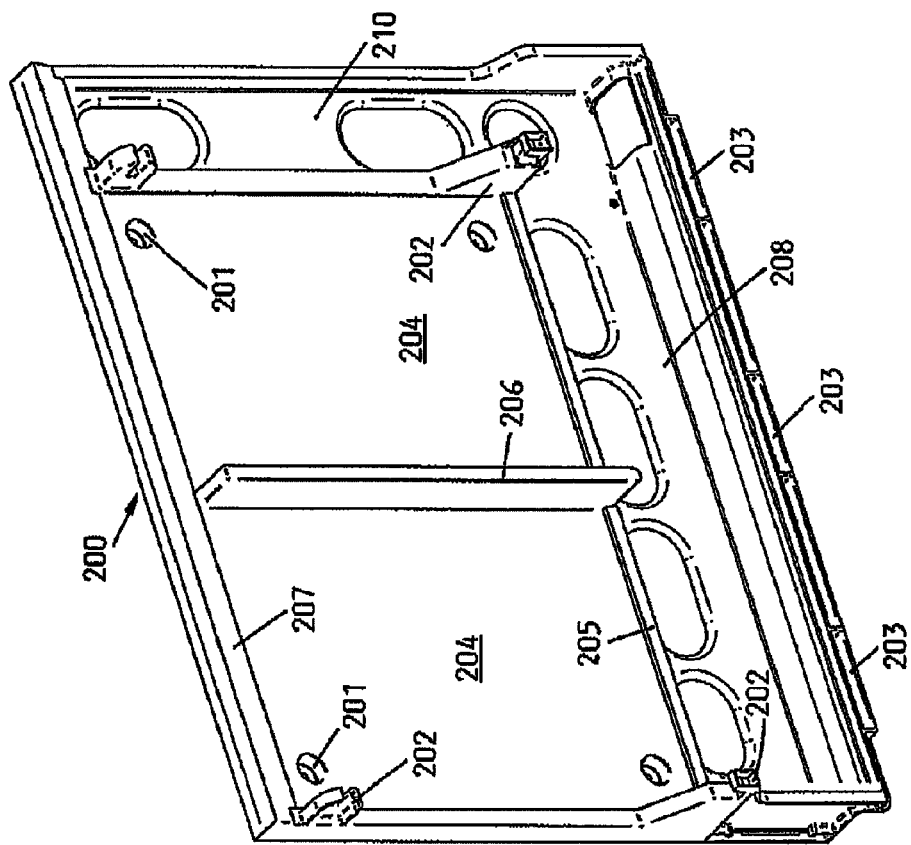
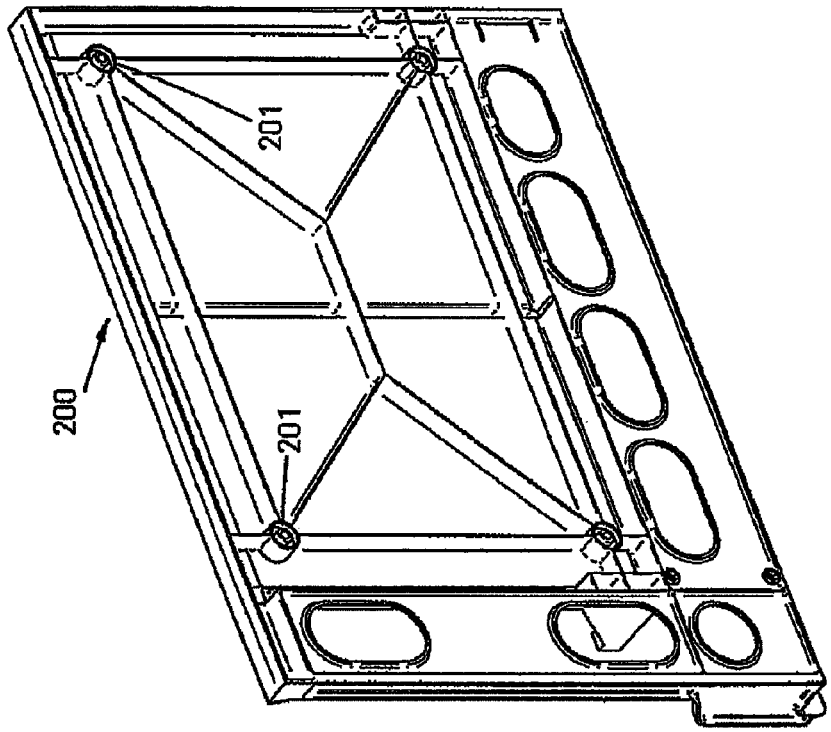
Fig. 10

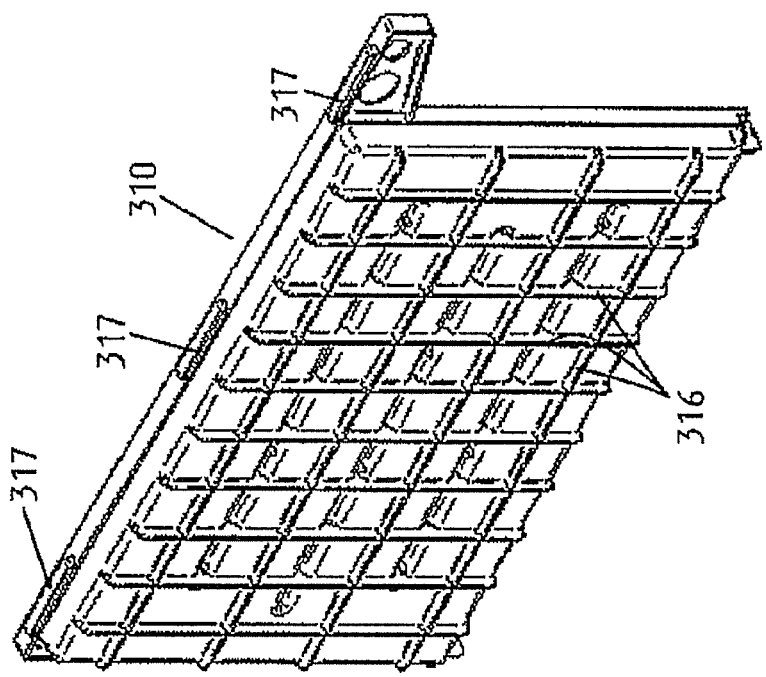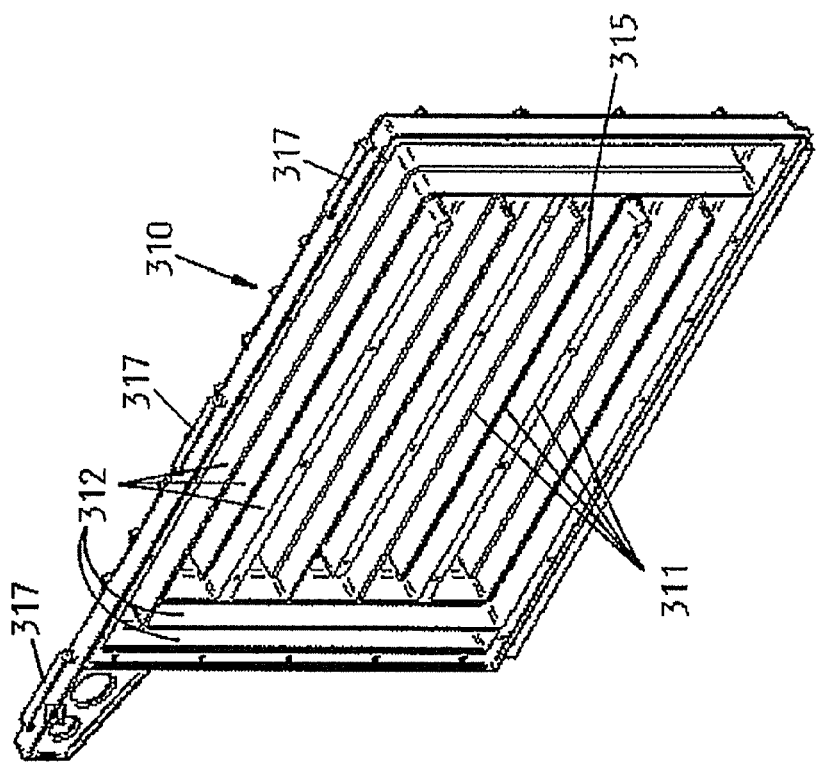
Fig. 13

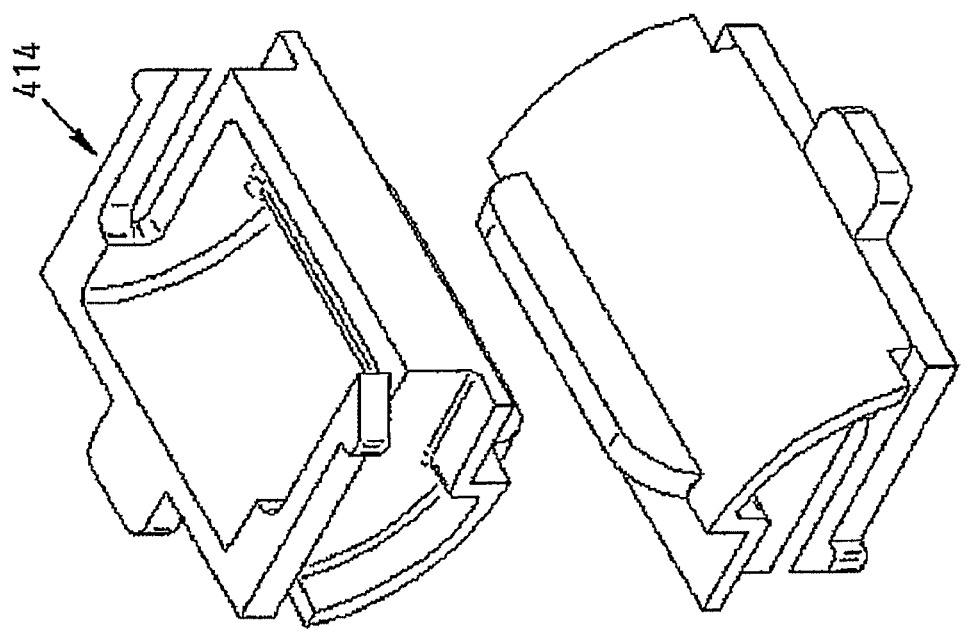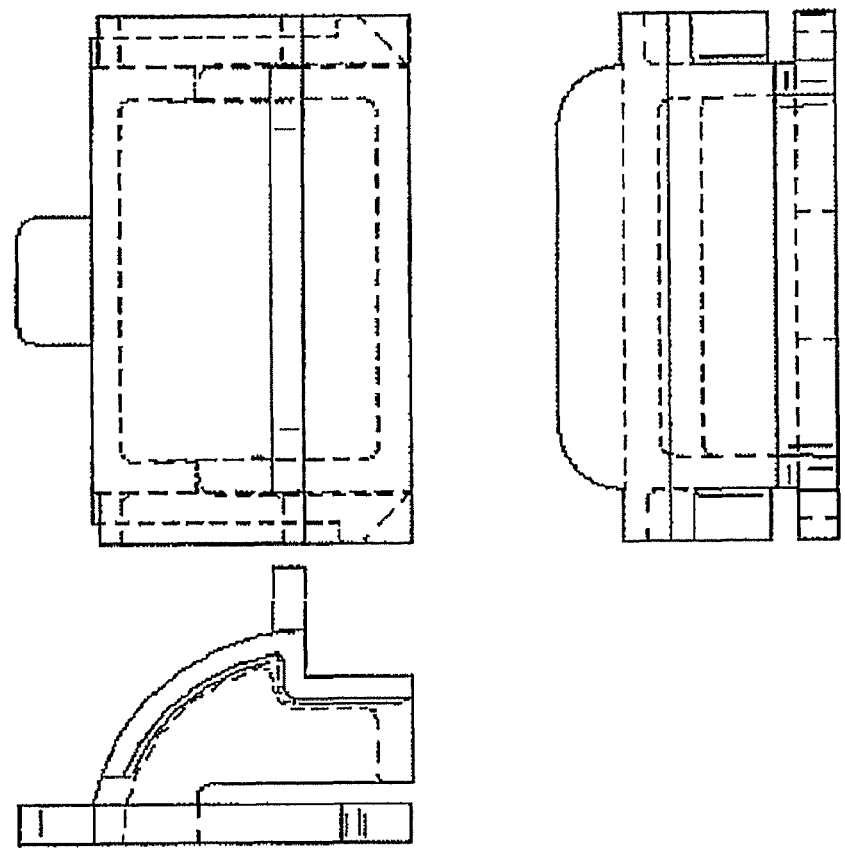
Fig. 29

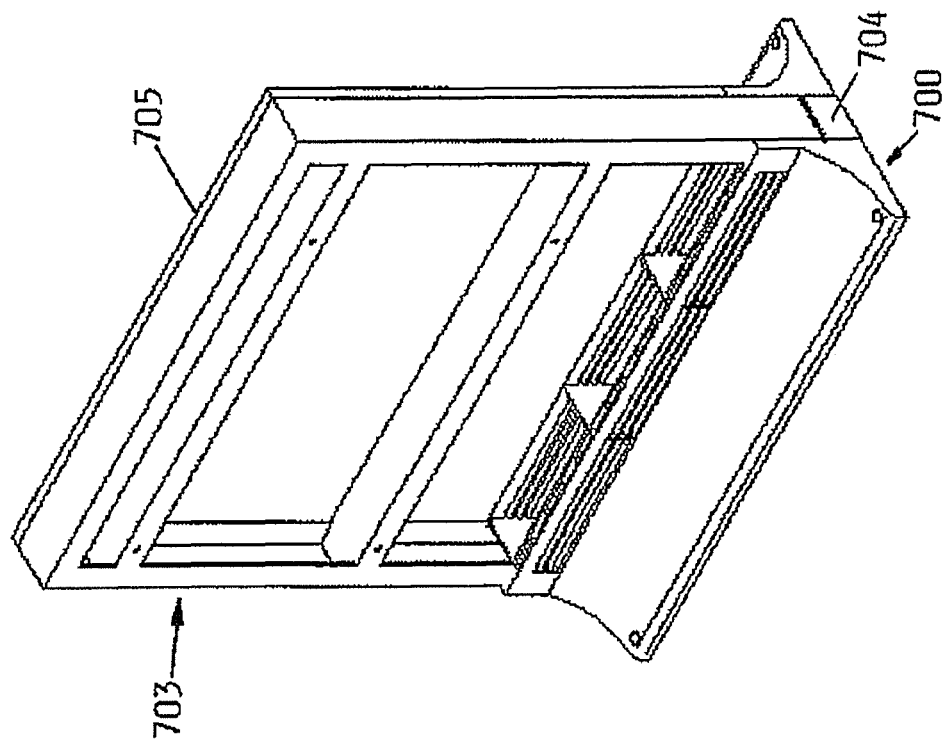
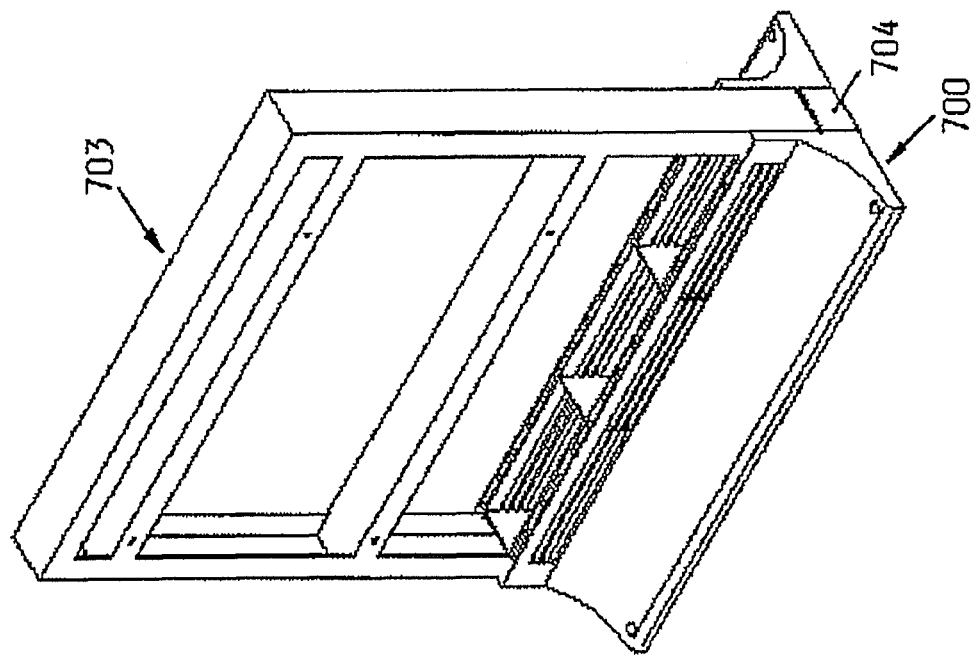
Fig. 32

MODULAR ROOM HEAT EXCHANGE SYSTEM WITH LIGHT UNIT

TECHNICAL FIELD

The present invention relates to modular heat exchange systems for use in central heat exchange installations in buildings.

BACKGROUND ART

From EP 1 684 045 A2 a building heating system is known which is 10 composed of a plurality of plastic modular heat exchange elements. Each of the modular elements is composed of two horizontal sleeves and vertical ducts or branches, the ends of which are connected to the sleeves so as to enable the passage of heat exchange fluid, which enters from one of these sleeves, flows through the ducts or branches and exits from the other sleeve. Several modular elements are joined together to form a radiator by axially coupling the horizontal sleeves.

From EP 0 524 085 A1 a radiator is known which is made up of identical or similar heating elements, through which a heating fluid circulates, and making it possible to adapt its outer dimensions by juxtaposition of the heating elements. In accordance with the invention, each heating element forms a module comprising a square or rectangular body having a hydraulic circuit on the inside and hydraulic connection means for fluidly joining two juxtaposed modules together. The dimensions of each module are furthermore chosen such that the adjacent hydraulic connection means of two juxtaposed modules are spaced apart by a fixed distance which also corresponds to the distance separating two adjacent hydraulic connection means of the same module. This radiator system is applied in particular to the production of modular cast iron radiators, capable of being installed in situ with a desired geometry.

GB 2 243 678 A discloses a hot water radiator comprising a casing in which one or more modular units may be placed in order to adapt its length. Each unit uses a plastic flexible tubing arranged as a spiral or a coil as a source of radiant or convected heat.

EP 1 167 890 A2 discloses a system for the thermo regulation of a room, including radiant panels. The radiant panels are built up from thin rectangular cross-section channel elements which are assembled side-by-side by inserting them by extremities thereof into slits made in two manifolds for feeding them with thermovector liquid. The manifolds have ports that open into said slits. In one embodiment, the system has an angled configuration.

EP 1 069 390 A1 relates to a radiator having a feed and a return for a heating fluid and a plurality of hollow heating bodies, joined together by axially coupling their horizontal sleeves. One or more of the heating bodies shows an aperture for the insertion of electric lights.

From EP 0 115 674 A2 a room heating and/or cooling device is known comprising a housing, means for mounting the housing on a ceiling, a heat exchanger in the housing with an inlet and outlet connection for circulating heating water or cooling water, a room lighting fitting mounted directly below the housing and completely covering the bottom of the housing, an air inlet and an air outlet positioned in the margin of the light fitting, and a fan adapted to draw air into the inlet, over the heat exchanger and out through the outlet.

Many other heating systems are known which are composed of modular heating units which are coupled adjacent to each other.

These known heating/cooling systems have the disadvantage that their functionality is limited.

DISCLOSURE OF THE INVENTION

It is an aim of the present invention to provide a modular heat exchange system with improved flexibility for giving the system additional functionality.

It is furthermore an aim of the present invention to provide a modular heat exchange system of higher efficiency and functionality with respect to those of the prior art.

It is a particular aim of the present invention to provide a modular heat exchange system with which a desired temperature can be achieved quickly.

It is furthermore an aim of the present invention to provide a central heat exchange installation with improved control over the temperature in the various rooms of a building.

These and other aims are achieved according to the invention with the system and installation showing the technical characteristics of the independent claims.

As used herein, "heat exchange" is intended to mean "provided for heating and/or cooling".

As used herein, with "non-heat-exchange element" is meant an element which performs any other function than exchanging heat between air and a heating/cooling fluid.

In a first aspect, the invention relates to a modular heat exchange system for use in central heat exchange installations (central heating/cooling) in buildings, comprising at least one heat exchange element and at least one add-on non-heat-exchange element. The heat exchange element is equipped for exchanging heat between environmental air and a heating/cooling fluid (liquid or gas) which is conducted through the heat exchange element. The heat exchange element has a predetermined first shape with opposite lateral sides. The non-heat-exchange add-on element is provided for adding a given functionality to the system. This element has a predetermined second shape with a complementary lateral side to one of the opposite lateral sides of the heat exchange element. In this way, when the heat exchange element and the add-on element are fixed adjacent each other with said complementary sides facing each other, the first shape of the heat exchange element continues into the second shape of the add-on element.

The modular heat exchange system is intended for being mounted in upright position, for example against a wall or on a floor stand or the like. The heating/cooling fluid which is circulated through the heat exchange element is preferably water, but this does not exclude the possibility of using any other heating/cooling liquid or gas.

By providing one or more add-on elements in the system of the first aspect of the invention, the functionality of the system can be expanded beyond merely heating and/or cooling the air in the room. Possible add-on elements are a light unit, an air humidifying unit, a control unit for separately controlling the operation of the adjacent heat exchange element(s), or other add-on elements. By providing these additional functions in add-on elements instead of directly on the heat exchange element as in the prior art, the functionality of the system can be adapted to the desired functionality in each room, while the same elements can be used throughout the whole building. As a result, the flexibility of the system of the first aspect of the invention is highly enhanced with respect to the prior art.

By shaping the heat exchange elements and the add-on elements such that the shape of the one continuous into that of the other, an aesthetically pleasing whole can be achieved. This can further expand the functionality of the system of the first aspect of the invention with a decorative function.

By constructing the add-on elements as parts which are added at the lateral sides of the heat exchange elements, the whole width of the heat exchange elements remains available for conducting an air flow from their bottom side towards their top side. As a result, the efficiency of the heat exchange elements is not affected by the addition of the add-on elements.

As a result, according to the first aspect of the invention a highly flexible and efficient modular heat exchange system is presented, whose functionality can be easily adapted to the requirements in each room.

Preferably the lateral sides of the heat exchange element and the add-on element facing each other are provided with complementary registering means, e.g. complementary shaped parts such as ridges, protrusions, recesses or the like, for facilitating the aligning of the elements register with each other upon mounting. These registering means may possibly be combined with coupling means for effectively also coupling the elements to each other.

In a preferred embodiment, the heat exchange element comprises a technical part for conducting the heating/cooling fluid. This technical part comprises a front member in a non-heat conductive material, preferably a plastic or composite material, and a back member in a heat conductive material, preferably a metal or a metal alloy, for example aluminium. A sealing is provided in between the front and back members for making the technical part substantially fluid-tight. This structure has the advantage that the front of the heat exchange element is heated to a lesser extent than the back, which can reduce the risk of skin burns when users touch the heat exchange element.

The front member preferably comprises fluid conducting ribs forming conduits in between them for conducting the heat exchange fluid along a single flow path from an inlet of the technical part to an outlet of the technical part. The conduits are open towards the back member for enabling contact between the fluid and the back member. The flow path is preferably constructed such that the conduits which are nearest to the outlet in the flow direction are located at the periphery of the technical part. This means that the relatively colder part of the flow path is located at the periphery of the technical part, where the risk of contact (in case the cap part is opened) is the largest.

The fluid conducting ribs preferably have a concave top face, in which also a sealing can be applied for preventing fluid communication between the conduits other than the single path from inlet to outlet. In this way, efficiency of the heat exchange element can be enhanced since cold zones can be prevented.

The back member preferably comprises a flat base having one side for contacting said fluid and an opposite side provided with a plurality of upstanding fins spaced at regular distances from each other for exchanging heat with said air. The upstanding fins preferably have substantially parallel corrugated shapes. In this way, their surface area and hence their heat transfer capacity is increased with respect to straight fins. The parallel corrugations ensures that the distance between adjacent fins is substantially constant, so that vortexes in the air stream can be avoided and a fluent air stream between the fins can be maintained. This can further enhance the efficiency of the system.

In a preferred embodiment, the modular heat exchange system of the first aspect of the invention further comprises a wall mount which is adapted for being fixed to a wall and for holding said technical part. The wall mount is constructed in a non-heat conductive material, for example a plastic or a composite material, and comprises a layer of soft material for engaging the upstanding fins of the technical part. By constructing the wall-mount in the non-heat conductive material, heat losses via the wall on which the heat exchange element is mounted can be reduced, so that the efficiency of the system can be enhanced. The layer of soft material functions to hold the fins of the technical part in place, avoiding deformations and damping vibrations so that undesired noises can be reduced.

The modular heat exchange system of the first aspect of the invention preferably further comprises a cover adapted to be mounted over said at least one heat exchange element. This cover can shield the technical part against undesired intrusions to further improve the security of persons in the vicinity of the system. This cover can furthermore be provided with any thinkable decorations to provide the heat exchange element with a decorative function.

The cover preferably comprises a cap part with openings for conducting the air. The cap part is located at the top of the heat exchange element and can be opened or removed from the cover for access to the technical part if desired. In order to prevent undesired access, the cap part can be locked in the closed position by means of locking members, preferably at opposite ends of the cap part, so that they are spaced too far apart for being operated simultaneously by children.

In a preferred embodiment, the modular heat exchange system of the first aspect of the invention further comprises a ventilator at a bottom side for drawing air into said heat exchange element. This can further enhance the efficiency of the system and speed up the heating/cooling process.

In a second aspect, which may or may not be combined with the first aspect, the invention relates to a central heat exchange installation in a building, comprising:
- a central heating unit for heating a fluid,
- a central cooling unit for cooling said fluid,
- a selection mechanism for selecting between the central heating unit and the central cooling unit,
- a plurality of heat exchange systems in a plurality of rooms of said building,
- ducts extending between said central units and said plurality of 30 heat exchange systems for conducting said fluid from said central units towards each of said heat exchange systems.

By providing the central heat exchange installation with central heating and cooling units, the whole installation can be used both for heating in the winter and cooling or air conditioning in the summer. In this way, the need for a separate air conditioning system throughout the building can be avoided. In this way, improved control over the temperature in the various rooms of the building throughout the year can be achieved.

In a preferred embodiment of the second aspect of the invention, the central heat exchange installation comprises as selection mechanism an outdoor temperature sensor connected to a central control unit which puts either the central heating unit or the central cooling unit in operation based on the temperature sensed by said sensor. In this way, the operation of the central heat exchange installation can be controlled efficiently and automatically switched to cooling/heating based on the outdoor temperature. Preferably, a margin is set between the switching points from heating to cooling and vice versa, meaning that for example when switching to cooling the outdoor temperature has to drop a few degrees before the installation is switched to heating again, to avoid too frequent switching of the installation.

In a preferred embodiment of the second aspect of the invention, the central heating unit and the central cooling unit are placed in series. This means that the heat exchange fluid always circulates through both units, but this is no problem since only one of both units will normally be in operation. Alternatively however, the units may also be placed in parallel with valves, preferably operated by the central control unit, to distinguish between circulation through the central heating unit and circulation through the central cooling unit.

BRIEF DESCRIPTION OF THE DRAWINGS

The invention will be further elucidated by means of the following description and the appended figures.

FIG. 10 shows the wall mount of the eighth embodiment in perspective frontal and rear views.

FIG. 13 shows the front member of the technical part in a perspective view.

FIG. 29 shows a locking system for the cap part of FIG. 27.

FIGS. 31-34 show an alternative embodiment of a heat exchange system according to the invention, in which the heat exchange element of FIG. 1 is fixed onto a separate foot.

MODES FOR CARRYING OUT THE INVENTION

Figure 1:
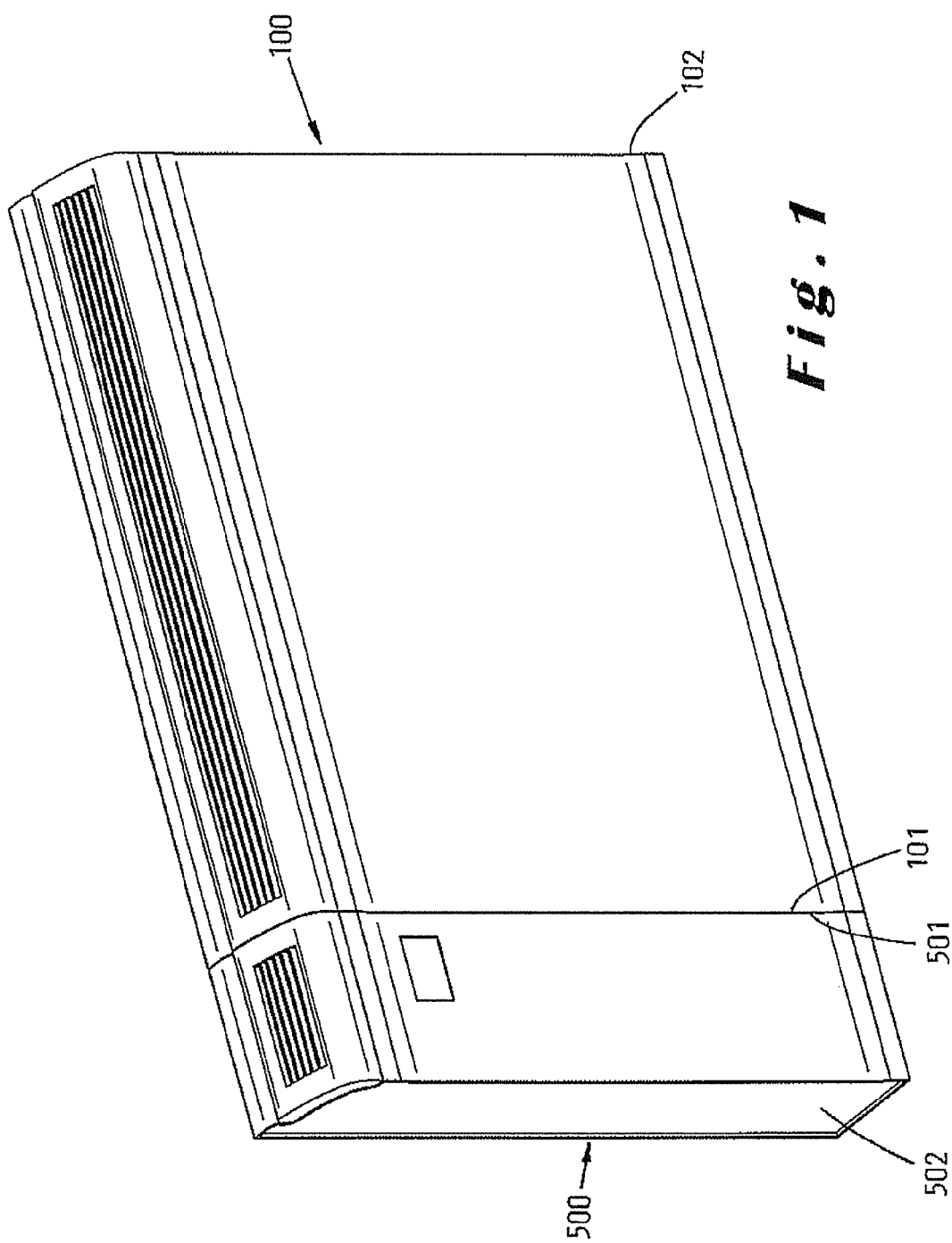
FIG. 1 shows a first embodiment of a modular heat exchange system according to the invention, comprising a heat exchange element and a control unit as non-heat-exchange add-on element.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

FIG. 1 shows a first embodiment of a modular heat exchange system according to the invention. The system comprises one basic heat exchange element 100 and one non-heat-exchange add-on element 500, more particularly a control unit for controlling the heat exchange element. The heat exchange element 100 has a predetermined rectangular shape with opposite lateral sides 101, 102. The control unit 500 has a predetermined rectangular shape which nicely fits with that of the heat exchange element 100. To this end the control unit has lateral sides 501, 502 which are complementary to the opposite lateral sides 101, 102 of the heat exchange element 100. As a result, when the heat exchange element and the add-on element are fixed adjacent to each other with the complementary sides facing each other as shown in FIG. 1, the rectangular shape of the heat exchange element 100 continues into the rectangular shape of the control unit 500, so that the whole looks like a single unit. In the figure the control unit 500 is mounted to the left of the heat exchange element with the side 501 against the side 101. Because of the rectangular shape the control unit 500 can however also be mounted on the right, with the side 502 against the side 102.

Figure 2:
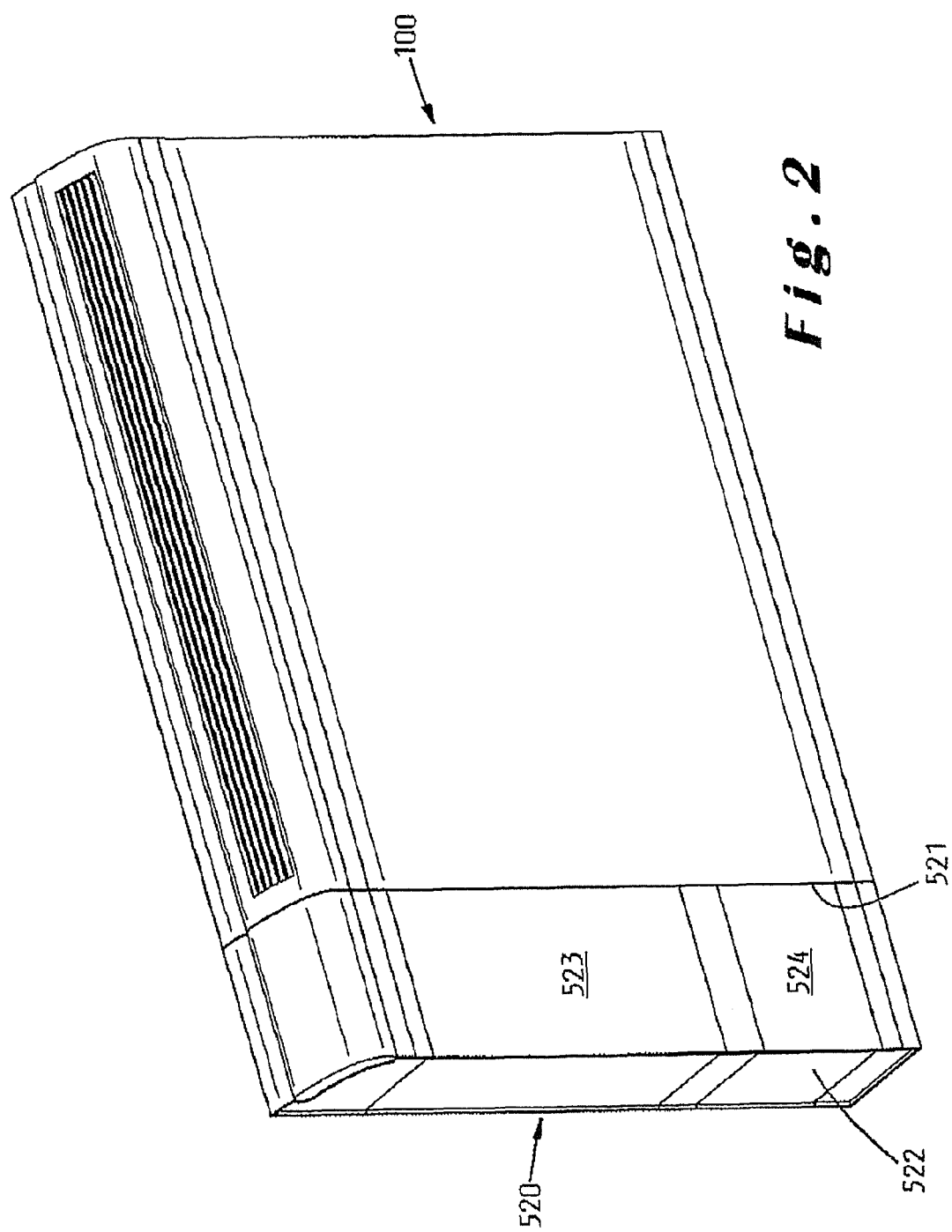
FIG. 2 shows a second embodiment of a modular heat exchange system according to the invention, comprising the same heat exchange element as in FIG. 1 and a light unit as non-heat-exchange add-on element 520.

FIG. 2 shows a second embodiment of a modular heat exchange system according to the invention. The system comprises one heat exchange element 100, the same one as in FIG. 1, and one non-heat-exchange add-on element 520, more particularly a light unit. The light unit 520 has two lateral sides 521, 522 which are complementary to those of the heat exchange element 100.

Figure 3:
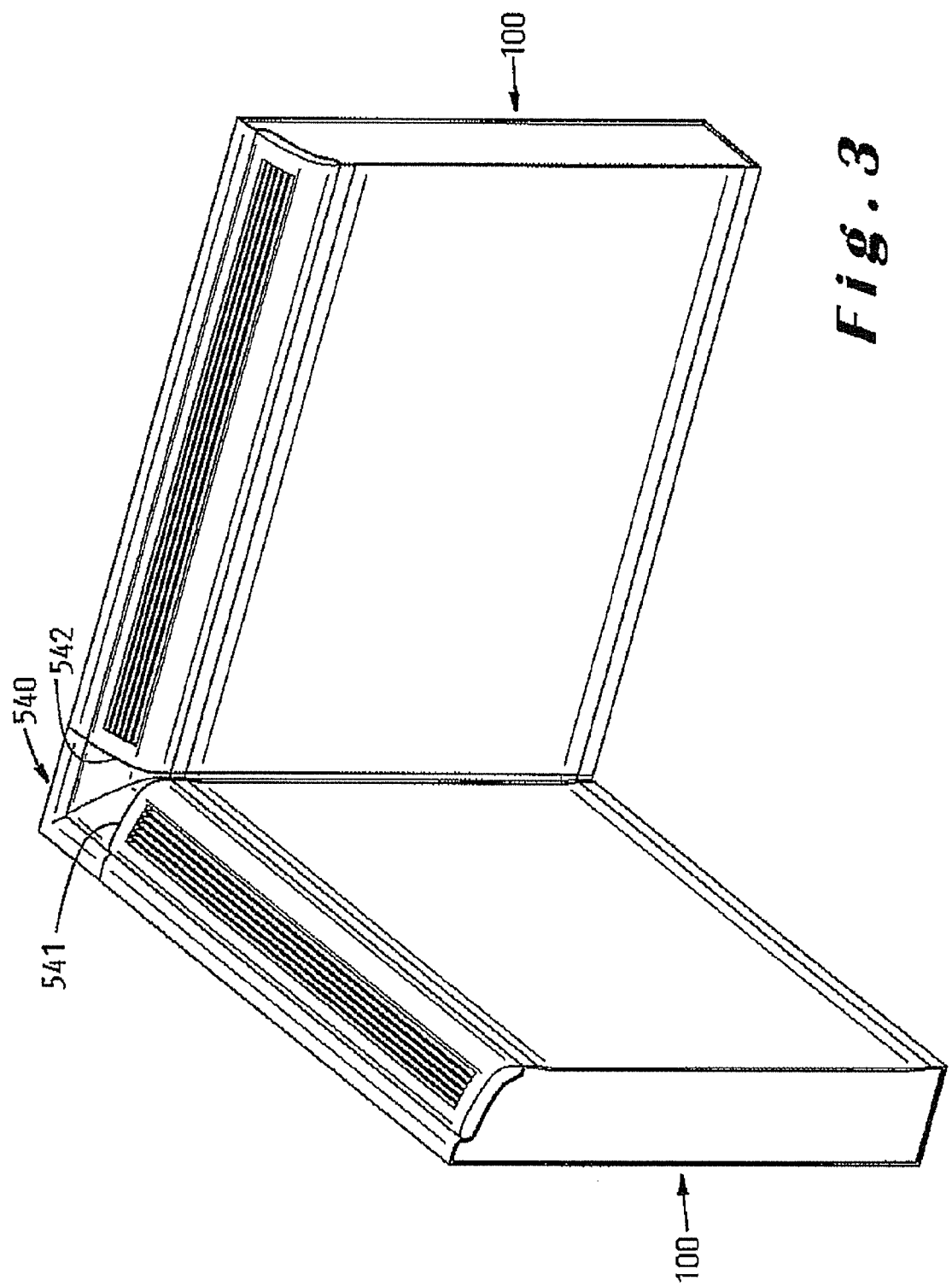
FIG. 3 shows a third embodiment of a modular heat exchange system according to the invention, comprising twice the heat exchange element of FIG. 1 and a corner element as non-heat-exchange add-on element.

FIG. 3 shows a third embodiment of a modular heat exchange system according to the invention. The system comprises two heat exchange elements 100, the same ones as in FIG. 1, and a corner element 540 as non-heat-exchange add-on element. This corner element 540 has sides 541, 542, complementary to the sides 101, 102 of the heat exchange elements 100, which makes it possible to mount the two heat exchange elements 100 in an angular configuration in the corner of a room. The top side of the corner element 540 is removable for enabling cleaning of the space in the corner.

Figure 4:
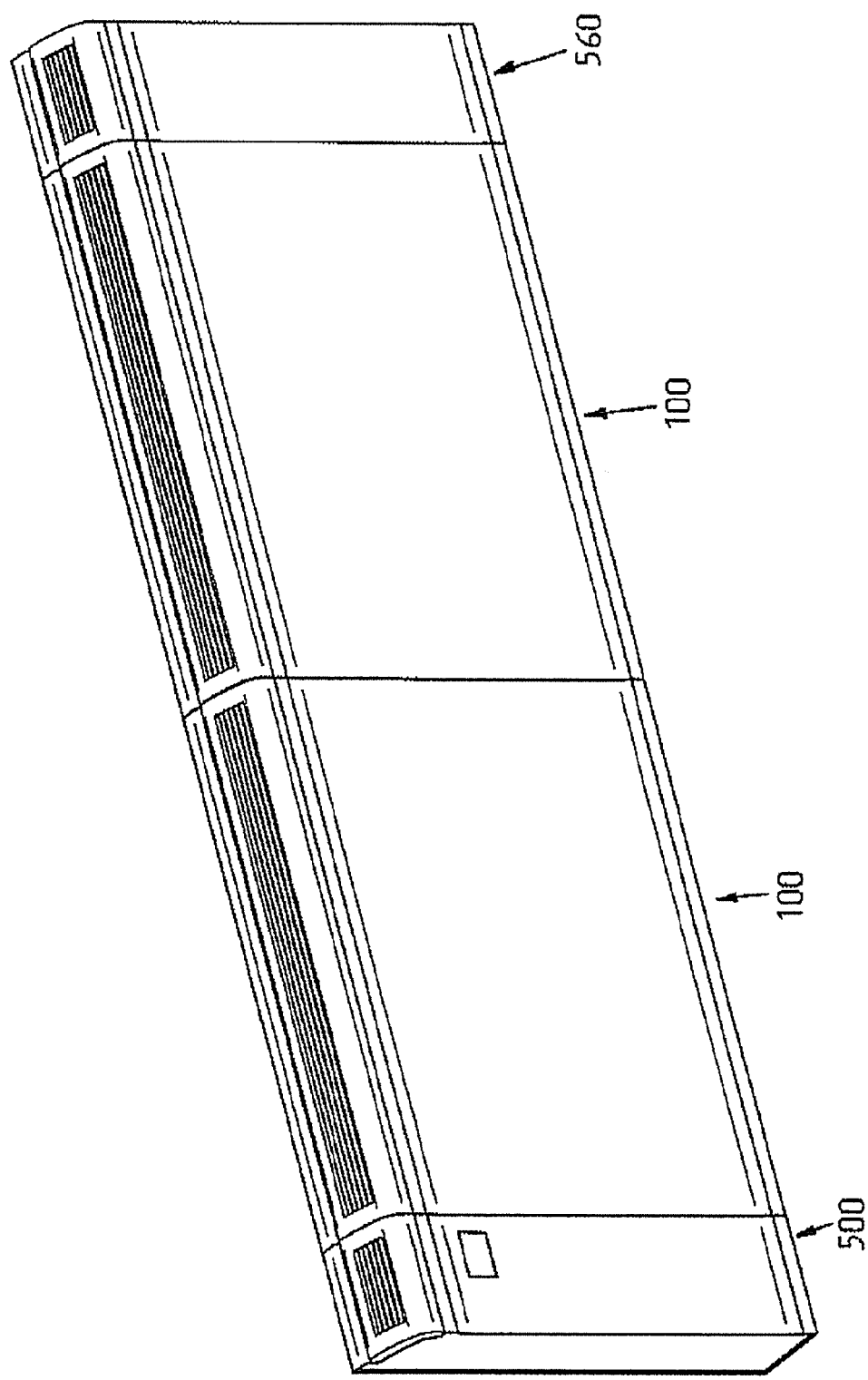
FIG. 4 shows a fourth embodiment of a modular heat exchange system according to the invention, comprising twice the heat exchange element of FIG. 1 and a control unit and an air humidifying unit as non-heat-exchange add-on elements.

FIG. 4 shows a fourth embodiment of a modular heat exchange system according to the invention. The system comprises two heat exchange elements 100, the same ones as in FIG. 1, and two non-heat-exchange add-on elements, more particularly a control unit 500 which is also the one of FIG. 1 and an air humidifying unit 520.

Figure 5:
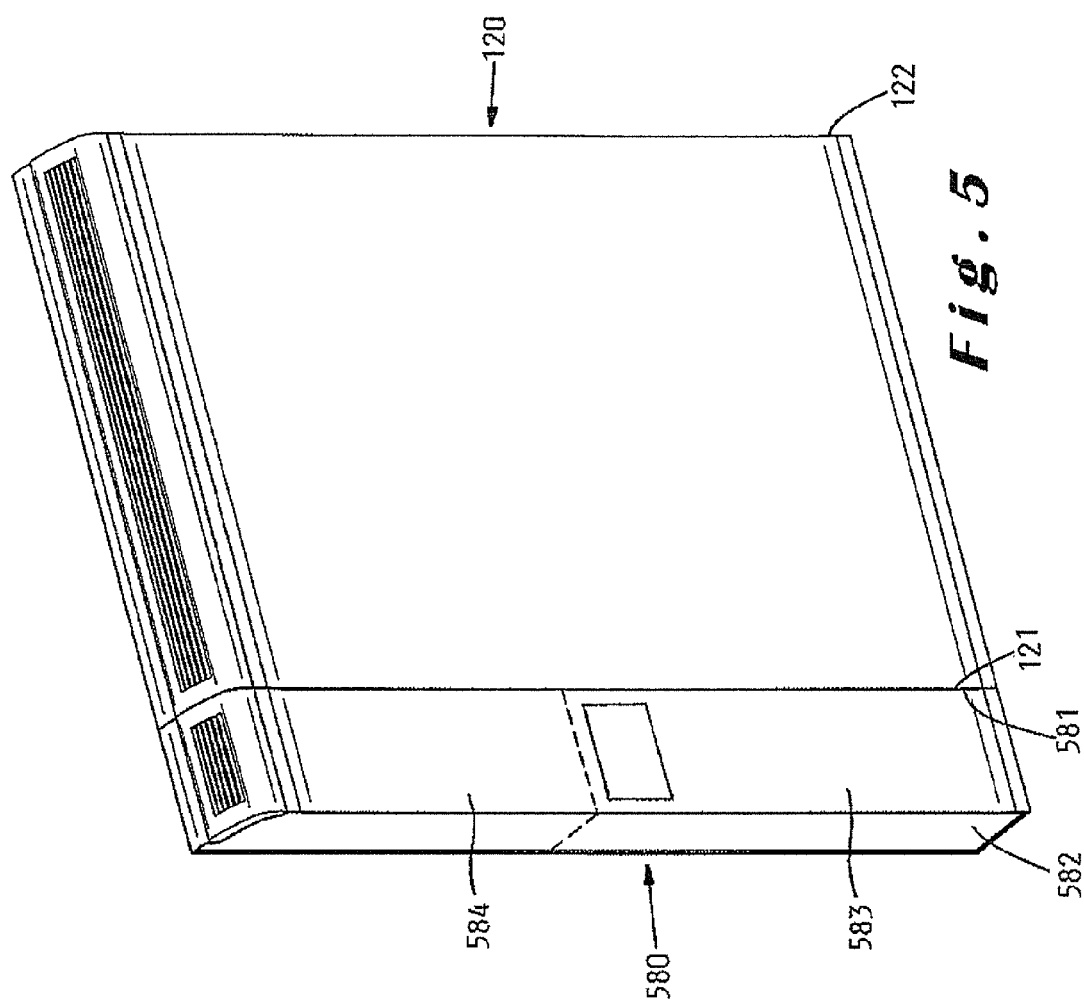
FIG. 5 shows a fifth embodiment of a modular heat exchange system according to the invention, comprising one heat exchange element of increased height and one non-heat-exchange add-on element having a control unit and an air humidifying unit above each other.

FIG. 5 shows a fifth embodiment of a modular heat exchange system according to the invention. The system comprises one heat exchange element 120 and one non-heat-exchange add-on element 580, in which below a control unit 583 and above an air humidifying unit 584 are provided. The height of the heat exchange element 120 is such, that inside two technical parts 300 (see below) can be mounted above each other, or one technical part of increased height (not shown). Again, the sides 121-581 and 122-582 are complementary to each other.

Figure 6:
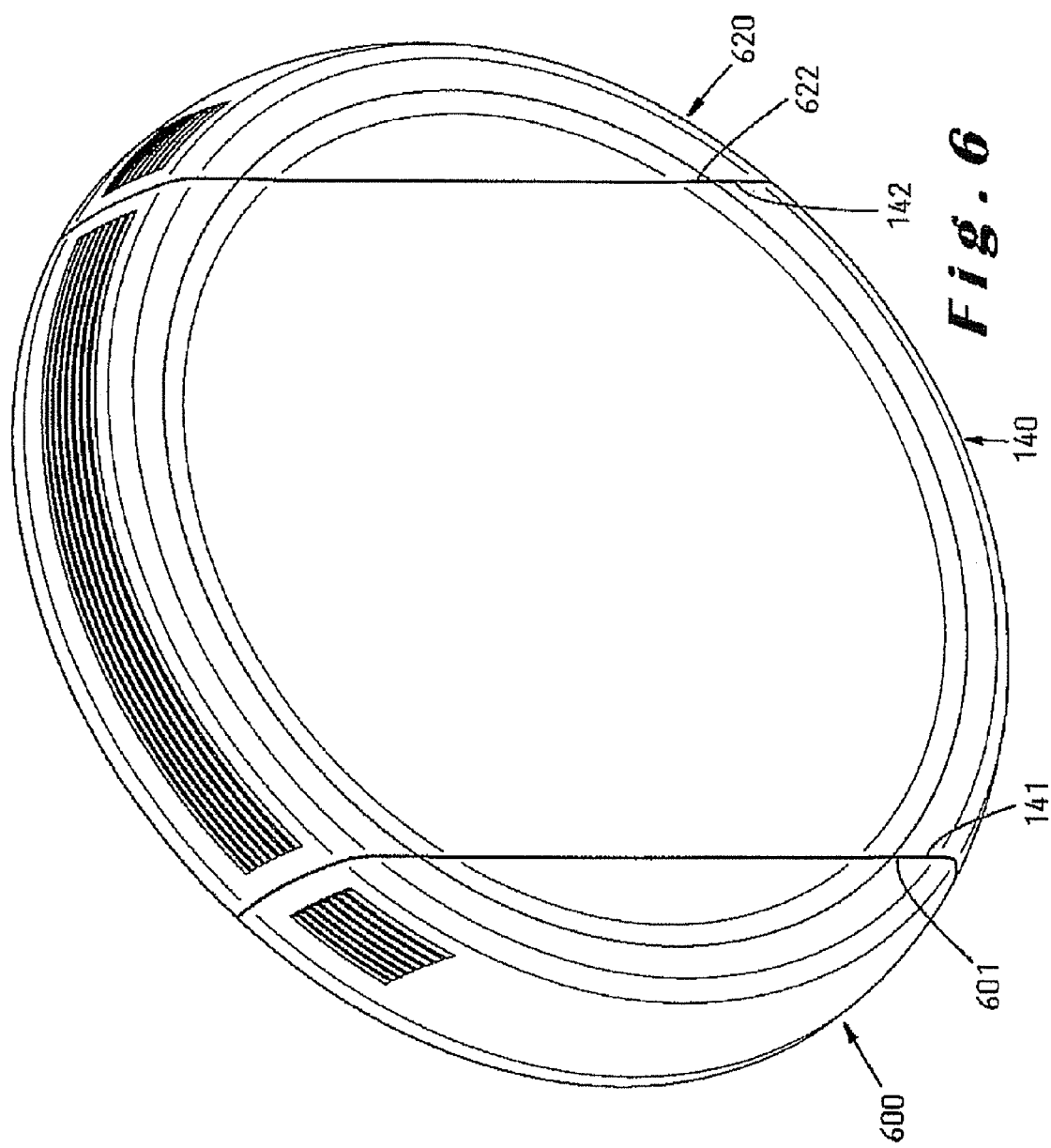
FIG. 6 shows a sixth embodiment of a modular heat exchange system according to the invention, comprising one heat exchange element and two non-heat-exchange elements, shaped such that the whole is circular.

FIG. 6 shows a sixth embodiment of a modular heat exchange system according to the invention. The system comprises one heat exchange element 140 and two non-heat-exchange elements 600, 620 on the left and the right. Here, the heat exchange element 140 and the add-on elements 600, 620 are shaped such, that the whole is circular. The heat exchange element has opposite lateral sides 141, 142, respectively complementary to the side 601 of the left add-on element 600 and the side 622 of the right add-on element 620. The left and right add-on elements 600 and 620 can each be one of the following: a control unit, a light unit, an air humidifying unit or any other non-heat-exchange element.

Figure 7:
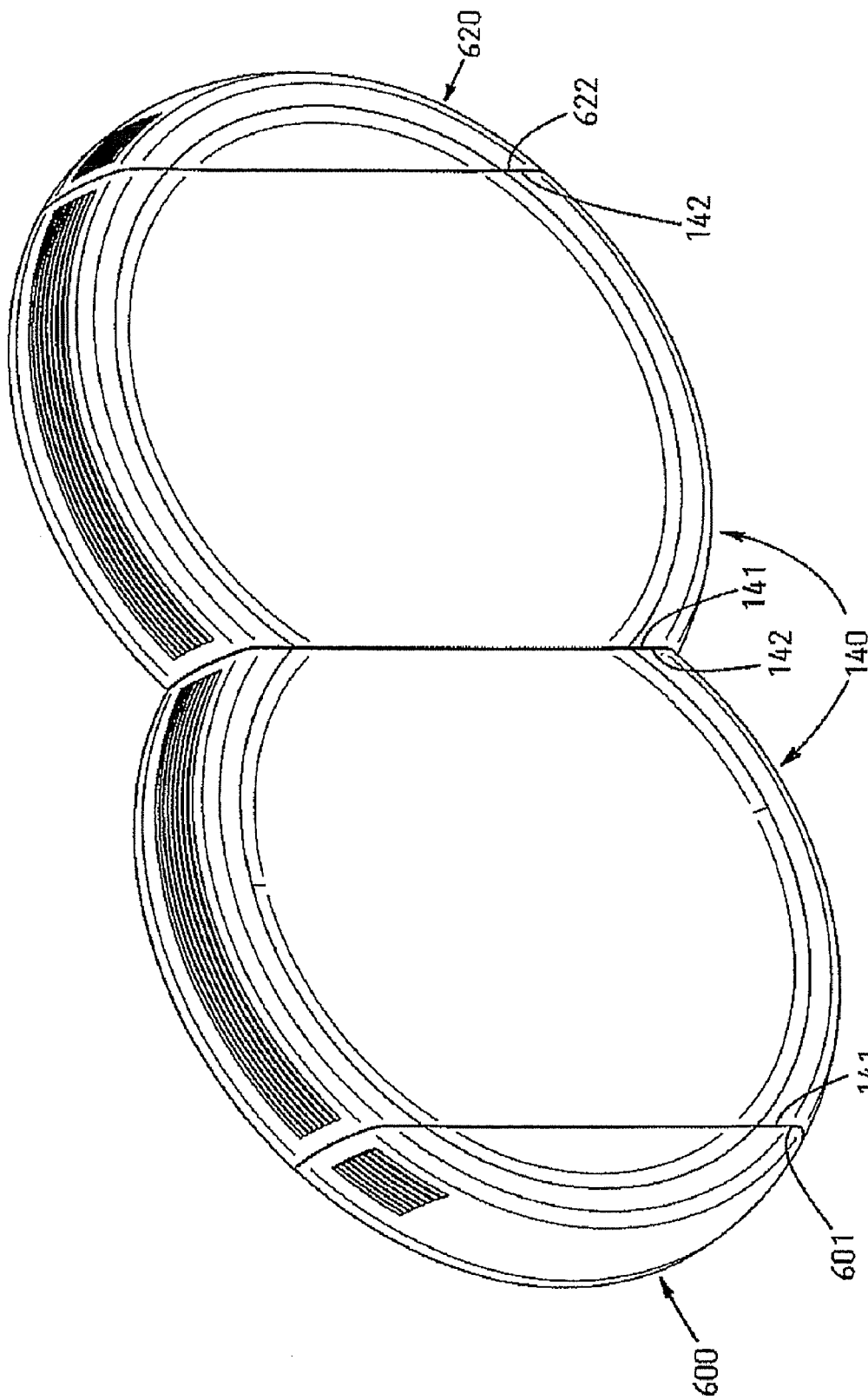
FIG. 7 shows a seventh embodiment of a modular heat exchange system according to the invention, comprising twice the heat exchange element of FIG. 6 and the same non-heat-exchange elements, achieving the shape of an eight.

FIG. 7 shows a seventh embodiment of a modular heat exchange system according to the invention. The system differs from that of FIG. 6 by the insertion of a heat exchange element 140, so that the shape of an eight is achieved.

Figure 8:
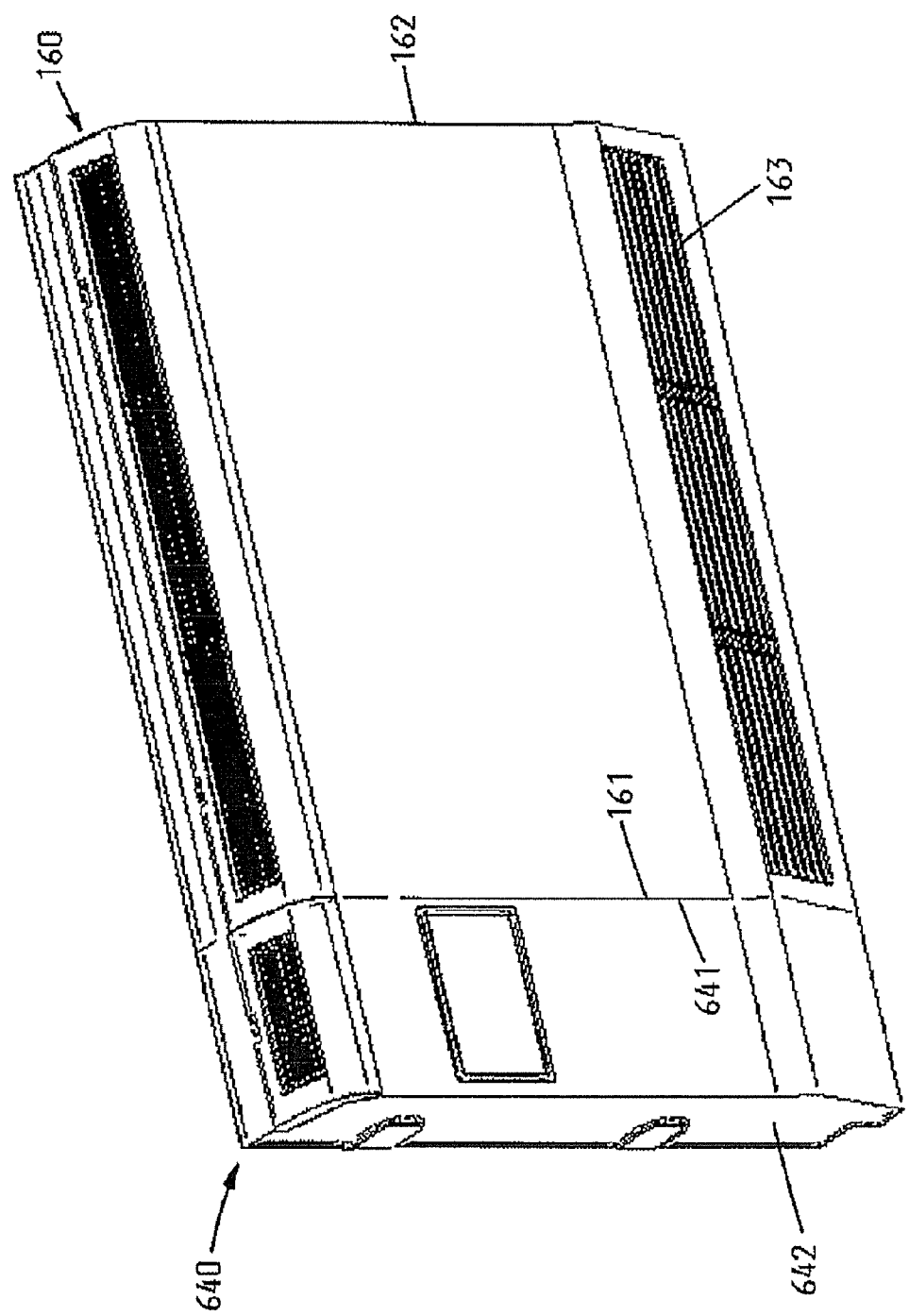
FIG. 8 shows an eighth embodiment of a modular heat exchange system according to the invention, comprising a heat exchange element with air intake openings at the front and a control unit as non-heat-exchange element.

FIG. 8 shows an eighth embodiment of a modular heat exchange system according to the invention. The system comprises a heat exchange element 160 and a non-heat-exchange element, more particularly more particularly a control unit 640. This system differs from that of FIG. 1 in the fins 163 which are provided at the front side of the heat exchange element 160 and between which air intake openings are located. As a result of this, the heat exchange element 160 has a rectangular shape which somewhat slants at the bottom. The control unit 640 has a fitting rectangular shape. Again the opposite lateral sides 161, 162 of the heat exchange element 160 are complementary to those 641, 642 of the control unit 640.

In accordance with the invention, the heat exchange systems can comprise any number of heat exchange elements in any thinkable size and shape, for example depending on the size of the room and the volume to be heated and/or cooled, and any number of non-heat-exchange add-on elements depending on the desired added functionality. In all embodiments the shape of the heat exchange elements is adapted to the shape of the add-on elements, so that the shape of one element continues into that of the other element.

In the embodiments shown the heat exchange elements and the add-on elements are each themselves provided for being mounted on a wall (or other supporting surface) by means of separate fixing means such as for example screws which are screwed into wall plugs. Alternatively, mutual coupling means may also be provided, so that the non-heat-exchange elements are fixable to the heat exchange elements instead of on a wall. In the latter case the possibility of an additional wall fixation may be provided if desired.

The above described heat exchange elements 100, 140 and 160 are each time composed of a wall mount 200, a technical part 300 and a cover 400, 450 which determines the appearance of the heat exchange element. For these heat exchange elements 100, 140 and 160 the same wall mount 200 and the same technical part 300 can be used. The heat exchange elements 100, 140 and 160 consequently have interchangeable covers. The heat exchange element 120 has a wall mount (not shown) of increased height, the size of which is adapted to the shape of the heat exchange element 120 and, depending on the construction, provided for mounting two technical parts 300, the same as usable for the other heat exchange elements, above each other or one larger technical part.

Figure 9:
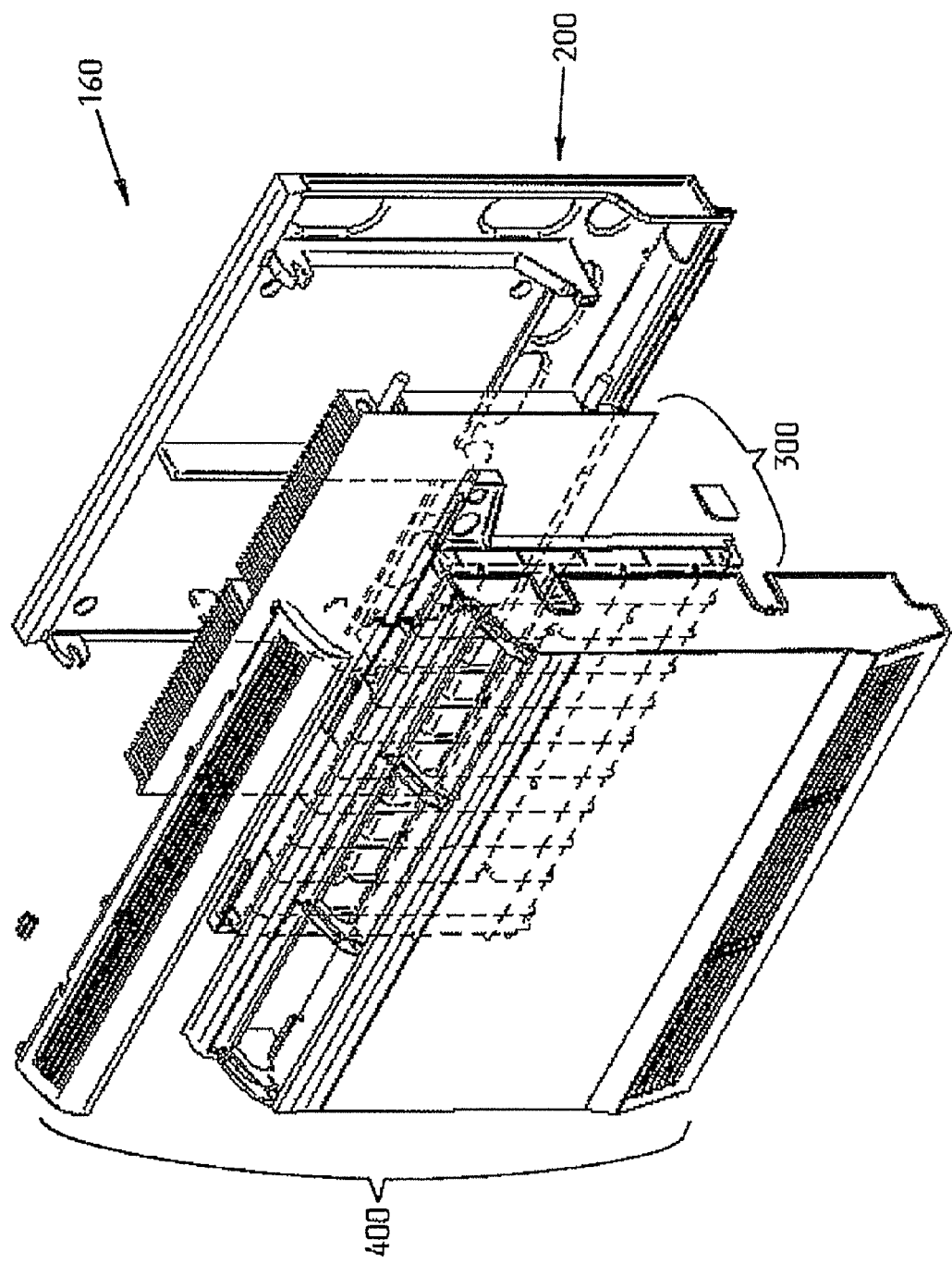
FIG. 9 shows in exploded view the parts of which the heat exchange element of FIG. 8 is composed.

FIG. 9 shows the parts of which the heat exchange element 160 of FIG. 8 is composed. In the following these different parts of the heat exchange elements as well as the parts of the add-on elements will be further elucidated.

Wall Mount

Figure 11:
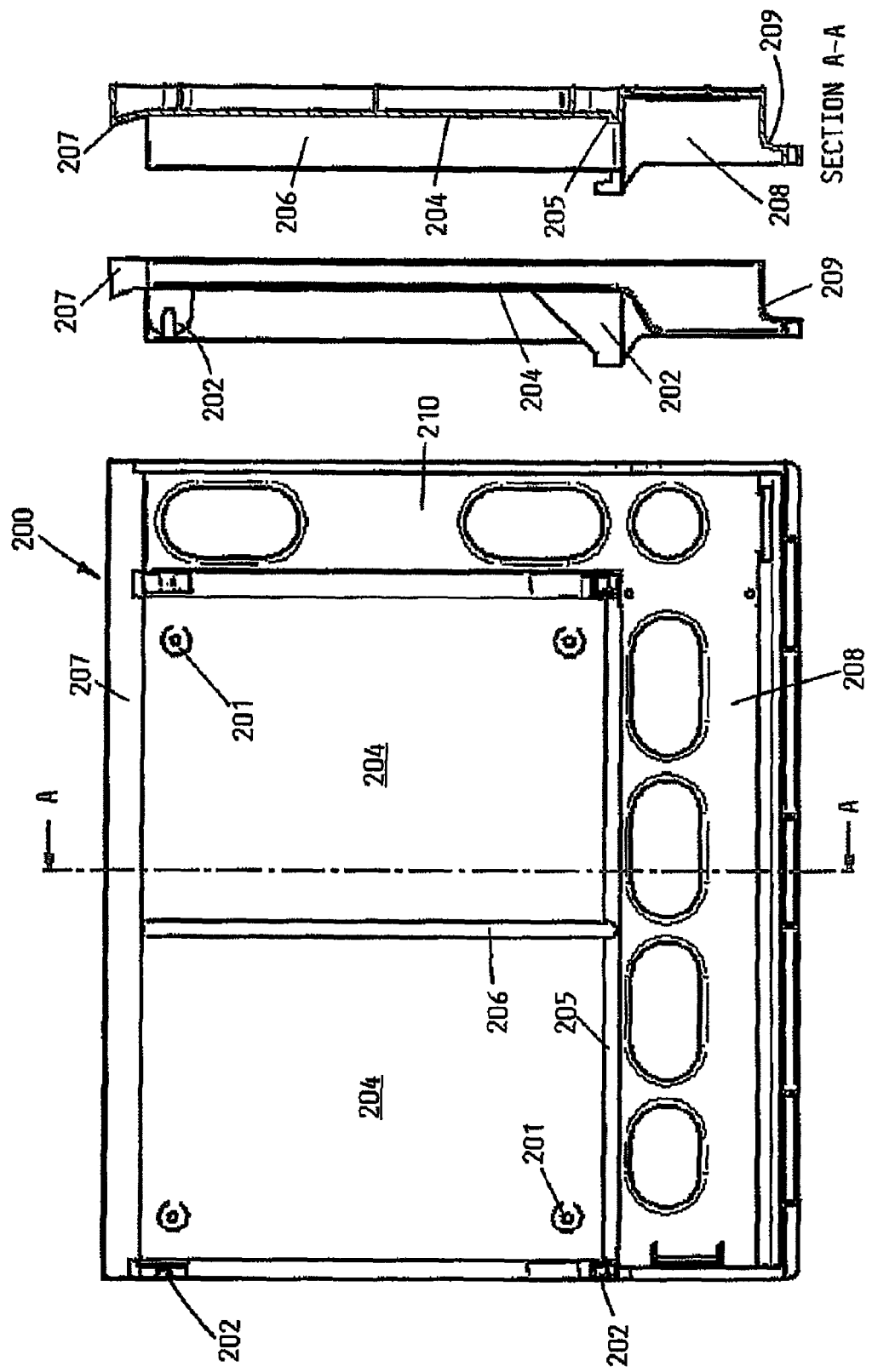
FIG. 11 shows the wall mount of the eighth embodiment in a technical drawing.

The wall mount 200 is shown in perspective frontal and rear views in FIG. 10. FIG. 11 shows a technical drawing of this part. The wall mount 200 is adapted for being fixed in upright position to a wall or on a stand and for holding the technical part 300 and the cover 400, 450 of one of the heat exchange elements. To this end, the wall mount 200 is provided with openings 201 for receiving screws (not shown) by which it is fixed to the wall and mounting members 202 to which the technical part 300 can be fixed. This can be done by means of bolts or by means of a snap connection or by means of any other fixing means known to the person skilled in the art. At the bottom, grooves 203 are provided for receiving complementary protrusions of the cover 400, 450. These grooves and protrusions together form a snap connection.

The wall mount 200 is preferably constructed in a non-heat conductive material, so that heat losses towards the wall can be minimised, for example a moulded plastic or composite material or any other heat-insulating material known to the person skilled in the art. It comprises a layer 204 of soft material for contacting and positioning the upstanding fins of the technical part 300 and damping undesired vibrations and noises. A horizontal rib 205 is provided at the bottom of the soft layer 204, on which during use the upstanding fins of the technical part 300 rest. A vertical rib 206 is provided halfway the soft layer 204 which is provided for filling an open space between fins of the technical part 300. The reason for this will be described in detail further on. A top part 207 above the soft layer 204 slants towards the front for directing the upwards air stream, which during heating flows upwards between the technical part 300 and the wall mount 200, away from the wall and from underneath a windowsill below which the heat exchange element may be mounted.

At the bottom of the wall mount 200, spaces 208, 209 are provided for respectively accommodating a ventilator housing (see below) and ducts for the heat exchange fluid. On the right there is a further space 210 for accommodating the fluid ducts to and from the technical part 300. Note that the embodiment shown can be mirrored, the space 210 then being located on the left. For example if two heat exchange elements are to be mounted adjacent to each other it is convenient to use a right hand element and a left hand element, with the fluid supply and discharge ducts for both elements in the middle.

Technical Part

Figure 12:
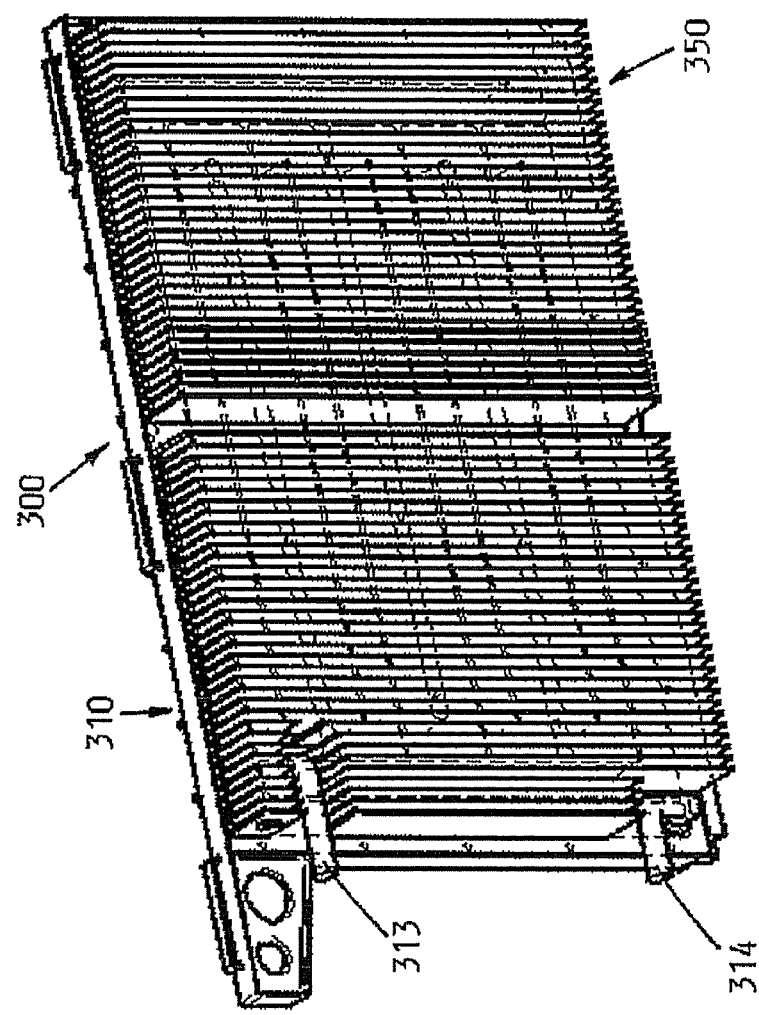
FIG. 12 shows a perspective view of a technical part which can be used with all of the embodiments of FIGS. 1-8.

The technical part 300, shown in perspective in FIG. 12, comprises a front member 310 in a non-heat conductive material, preferably a plastic or composite material, and a back member 350 in a heat conductive material, preferably a metal or a metal alloy, for example aluminium. A sealing is provided in between the front and back members for making the technical part 300 substantially fluid-tight. This structure has the advantage that the front of the heat exchange element, which is in a non-heat conductive material, is heated to a lesser extent than the back, which can reduce the risk of skin burns when users touch the technical part.

The technical part 300 is preferably held together by means of screws, preferably self-tapping screws which are applied from the side of the back member 350 into pre-drilled holes in the front member 310. These holes are located along the sides at the sealing and on a number of locations on the fluid conducting ribs 311. However, any other fixing means for holding the technical part together are also possible.

Figure 14:
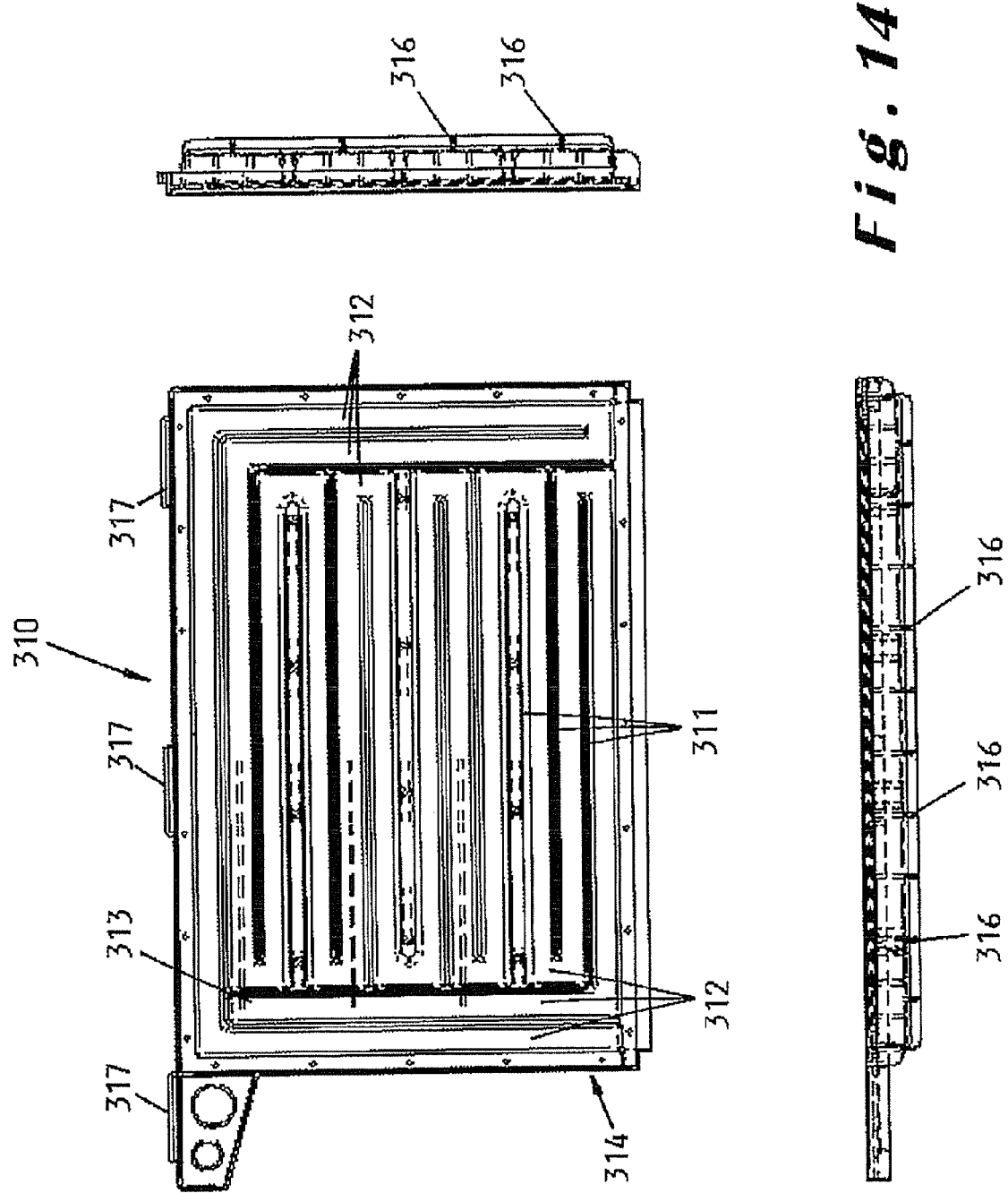
FIG. 14 shows the front member of the technical part in a technical drawing.

The front member 310, which is shown in perspective in FIG. 13 and in a technical drawing in FIG. 14, comprises the fluid conducting ribs 311 forming conduits 312 in between them for conducting the heat exchange fluid along a single path from an inlet 313 of the technical part to an outlet 314 of the technical part. The conduits 312 are open towards the back member 350 for enabling contact between the fluid and the back member. The fluid conducting ribs 311 have a concave top face 315, in which an additional sealing is applied for preventing fluid communication between the conduits 312 other than the single path from inlet to outlet. In this way, efficiency of the heat exchange element can be enhanced since cold zones can be prevented.

The front member 310 shown in the figures is a moulded body of a plastic or composite material with a plurality of reinforcement ribs 316 in perpendicular directions. These reinforcement ribs are carefully studied and calculated and are consequently provided for counteracting deformations of the front member as a result of temperature variations.

The single flow path in the front member 310 extends from an inlet 313 up to an outlet 314. The inlet is located near the top side, whereas the outlet is located near the bottom side. From the inlet 313, the heating fluid is first conducted towards the bottom, then follows a meandering path upwards between the fluid conducting ribs 311, then conducted back towards the bottom and via the periphery back towards the entrance side, where both the inlet 313 and outlet 314 are located. The first conduit from the inlet towards the bottom and the last conduit from the top side towards the outlet extend adjacent each other to create a given degree of heat exchange between fluid entering the technical part 300 and fluid exiting the technical part 300. This can help to avoid cold zones and to achieve a more uniform temperature throughout the technical part 300, which may further enhance the efficiency of the heat exchange element of the invention.

Figure 15:
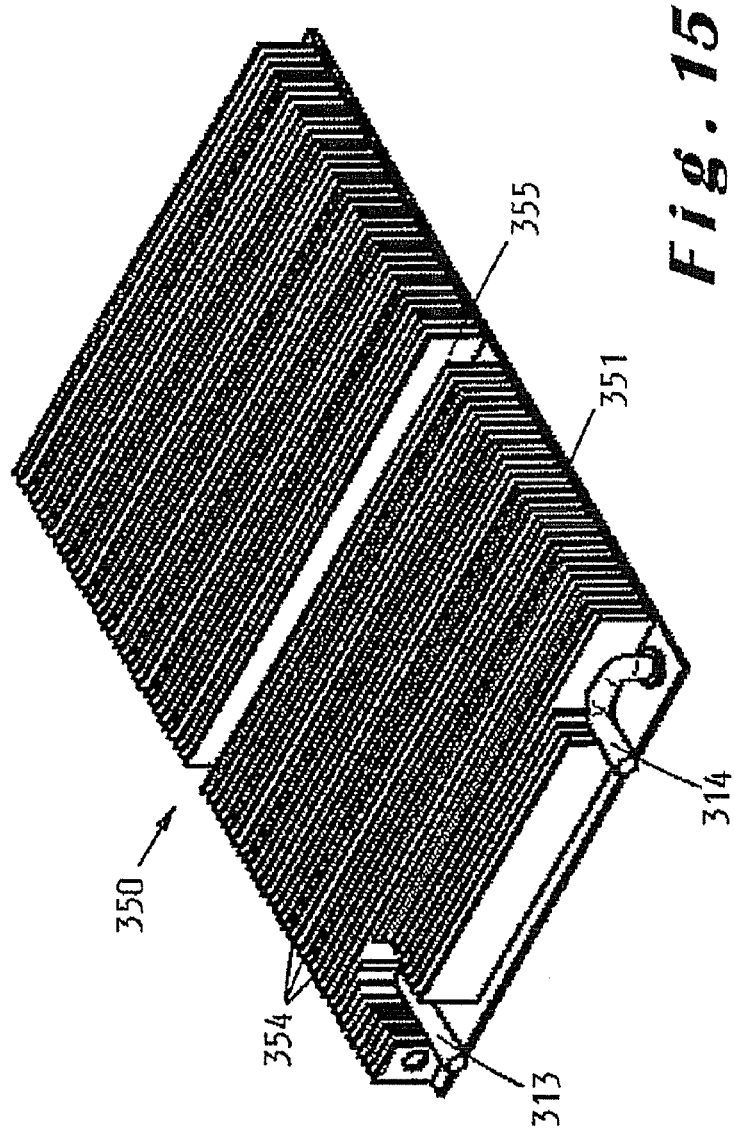
FIG. 15 shows the back member of the technical part in a perspective view.
Figure 16:
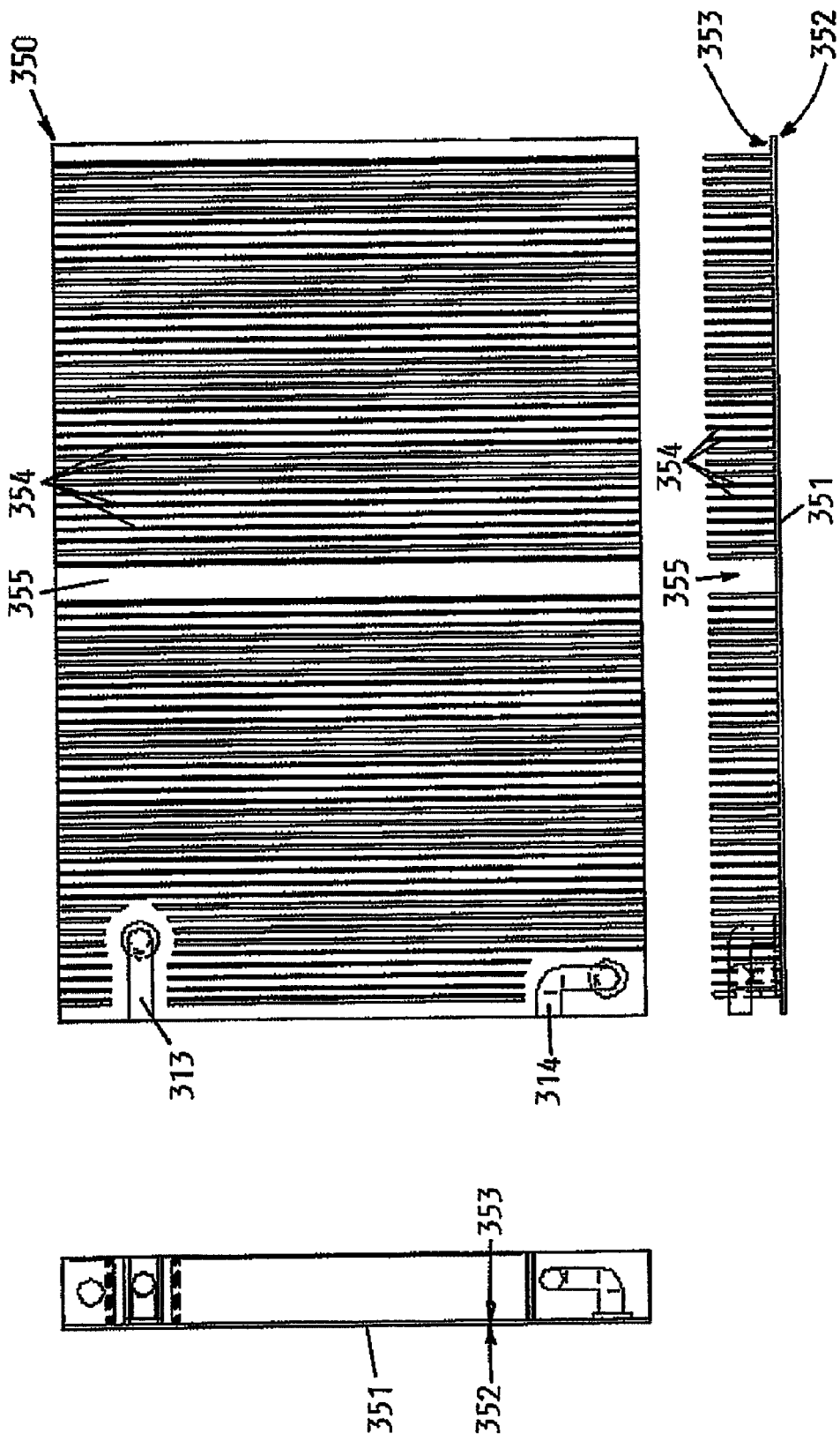
FIG. 16 shows the back member of the technical part in a technical drawing.
Figure 17:
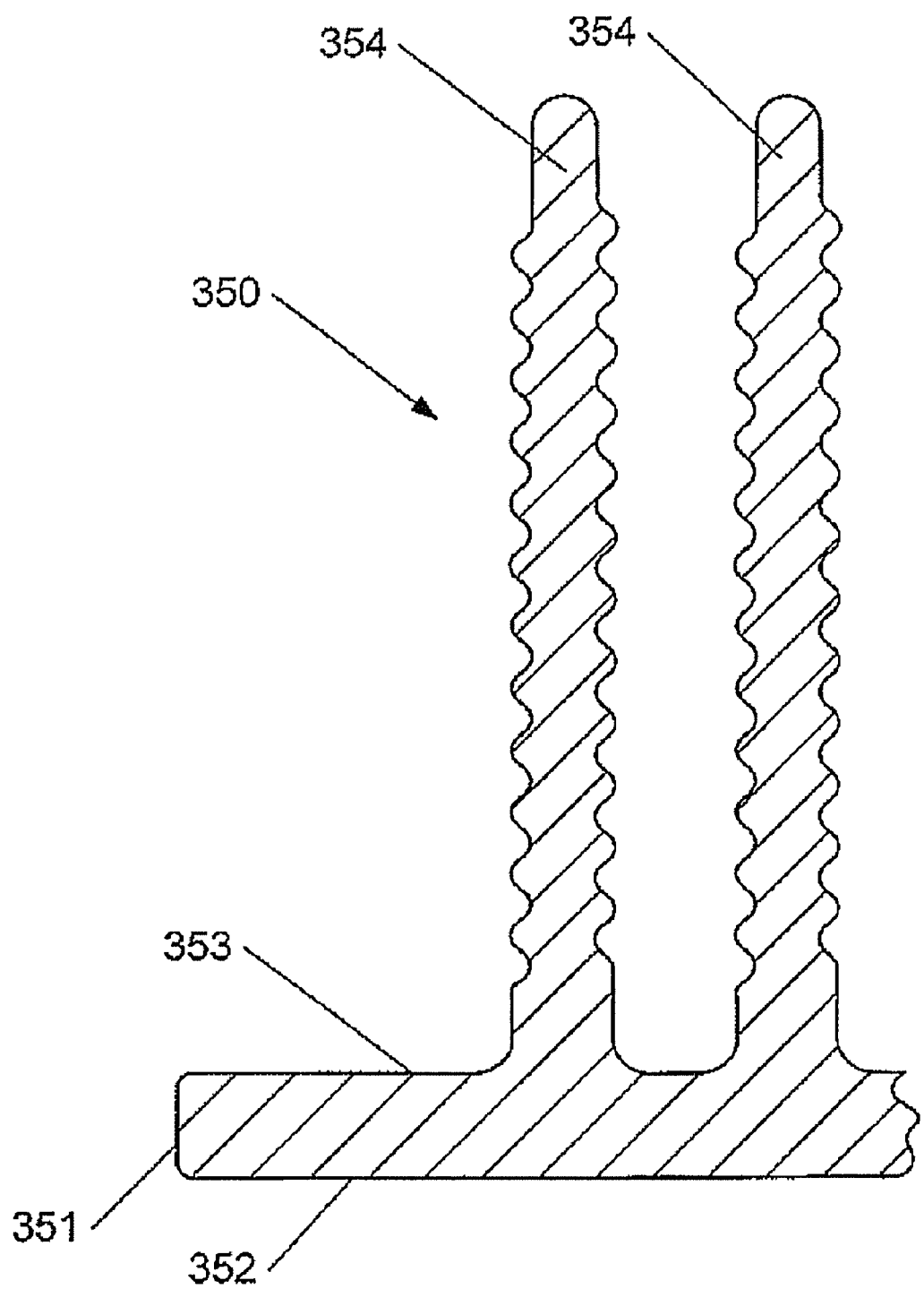
FIG. 17 shows a detail of the upstanding fins of the back member of the technical part.

The back member 350 is shown in perspective in FIG. 15 and in a technical drawing in FIG. 16. It preferably comprises a flat base 351 having one side 352 for contacting said fluid and an opposite side 353 provided with a plurality of upstanding fins 354 spaced at regular distances from each other for exchanging heat with the air. The upstanding fins 354 preferably have substantially parallel corrugated shapes, which is shown in detail in FIG. 17. In this way, their surface area and hence their heat transfer capacity is increased with respect to straight fins. The parallel corrugations ensure that the distance between adjacent fins 354 is substantially constant, so that vortexes in the air stream can be avoided and a fluent air stream between the fins 354 can be maintained. This can further enhance the efficiency of the system.

The back member 350 is preferably constructed of extruded aluminium. In order to enable construction of the back member 350 by means of existing extrusion processes, the back member 350 is composed of two halves which are welded together after extrusion, for example by cold friction welding. By constructing the back member 350 in two halves, a larger height of the upstanding fins and thus a better rate of heat exchange with surrounding air can be achieved. The space 355 between the two fins next to the welded middle is filled by the vertical rib 206 on the wall plate 200, such that the distance between these fins and this rib is substantially equal to the distance between two adjacent fins. In this way the whole remains regular, which is beneficial to the regularity of the air flow. The back member 350 can have any dimensions, depending on the size of the technical part 300.

At the inlet 313 and the outlet 314, or possibly on other locations where it is deemed necessary, the technical part 300 is preferably provided with automatic vents (not shown) for releasing air or gas which may become enclosed in the technical part.

At the top, the front member 310 is provided with grooves 317 for engaging complementary protrusions 401 on the cover 400 (see below), together forming a snap connection by means of which the cover is fitted to the technical part.

The sealing between the front 310 and back members 350 is preferably achieved as follows. Along the periphery and on the ribs 311 where the fixing screws are placed, a sealing strip or an O-ring of for example about 2 mm is placed between the front member 310 and the back member 350. The ribs 311 located in between, on which no fixing points are located, have a slightly increased height with respect to the periphery and the other ribs and have a concave top face 315 for accommodating a sealing with a round cross-section, which because of the increased height is somewhat compressed between the top face 315 of the ribs and the flat side of the back member 350. In this way the difference in thermal expansion between the front and back members is overcome. More particularly, the parts of the back member between two fixing points become somewhat convex, whereas the seal between the conduits 312 is maintained by the sealing on top of the concave top faces 315 which returns to its original, round shape. As a result of this, currents between the conduits other than the current along the single flow path 312 can be avoided. Any sealing material known to the person skilled in the art can be used for the sealings.

Figures 58, 59:
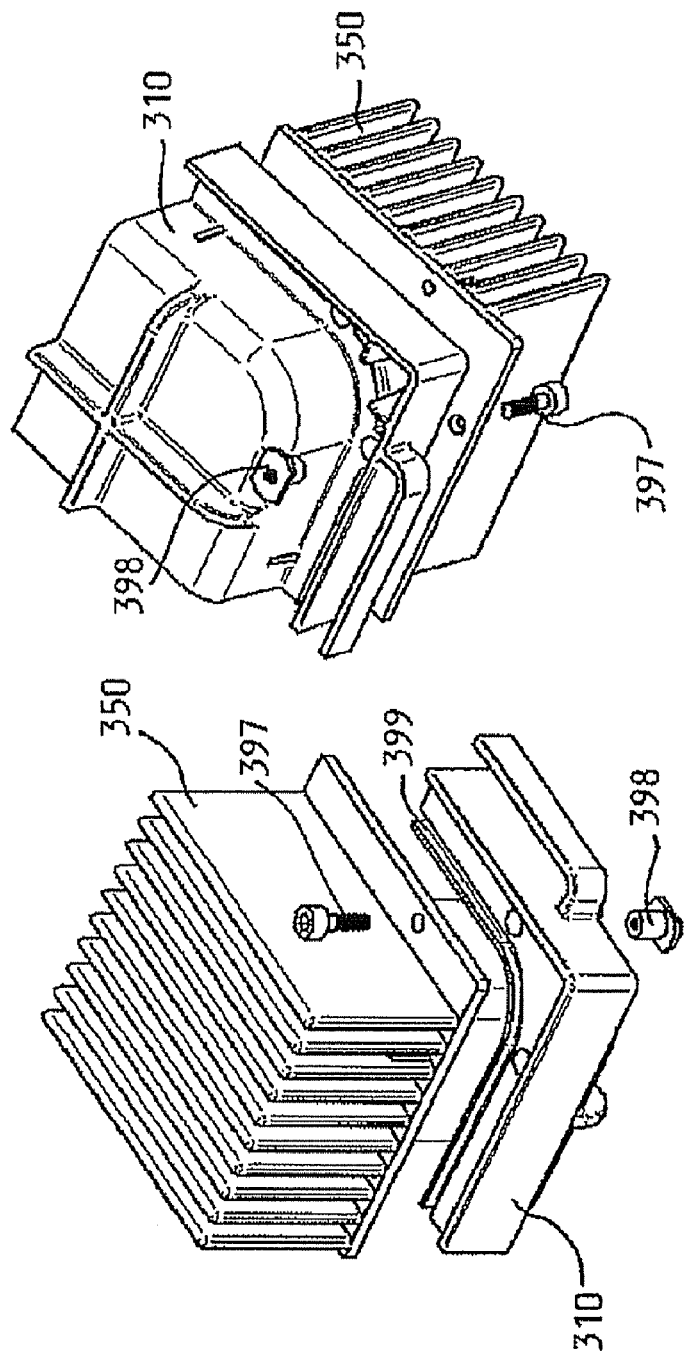
FIGS. 58-59 show a possible construction of the sealing and the fixing of the front and back member of a heat exchange element according to the invention.

A possible construction of the sealing and the fixing of the front 310 and back member 350 to each other is depicted in FIGS. 58 and 59. In this example, the two members are pressed onto each other on multiple locations by means of a bolt 397 and a nut 398, with a round sealing strip accommodated in a groove 399 in the front member 310. The nut 398 has a head which is shaped for cooperating with an edge of the front part 310, so that rotation of the nut 398 is prevented and the bolt can be easily screwed in. The hole in the front member 310 is such, that the body of the nut extends through this hole with the head contacting the front member 310. The length of the body of the nut 398 is predetermined to avoid that the bolt 397 can be screwed in too far, which could compress the sealing too much or induce tension in the plastic of the front member 310. Because of this predetermined length, the body of the nut 398 contacts the back member 350 when the bolt 397 is completely screwed in.

Figure 50:
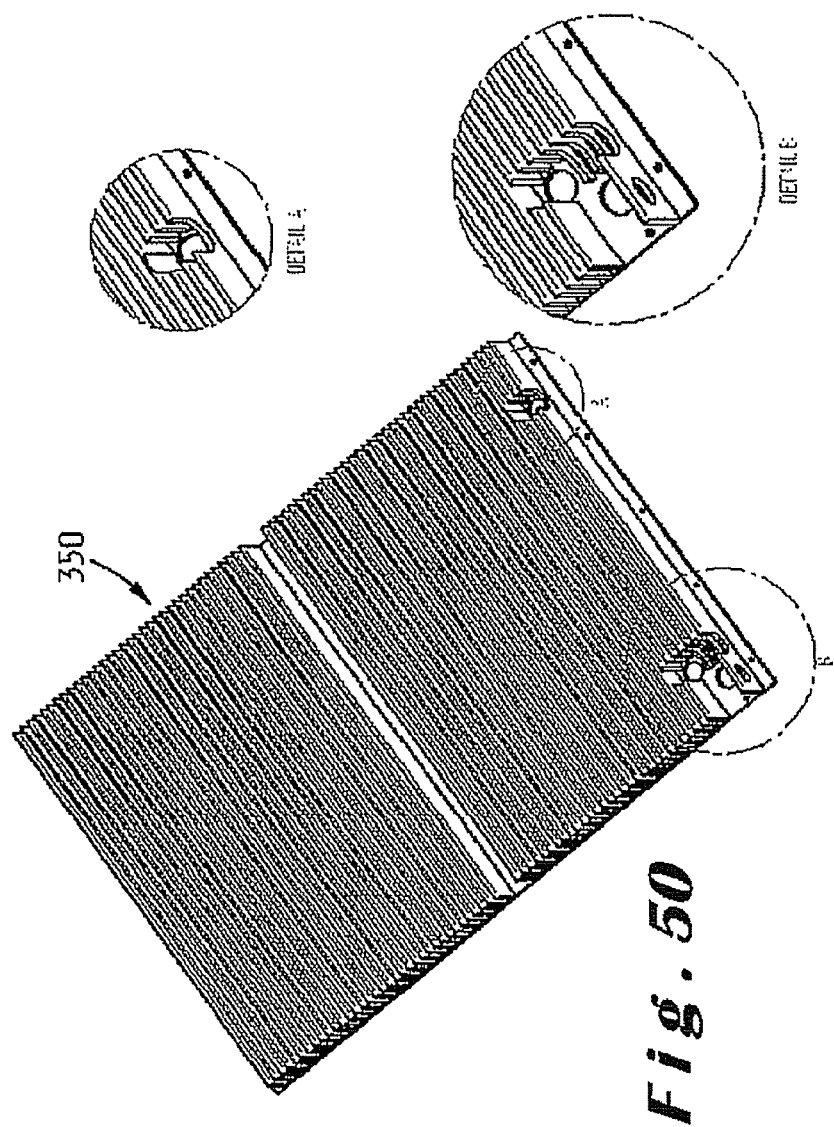
FIGS. 50-52 show an alternative embodiment of the back member of the technical part.
Figure 51:
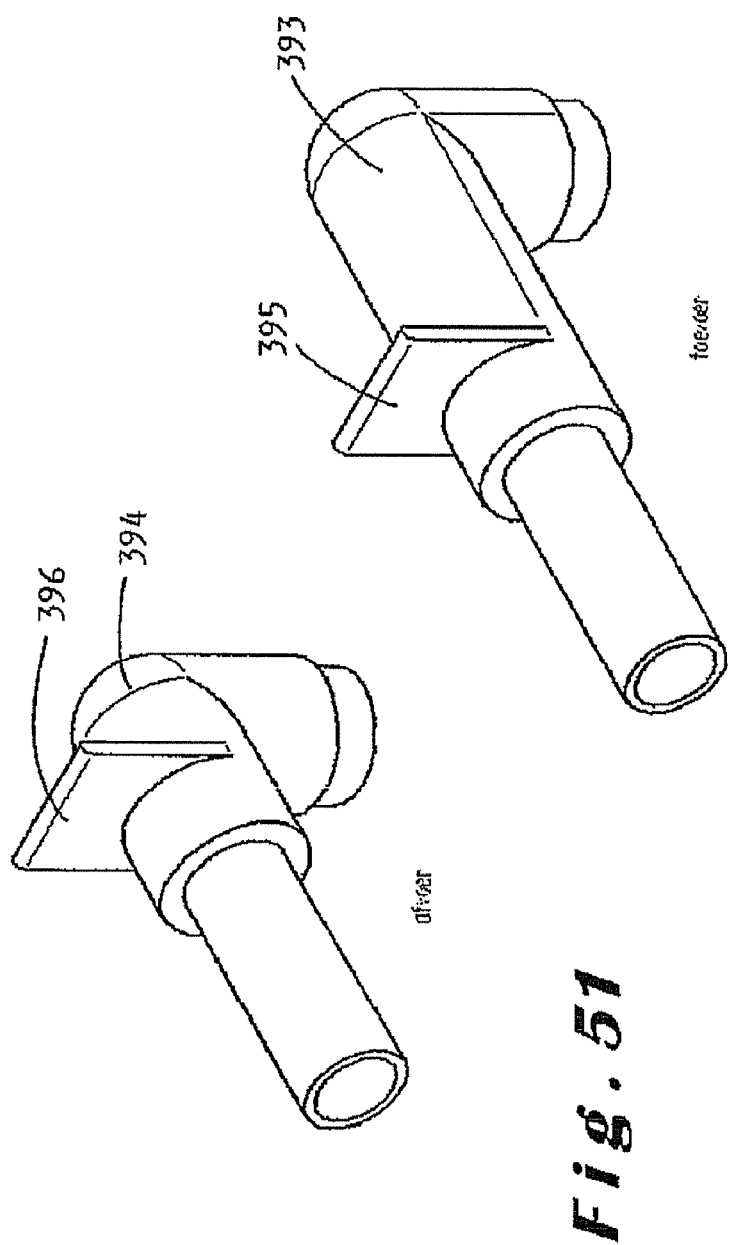
Figure 52:
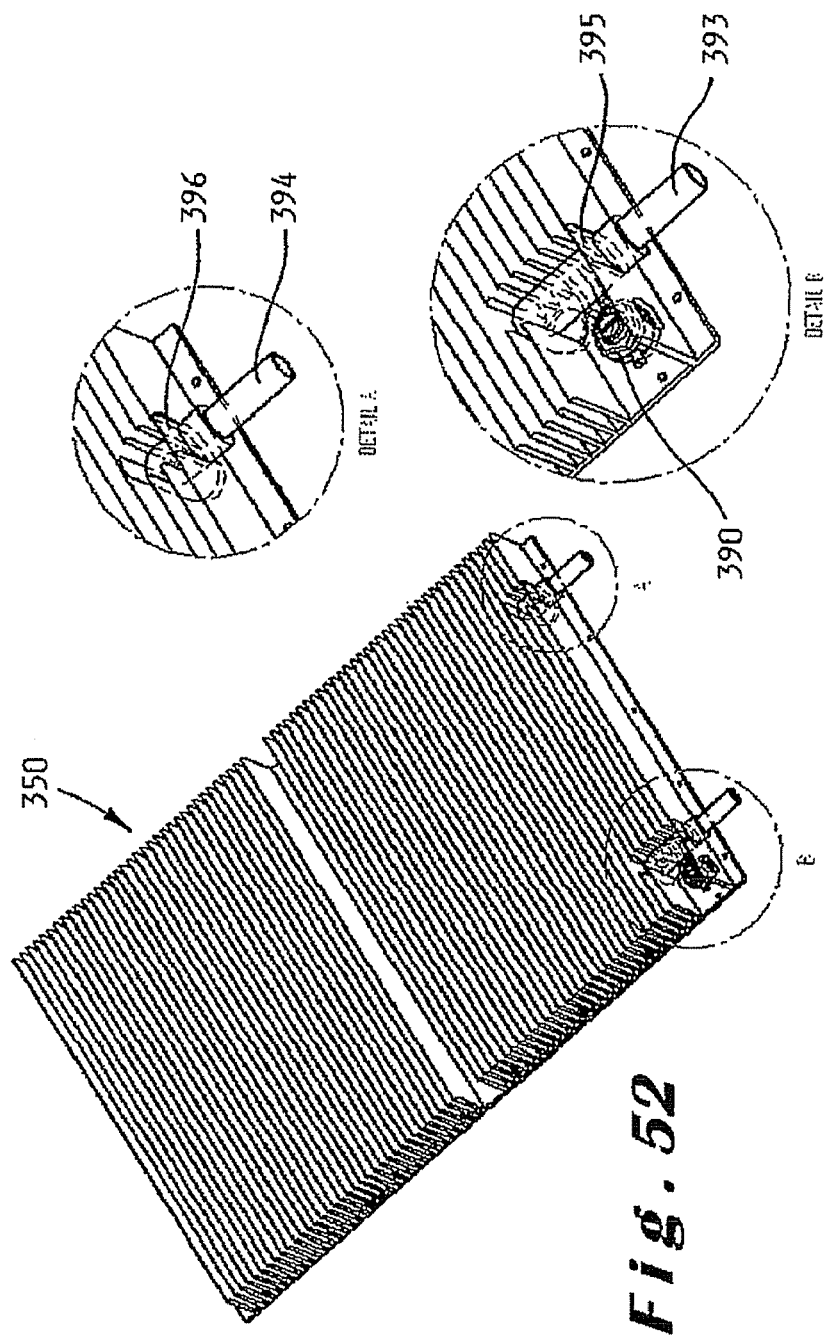
Figure 54:
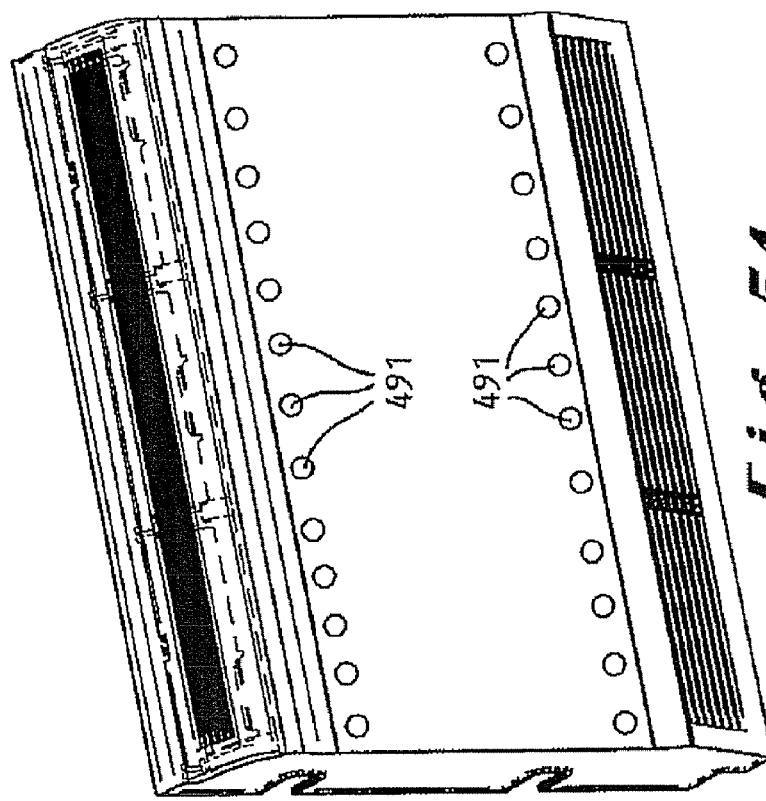
FIGS. 53-56 show alternative embodiments of heat exchange elements according to the invention with integrated lighting.
Figure 53:
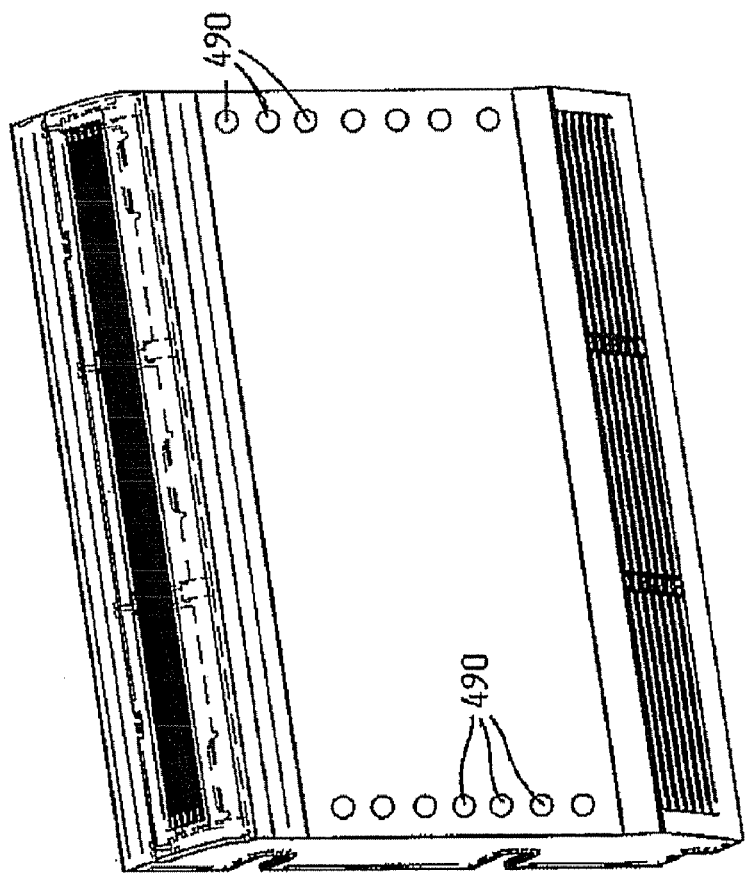
Figure 56:
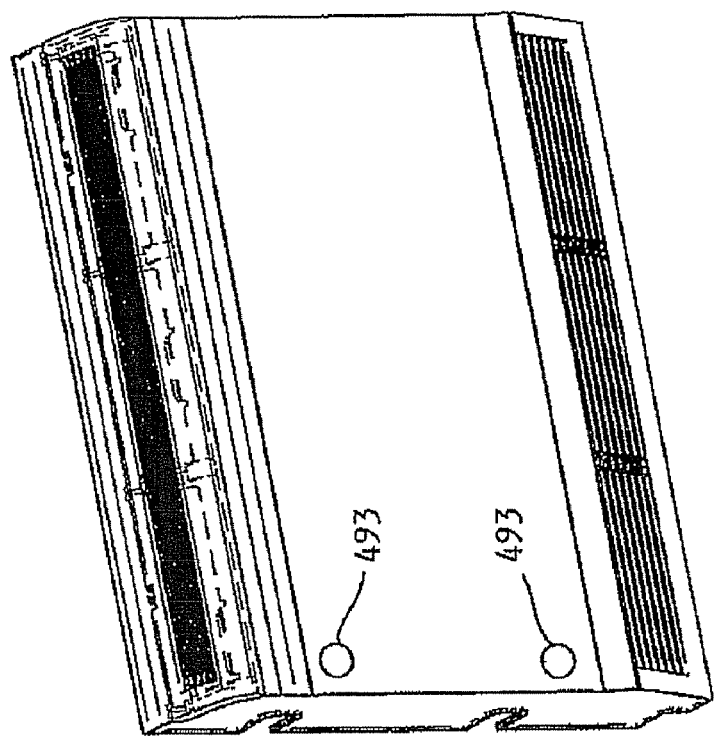
Figure 55:
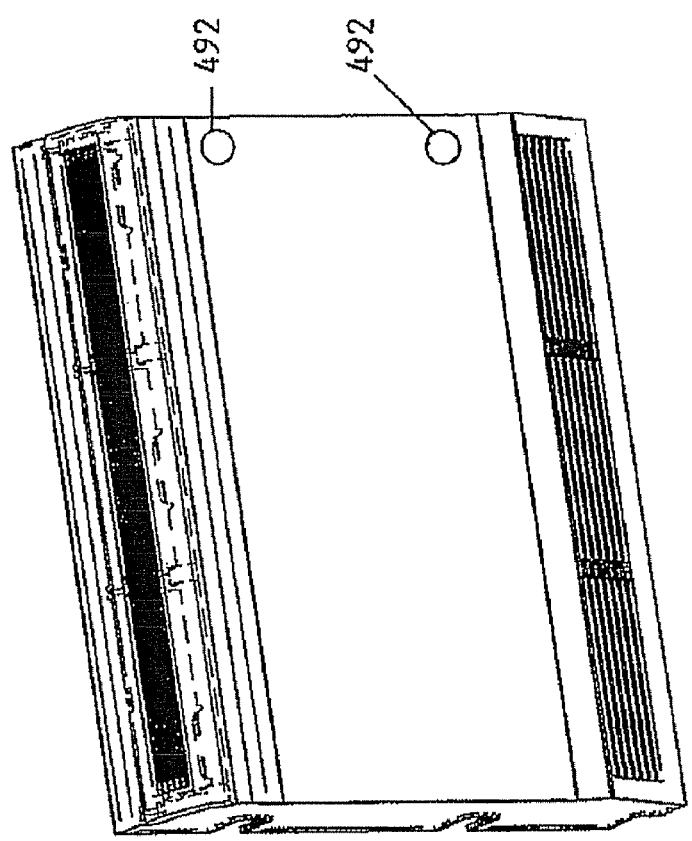

To avoid that air is fed into the technical part upon filling, an automatically operating air/water-separation element is provided at the inlet. Further, two small openings are provided in the separation wall between the upper conduit and the conduit just underneath at the location where the water flow is bent towards the bottom. In this way, the air which would otherwise remain in this bend can escape towards the upper conduit. In this upper conduit an air vent is provided at the bend towards the bottom and towards the outlet, where the accumulated remaining air is removed from the technical part. In this way, it is avoided that air can flow from one heat exchange element to another and/or in the ducts. A possible embodiment of the air vent is shown in FIGS. 50-52, where the air vent 390 is welded to the aluminium part 350. In the embodiment shown a few of the fins 354 are partly cut for the inlet 393 and the outlet 394. The air vent 390, the inlet 393 and the outlet 394 are welded to the aluminium part 350. The pipes of the inlet 393 and the outlet 394 are provided with a plate 395, 396 to close off the cut-out in the extreme fin.

Figure 18:
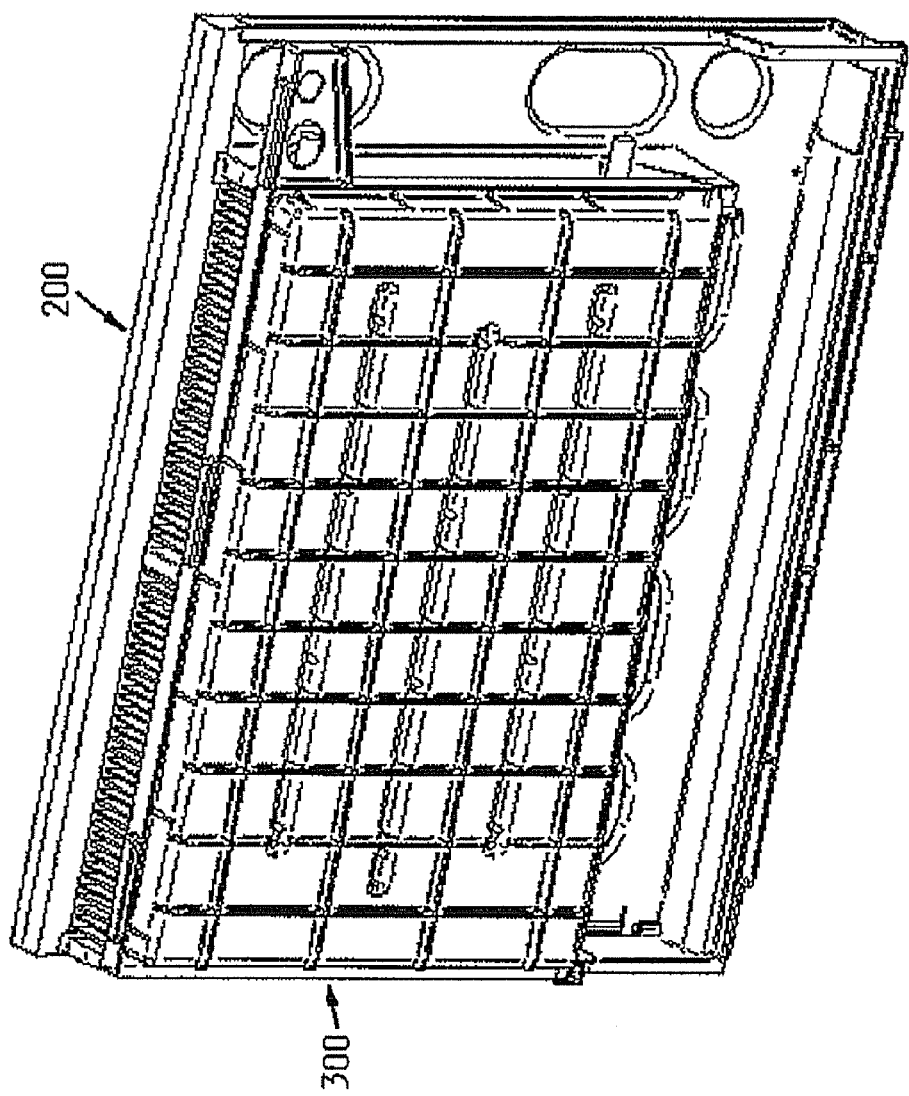
FIG. 18 shows the assembly of the wall mount of FIG. 10 and the technical part of FIG. 12.

FIG. 18 shows the assembly of the wall mount 200 and the technical part 300, which is fixed to the wall mount 200 by means of the mounting members 202 which are provided for this purpose.

Figure 19:
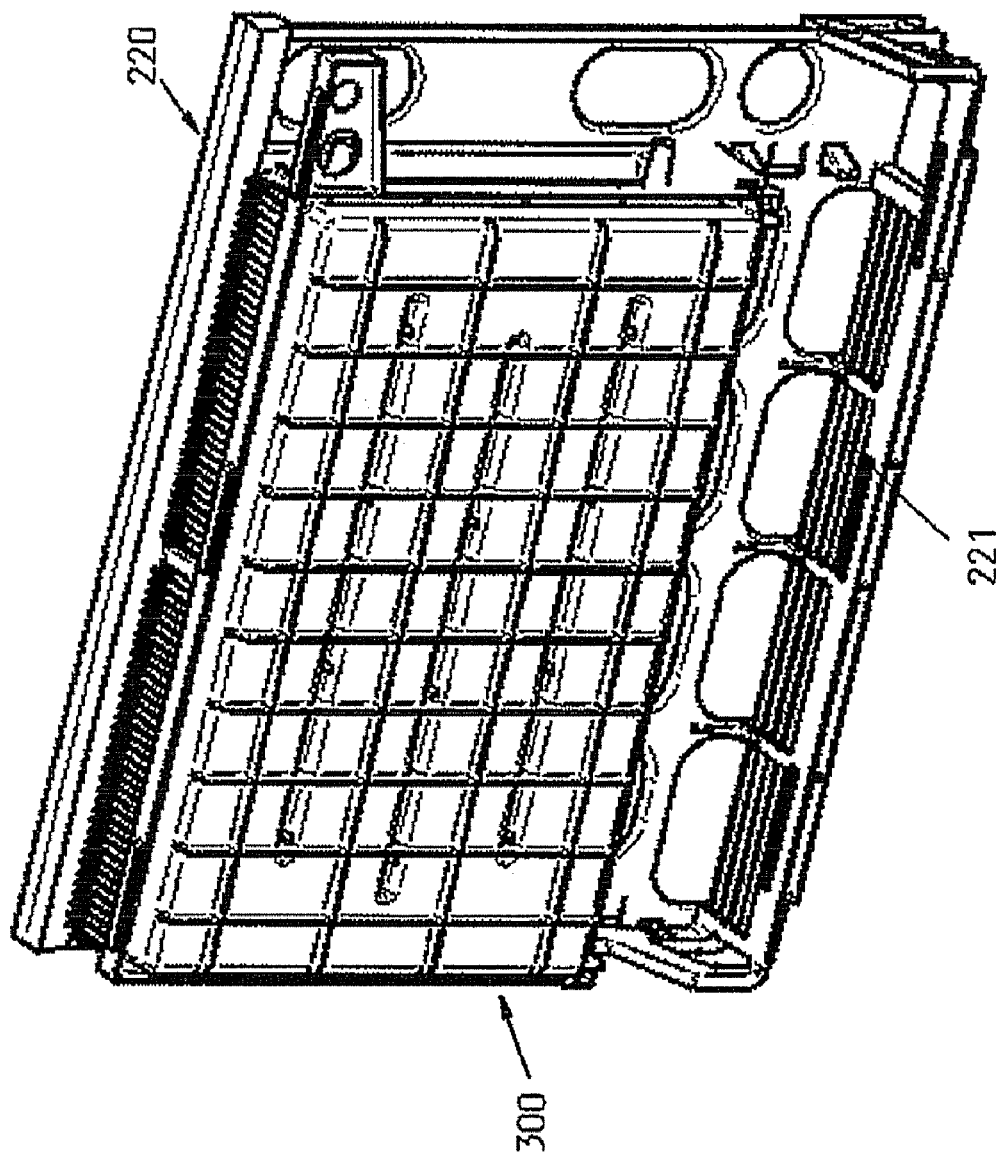
FIG. 19 shows the assembly of a wall mount for the heat exchange element of the first embodiment of FIG. 1 and the technical part of FIG. 12.

FIG. 19 shows the assembly of the wall mount 220 and a technical part 300 for the embodiment of the heat exchange element 100 of FIG. 1. No air intake openings are provided at the bottom of the cover of the heat exchange element 100. Consequently these openings are provided between fins 221 at the bottom of the wall mount 220, which otherwise generally shows all the features of the wall plate 200. The technical part 300 is preferably the same as the one used for the heat exchange element 160 of FIG. 8.

Cover

Figure 20:
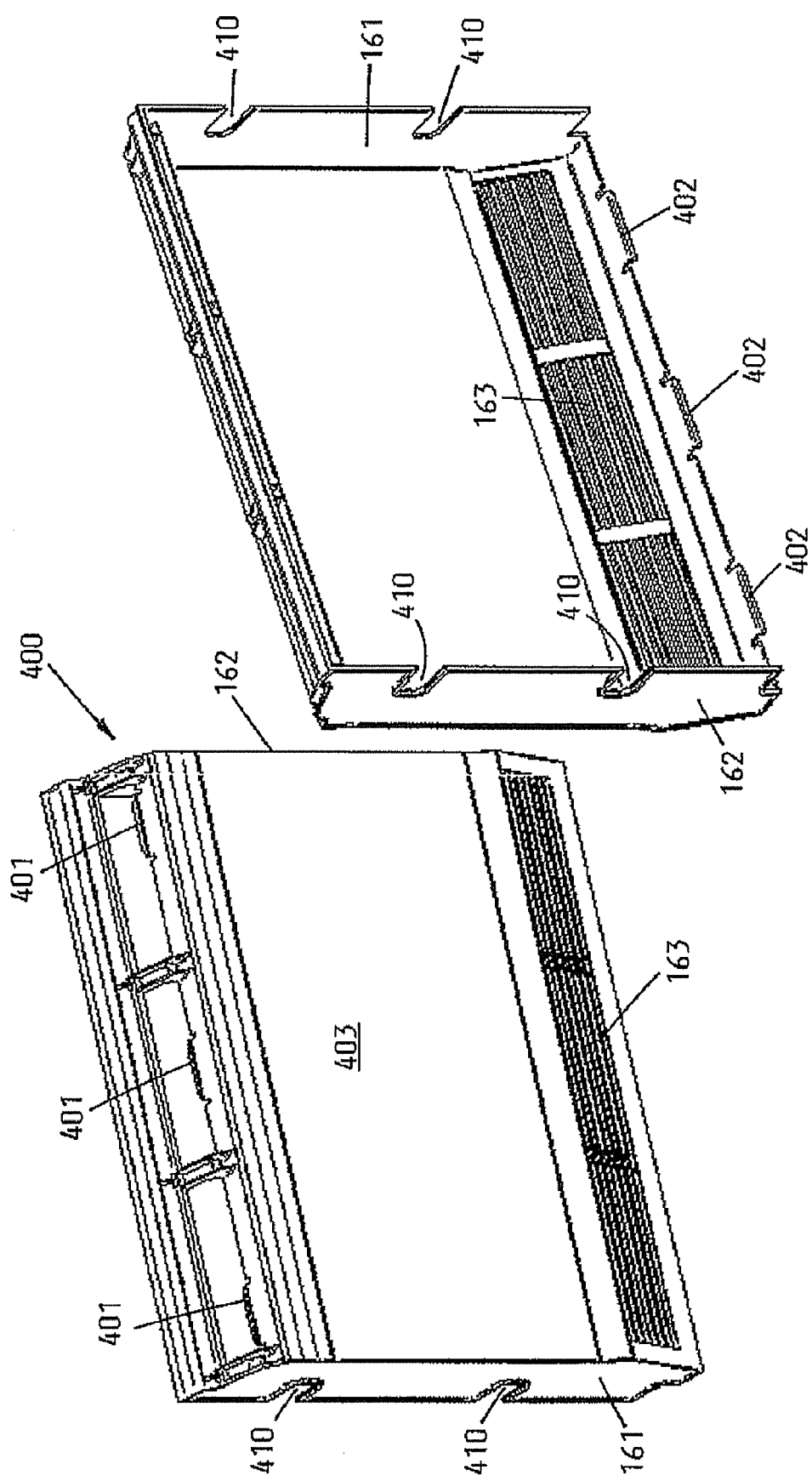
FIG. 20 shows a cover for the heat exchange element of FIG. 8 in a perspective view.
Figure 21:
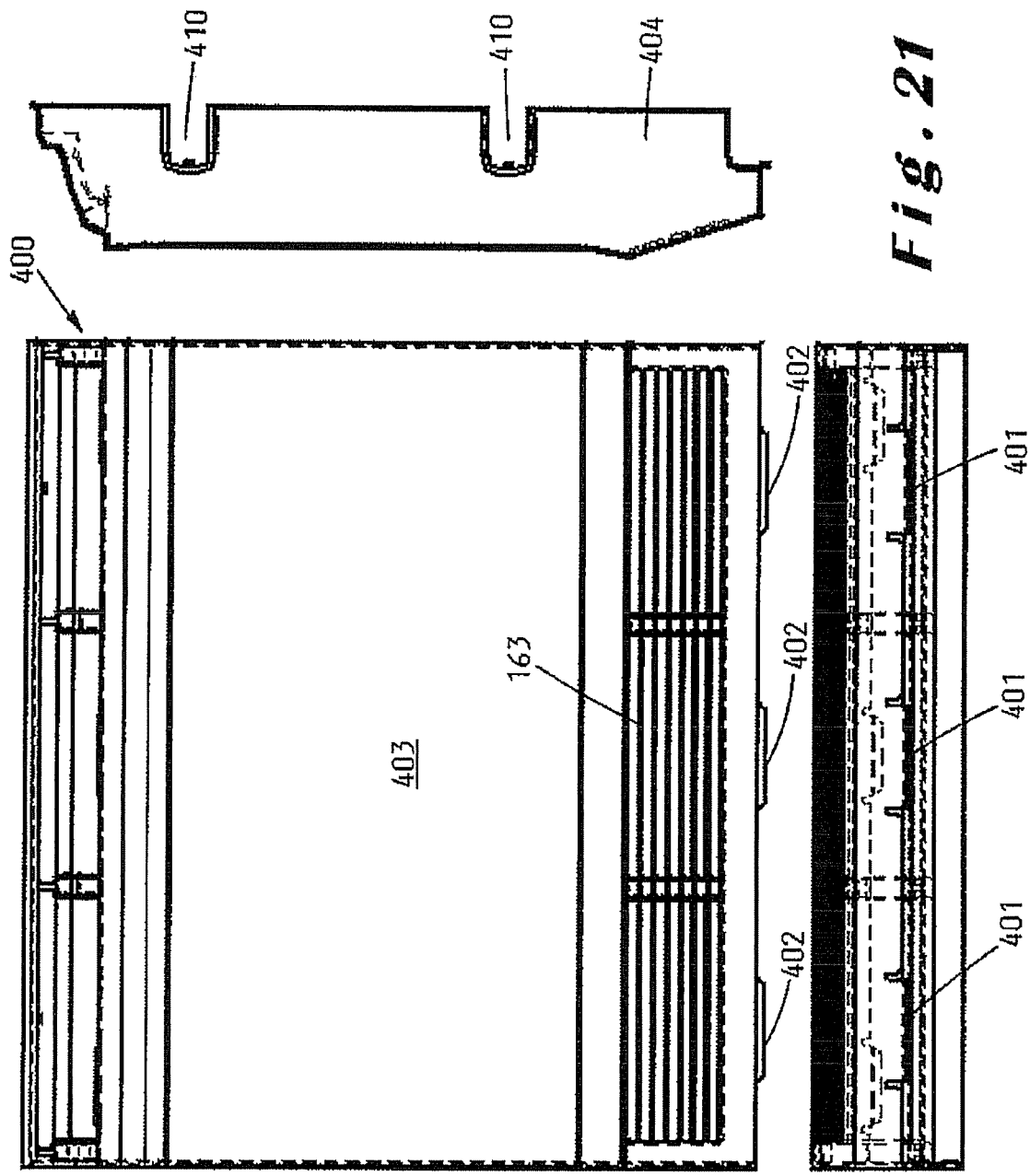
FIG. 21 shows the cover for the heat exchange element of FIG. 8 in a technical drawing.
Figure 22:
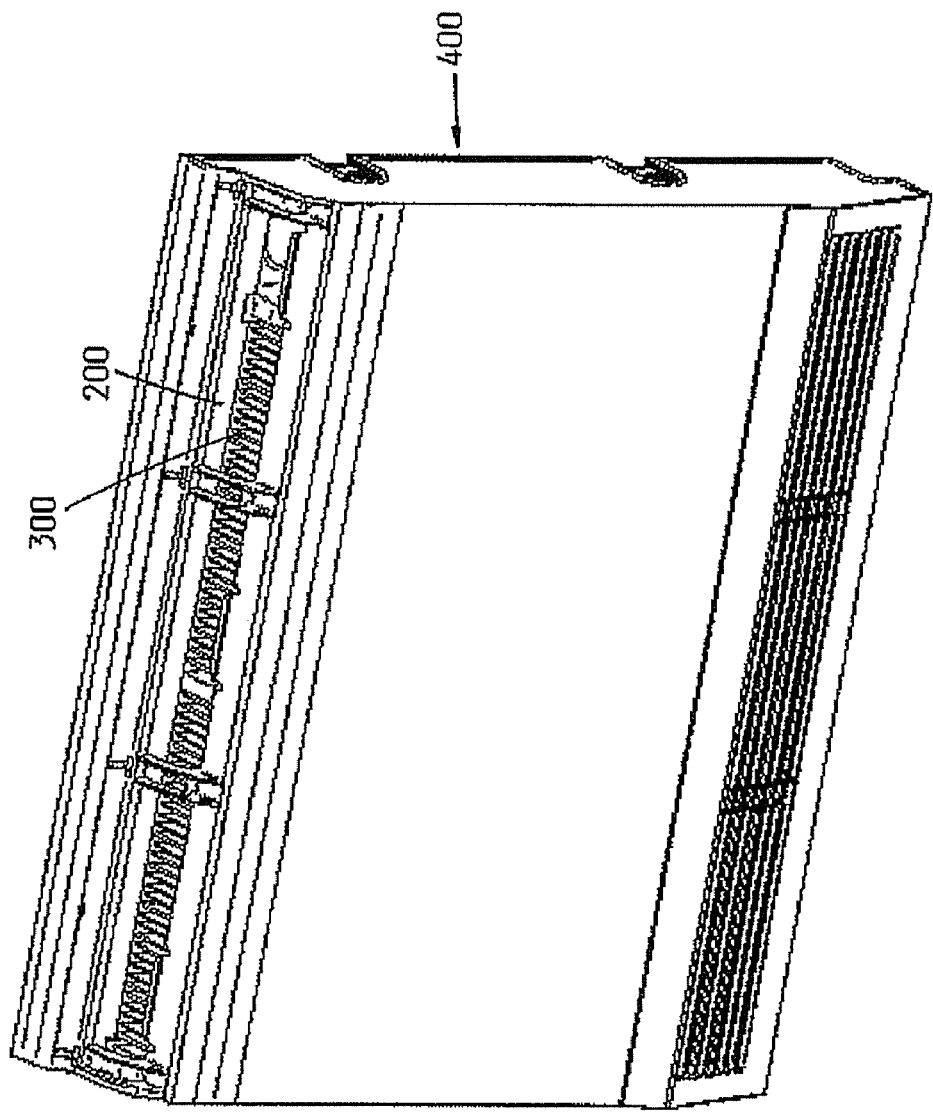
FIG. 22 shows the cover of FIG. 20 fixed to the assembly of FIG. 18.

The cover 400 of the heat exchange element 160 of FIG. 8 is shown in perspective in FIG. 20 and in a technical drawing in FIG. 21. The cover 400 is fixed to the whole formed by the wall mount 200 and the technical part 300, as shown in FIG. 22. To this end the cover 400 comprises protrusions 401, 402 at the top and at the bottom, which respectively snap-fit into grooves 317 on the technical part 300 and grooves 203 on the wall mount 200. At the bottom, the cover 400 comprises fins 163, between which openings are located for drawing in air into the technical part 300. In order to enhance this air flow preferably a ventilator is provided in a space 404 at the bottom of the heat exchange element 160.

Figure 23:
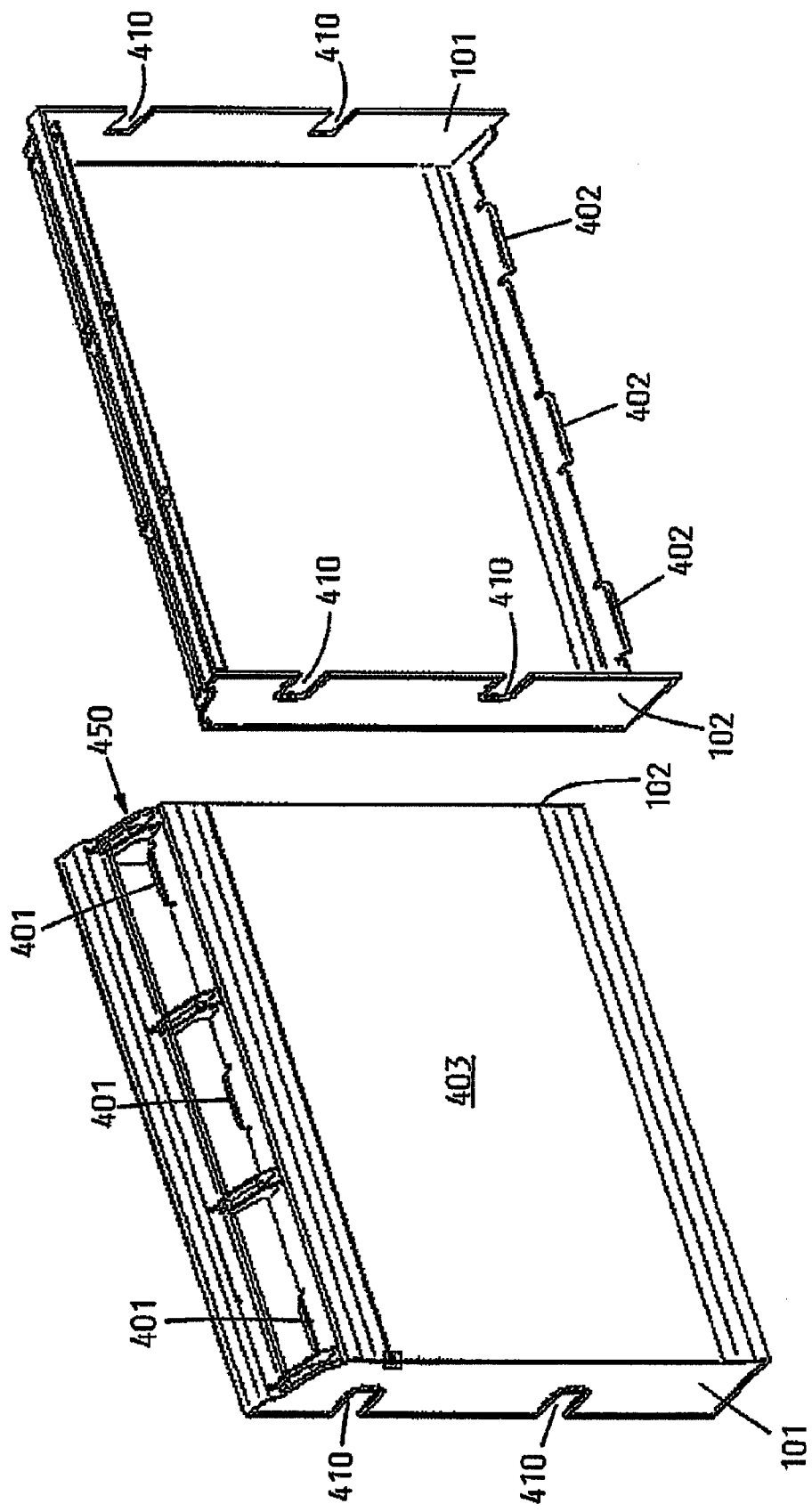
FIG. 23 shows a cover for the heat exchange element of FIG. 1 in a perspective view.
Figure 24:
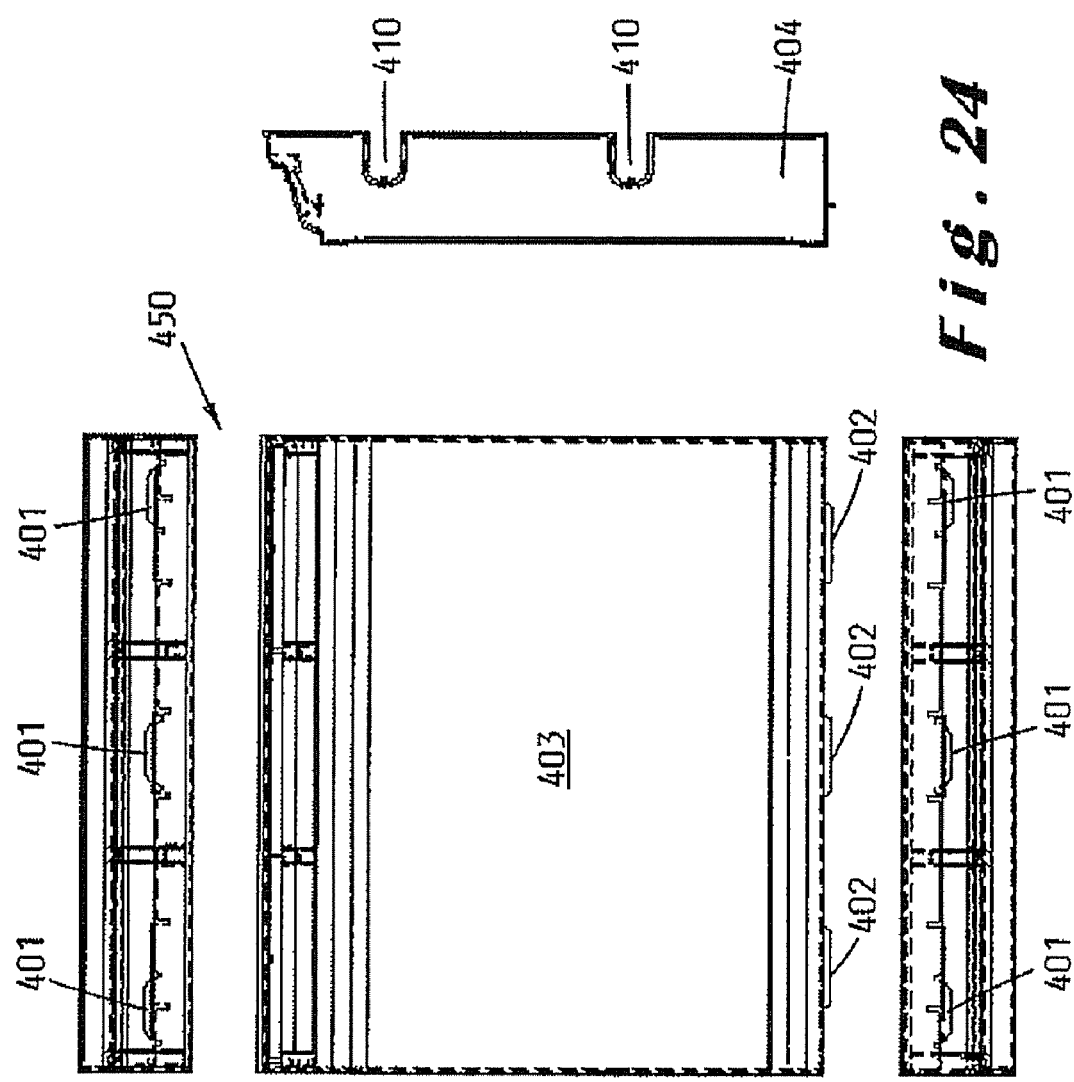
FIG. 24 shows the cover for the heat exchange element of FIG. 1 in a technical drawing.
Figure 25:
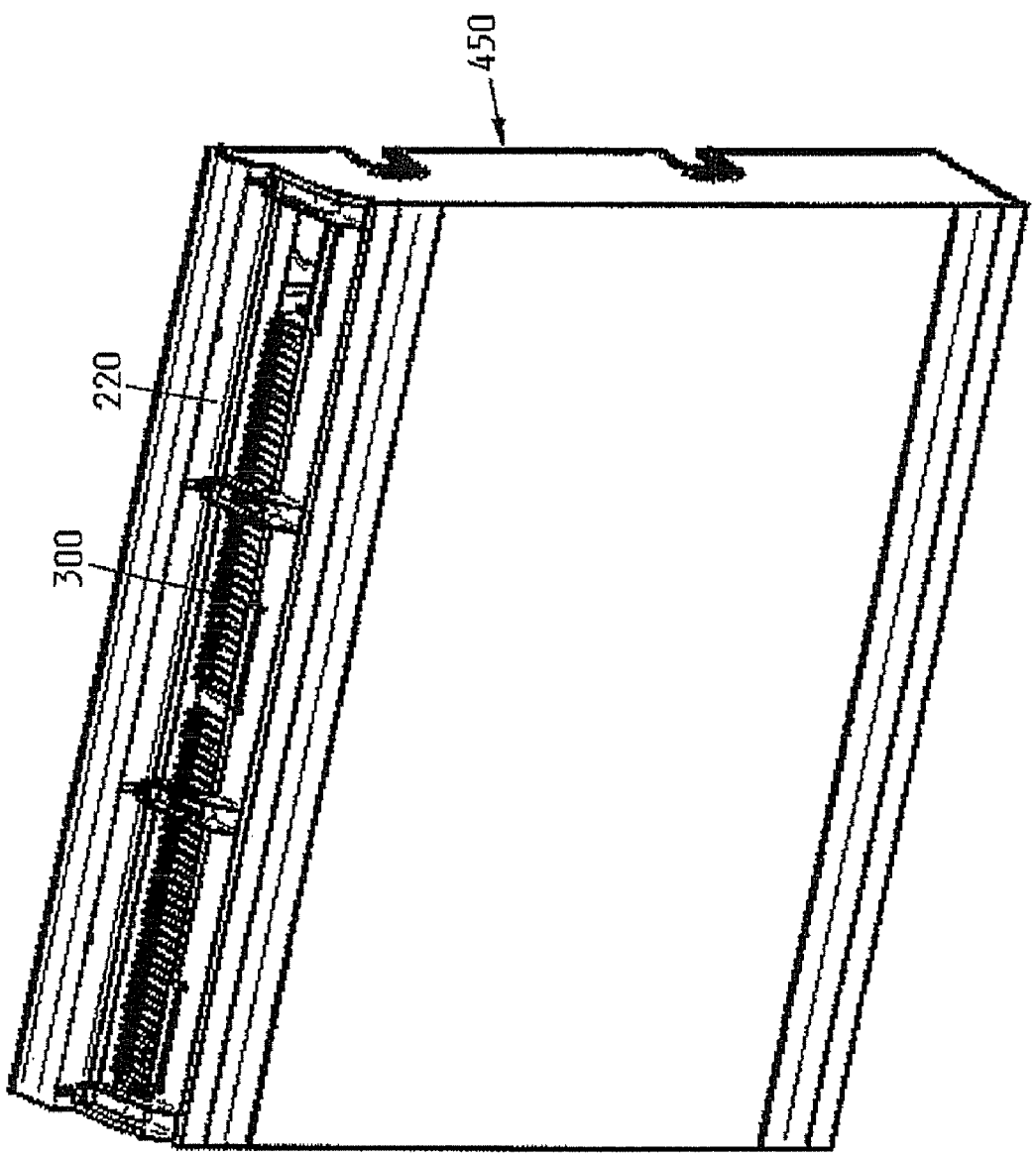
FIG. 25 shows the cover of FIG. 23 fixed to the assembly of FIG. 19.

The cover 450 of the heat exchange element 100 of FIG. 1 is shown in perspective in FIG. 23 and in a technical drawing in FIG. 24. The cover 450 is fixed to the whole formed by the wall mount 220 and the technical part 300, as shown in FIG. 25. To this end the cover 450 comprises protrusions 401, 402 at the top and at the bottom, which respectively snap-fit into grooves 317 on the technical part 300 and grooves 203 on the wall mount 220. The cover 450 does not have fins or air intake openings at the bottom, since these are provided on the wall mount 220, but the space 404 for a possible ventilator is provided.

In the following the common parts of the covers 400, 450 are described.

The cover 400, 450 is preferably constructed in a non-heat conductive material, for example a plastic or composite material, and is preferably constructed by means of an injection moulding technique in a mould. The front 403 of the cover can possibly be provided with a decoration 405-409, such as for example a relief, a photograph, a drawing etc. The relief can for example be formed by woodwork, ceramic or porcelain tiles, a figure in the plastic, an inset cast in tin or the like. In the case of a photograph this can for example be pre-printed onto a film, which is subsequently placed in the mould upon injection moulding the cover 400, 450. As a result, the photographs are provided with a scratch resistant coating. As shown in the FIGS. 35 and 36 this decoration 405-409 can be provided anywhere on the front side 403 of the cover 400, 450 or even take up substantially the whole of the front side 403. The cover itself can be constructed in any thinkable shape and any thinkable colour, as it has rather a decorative and protective function and the technical function of the heat exchange element is provided by the technical part 300.

Figure 26:
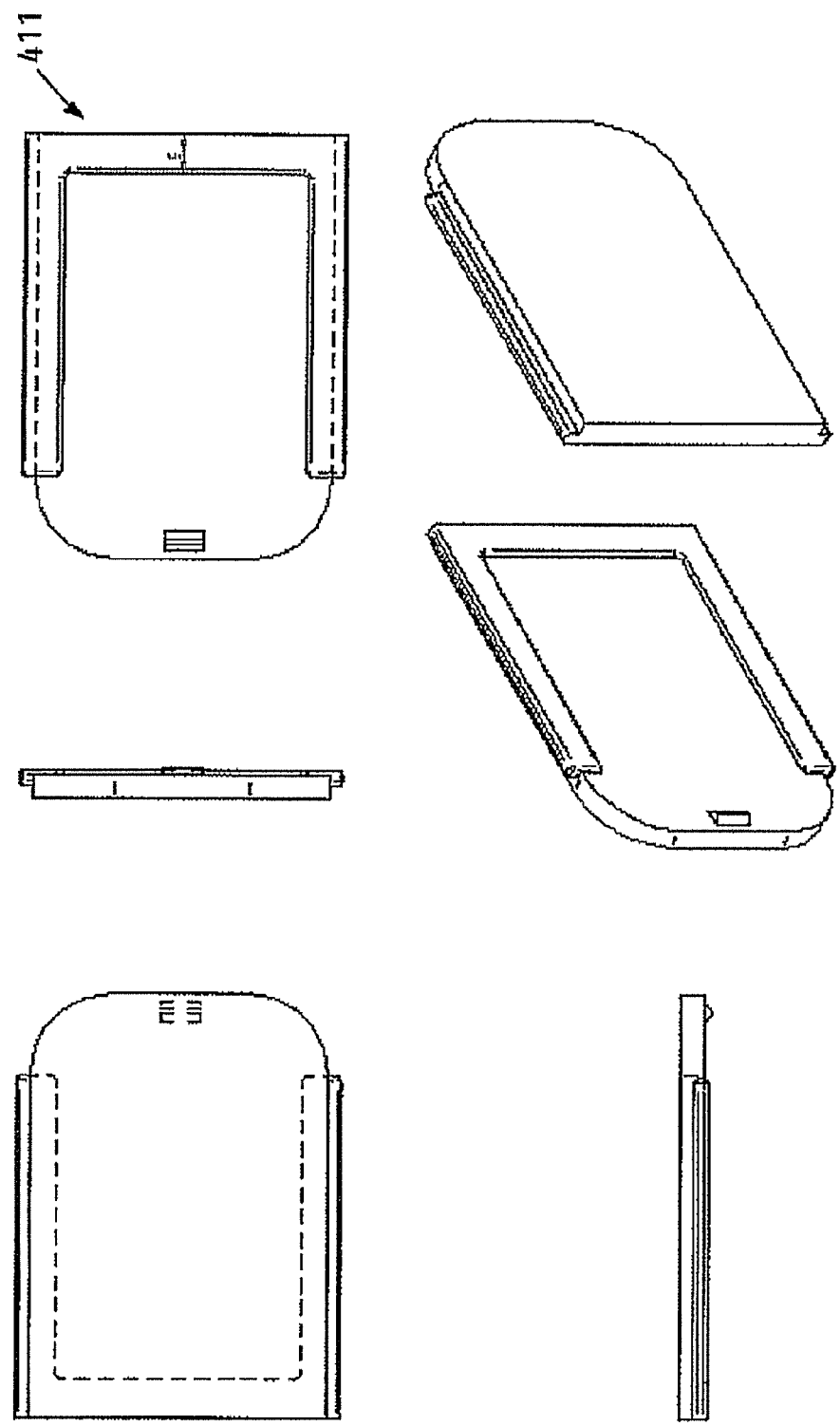
FIG. 26 shows closure elements for closing off cut-outs in the cover when not in use.

On the lateral sides 101-102, 161-162 each time two cut-outs 410 are provided. These can be used to bring the heat exchange fluid by means of ducts to for example a second, adjacent heat exchange element 100 or an air humidifying unit 560, or for electrical conductors from a control unit 500 to the control valve on the supply duct of the heat exchange fluid and to the ventilator. When these cut-outs are not used, they can be closed off by means of fitting closure elements 411, which are shown separately in FIG. 26.

Figure 27:
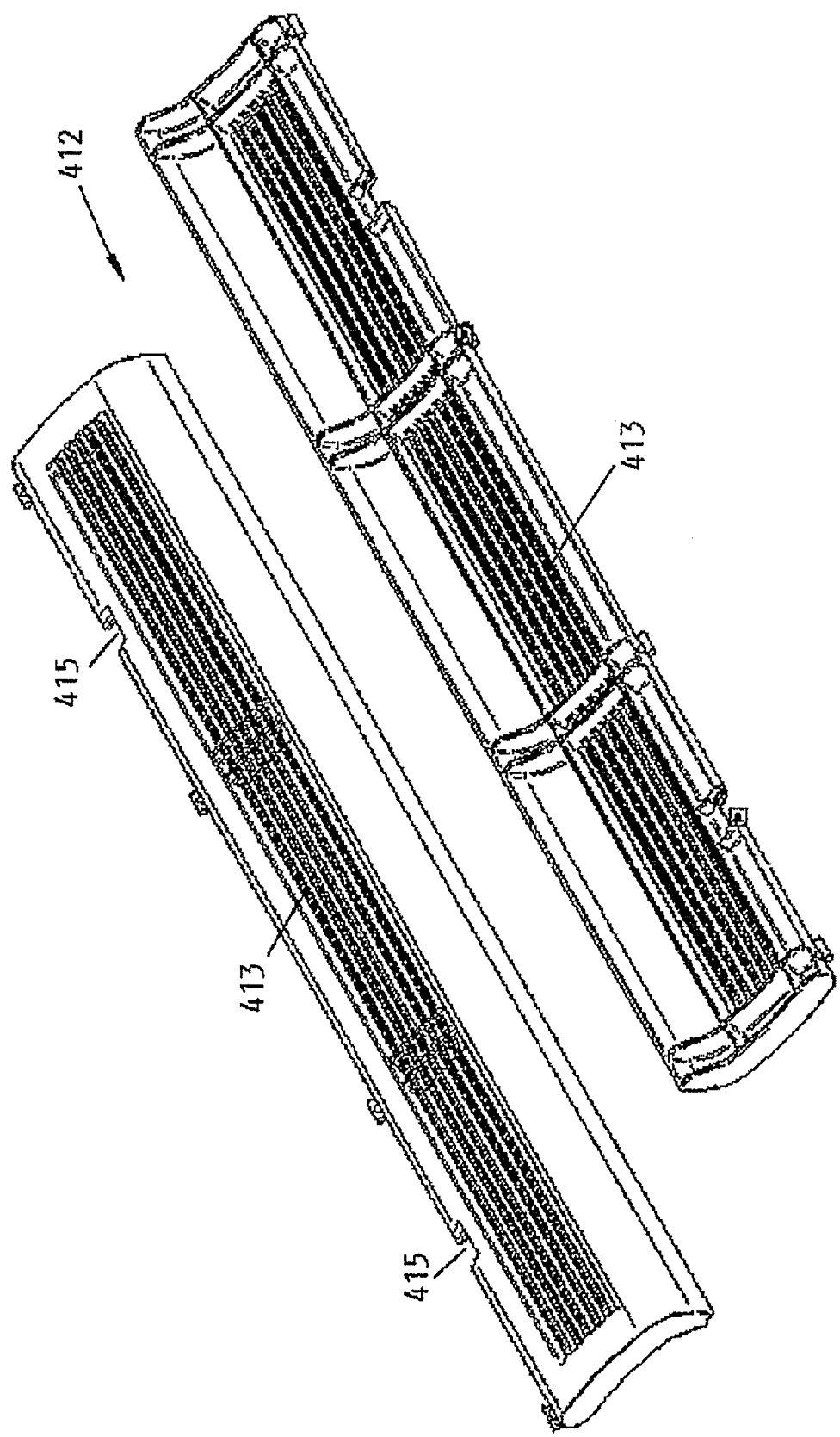
FIG. 27 shows a cap part for the covers of FIGS. 20 and 23 in perspective view.
Figure 28:
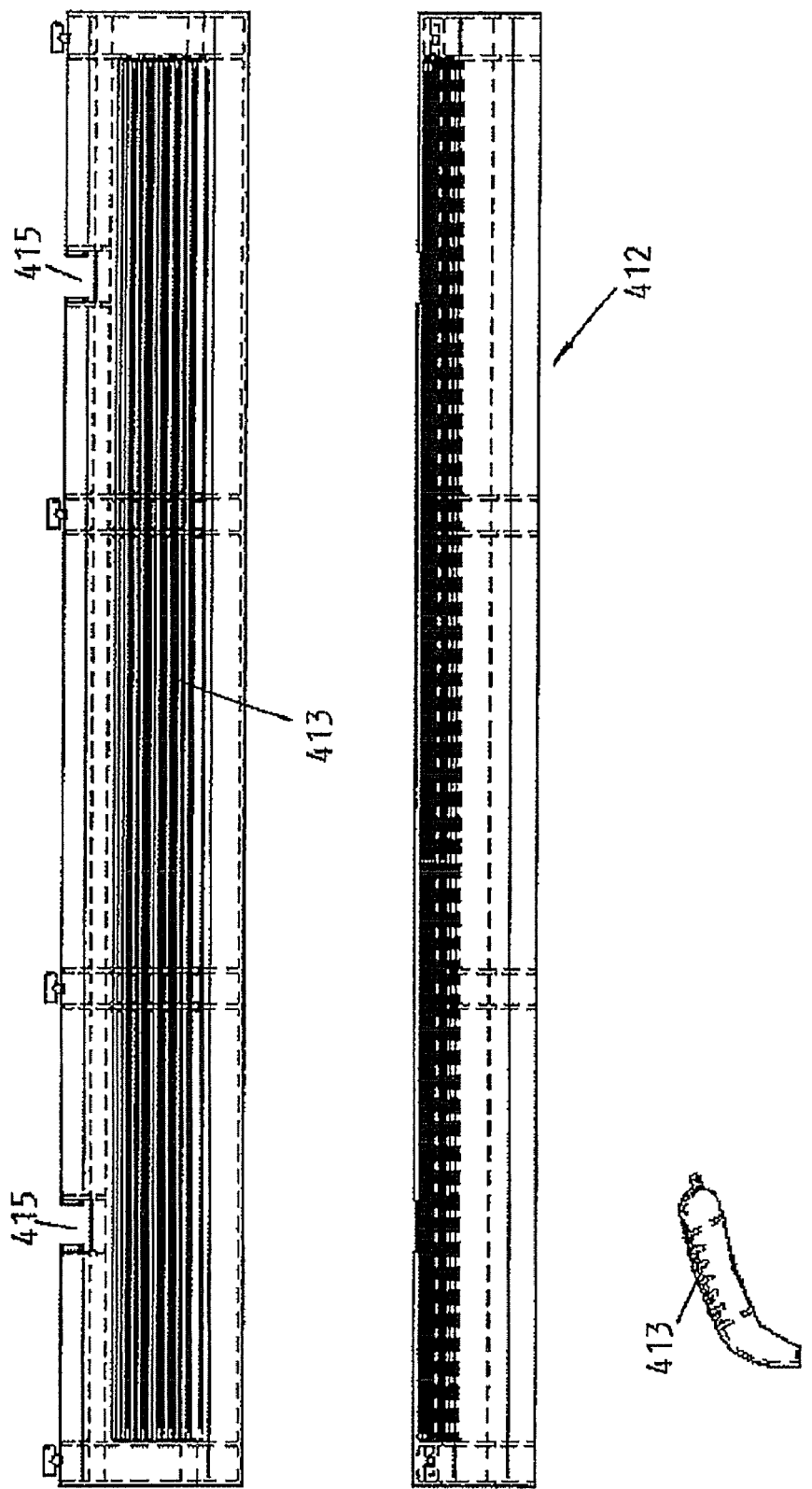
FIG. 28 shows the cap part of FIG. 27 in a technical drawing.

The cover 400, 450 comprises a cap part 412 on top, which is shown separately in perspective in FIG. 27 and as technical drawing in FIG. 28. This can part comprises fins 413, between which openings are located for the outflow of air from the technical part 300 into the room. The fins 413 are slanted towards the front to direct the air flow into the room. The cap part 412 can be opened or removed from the cover 400, 450 for access to the technical part 300 if desired. In order to prevent undesired access, the cap part is locked in the closed position by means of locking systems, for example a resilient element 414 that has to be pushed away in order to open the cap part 412, separately shown in FIG. 29. These locking systems 414 are mounted in cut-outs 415, which are specifically provided for this purpose and are located on both ends of the cap part 412. These cut-outs 415 are so far apart that the locking systems 414 are too far apart for being simultaneously operated by a child.

Ventilator

Figure 30:
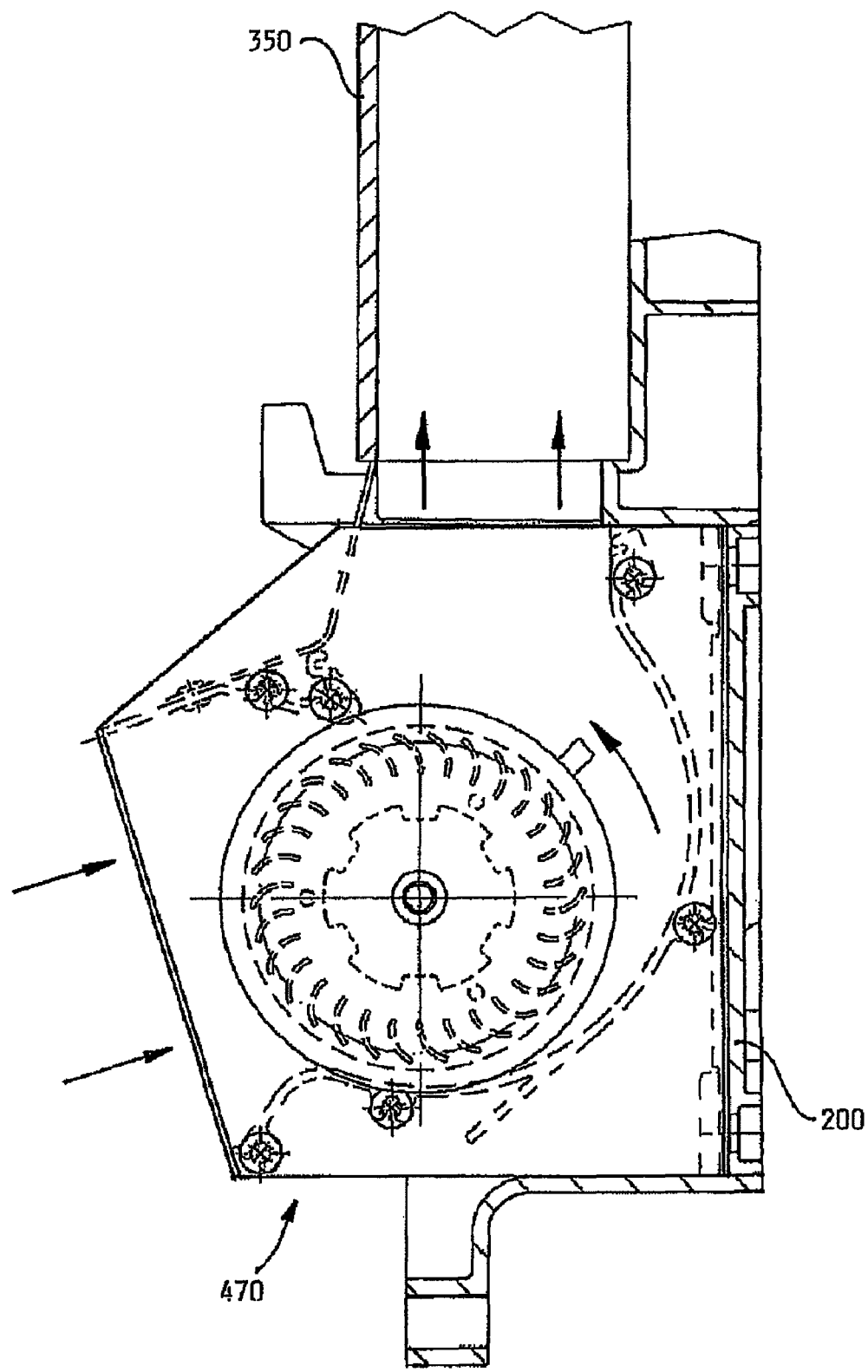
FIG. 30 shows a ventilator which can be used in the eight embodiment of the heat exchange element of FIG. 8.
Figure 31:
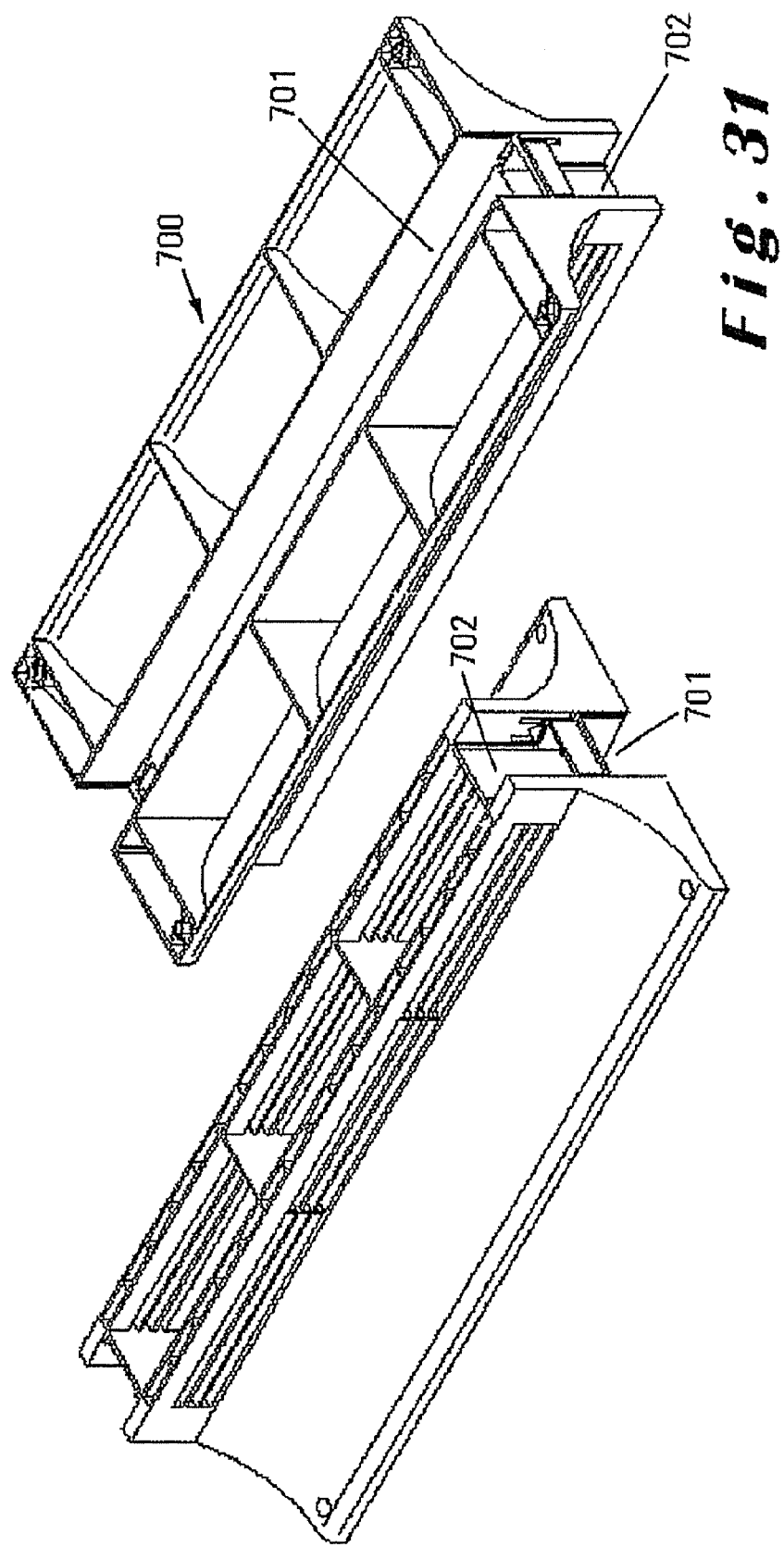
Figure 33:
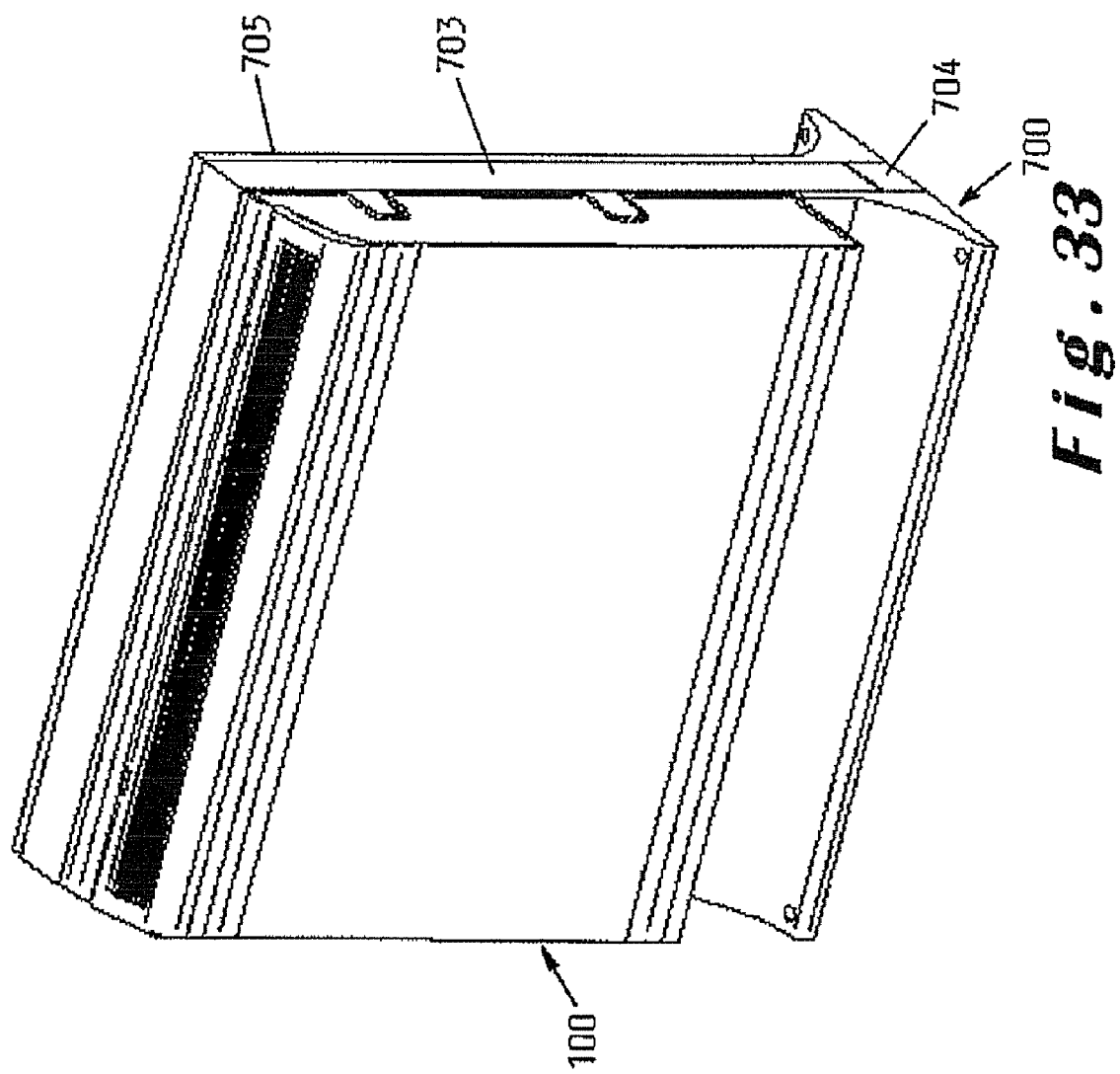
Figure 34:
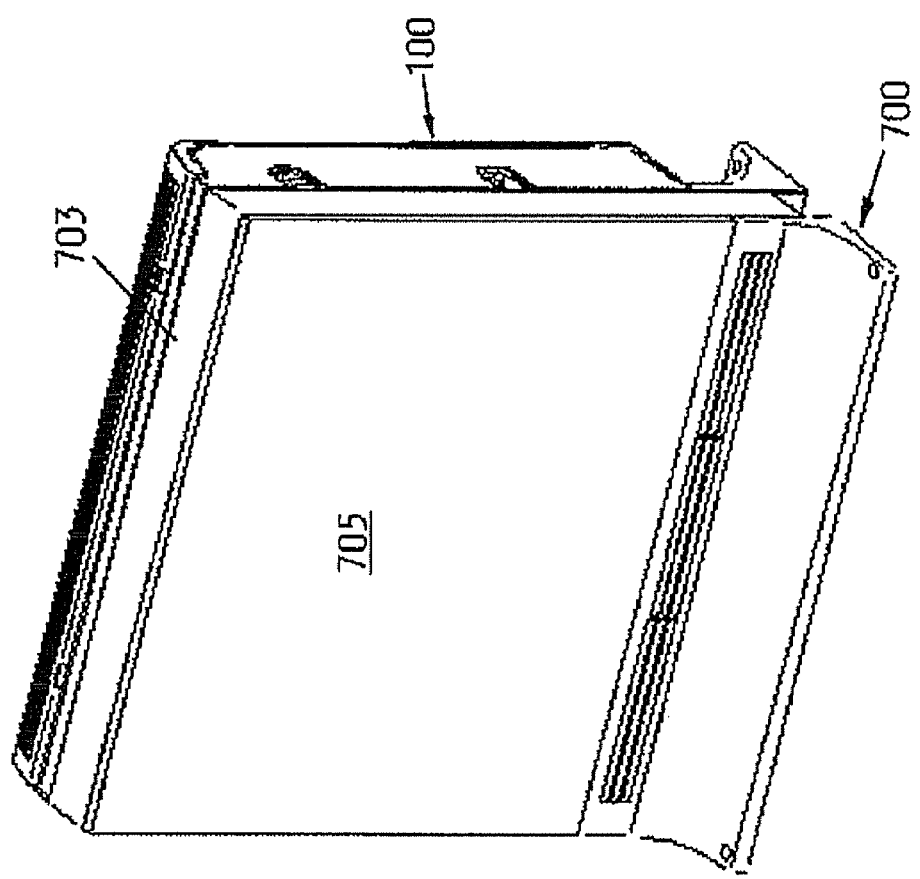

The ventilator 470, shown schematically in FIG. 30, is placed in the space 208, 404 at the bottom in between the wall mount 200 and the cover 400. The ventilator is seated in a separate housing which substantially completely fills this space, so that it also forms a modular part of the system. The housing is shaped such that sufficient pressure is built up, so that the drawing in of air towards the technical part 300 occurs in a fluent movement, which prevents vortexes and can guarantee an optimal heat exchange at the technical part 300 and also in case of cooling brings the cooled air high enough into the room for achieving a balanced cooling.

The ventilator 470 is preferably driven by means of a DC motor provided with a suitable current converter, because a DC motor in the event of blockage due to a foreign object which becomes located in the ventilator through the fins comes to a standstill without damage and does not cause an overcurrent in the current supply. Furthermore the motor returns to normal operation about 3 sec. after the blockage is removed. An AC drive is of course also possible, provided that suitable safety measures are taken.

Foot and Stand

FIGS. 31-34 show an alternative embodiment, in which the heat 10 exchange element 100 of FIG. 1 is fixed onto a separate foot 700, i.e. not against a wall. The foot 700 is characterised by a space 701 at the bottom for throughput of cables and/or ducts and fixing parts 702 to which a vertical stand 703 is fixed. The heat exchange element 100 is fixed onto one side of the stand 703, which can be done by means of the same wall mount 220 as the one that is used for fixing against a wall, and a cover plate 705, for example provided with a decoration, is fixed onto the other side. Possibly also two heat exchange elements 100 can be fixed on both sides of the stand 703. The space 701 at the bottom of the foot 700 can be closed off on the sides by means of suitable closure elements 704.

ALTERNATIVE EMBODIMENTS

Figure 35:
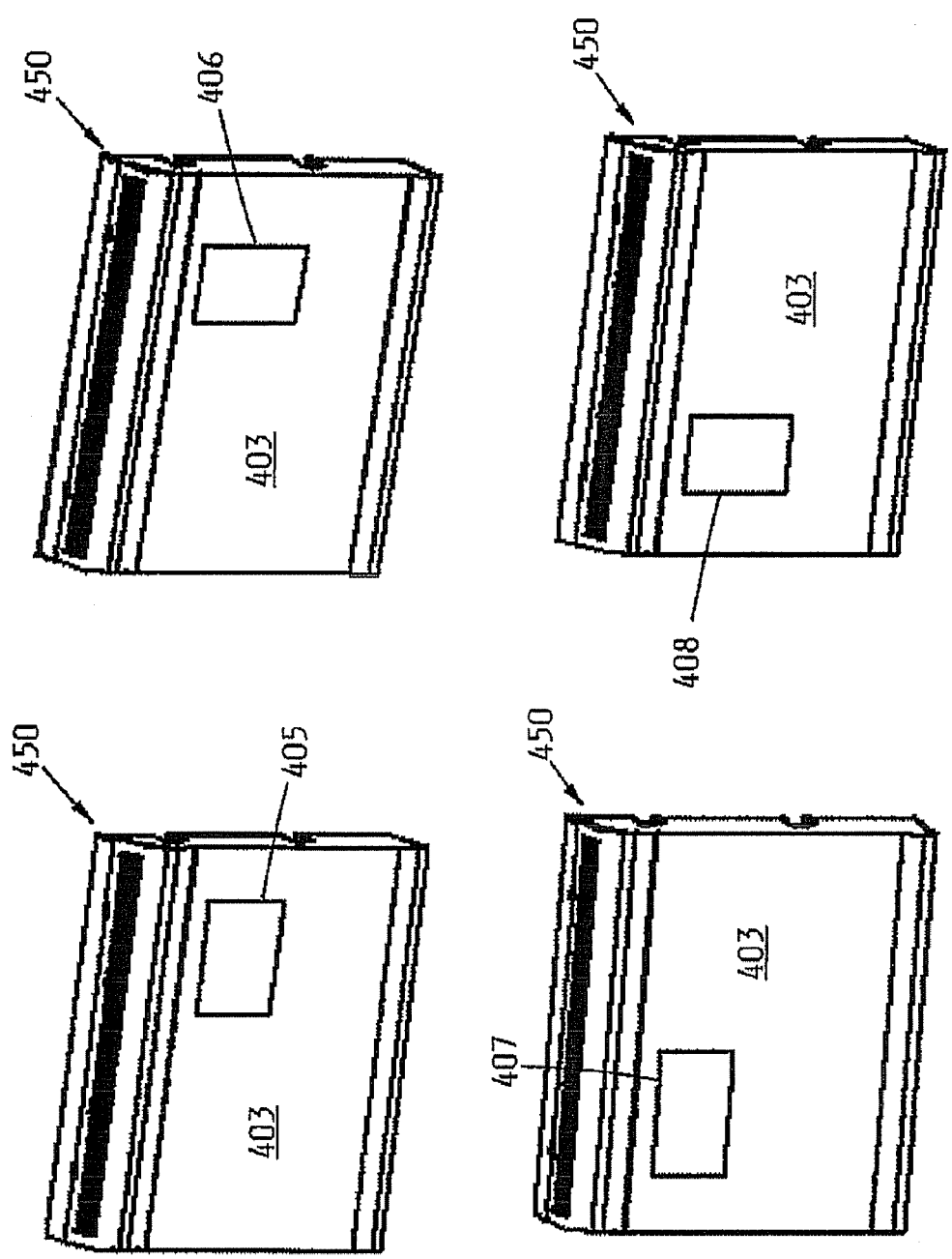
FIGS. 35 and 36 show possible covers for the heat exchange element FIG. 1, provided with a decoration.
Figure 36:
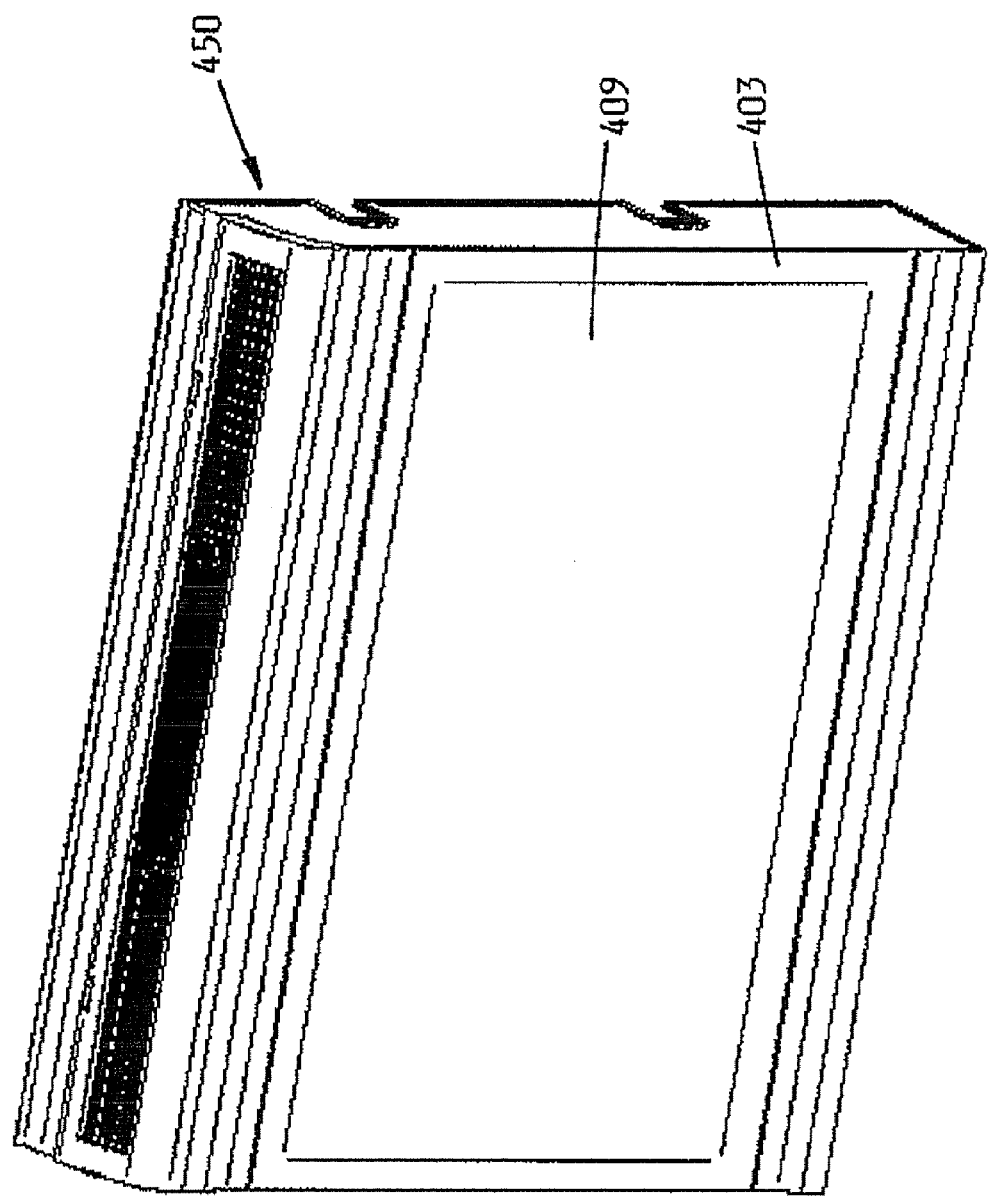
Figure 37:
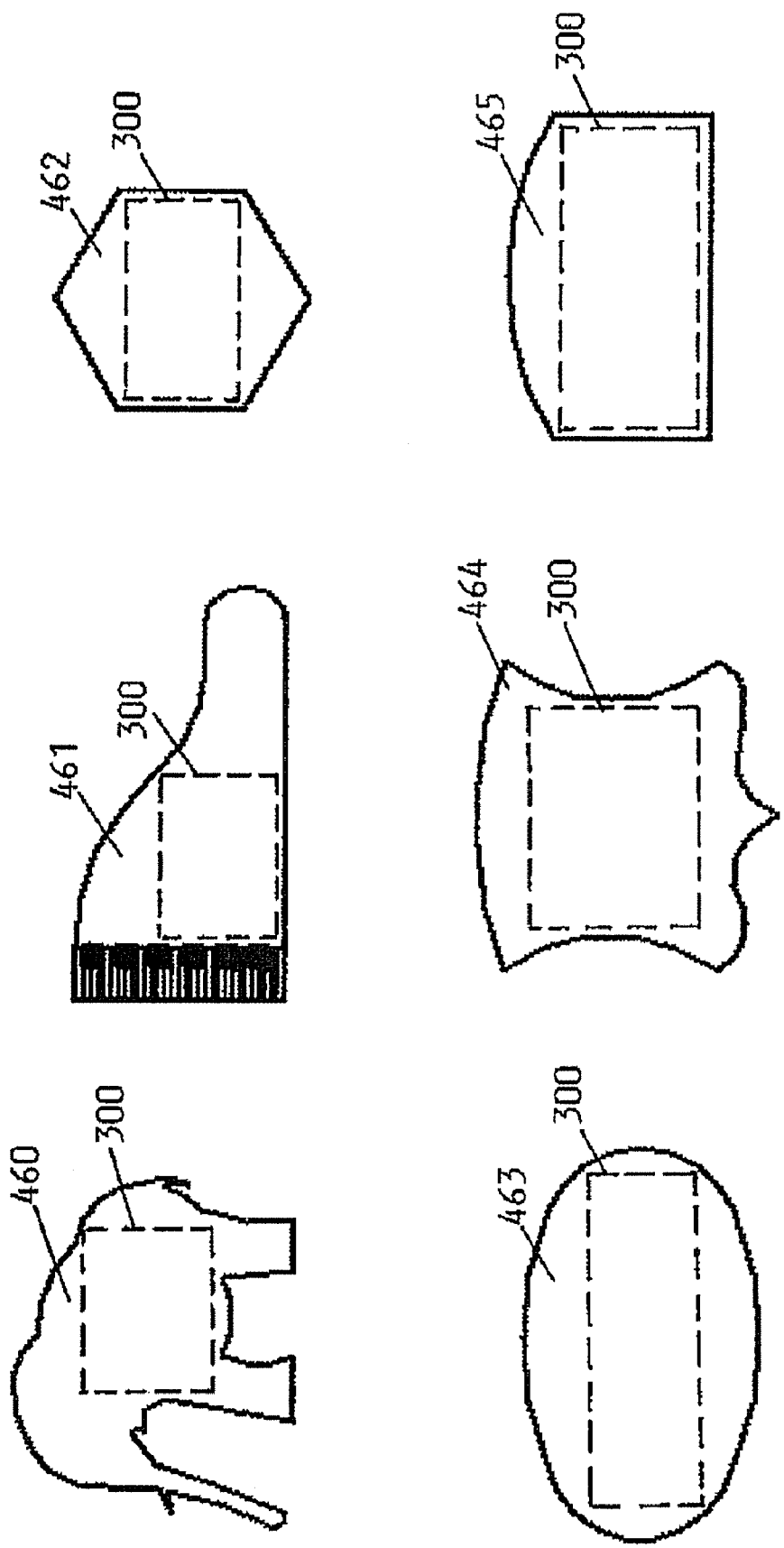
FIG. 37 shows a number of other possible decorative embodiments of covers.
Figure 38:
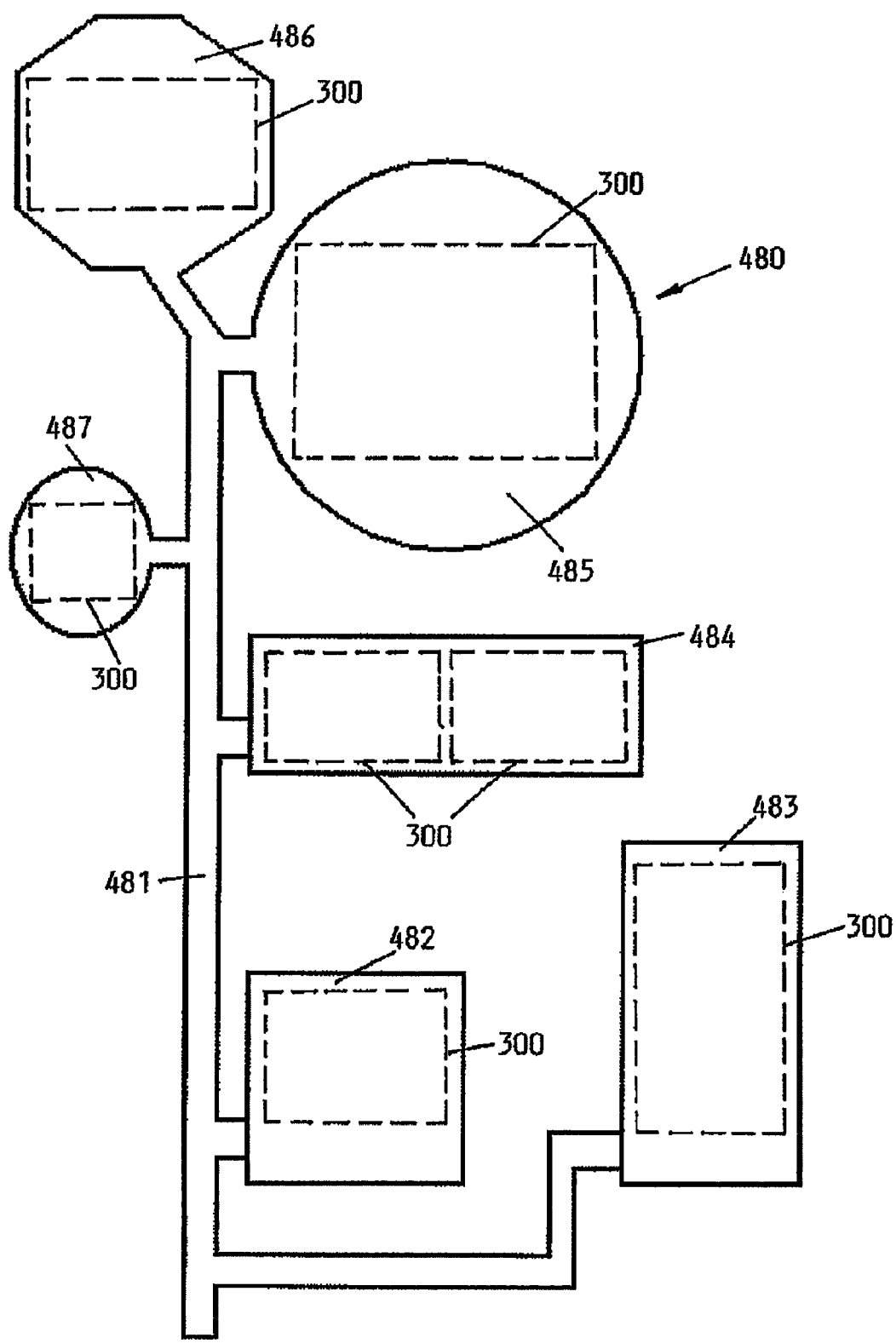
FIG. 38 shows a heat exchange, system according to the invention comprising a hollow pole with branches onto which each time heat exchange elements of different shapes are mounted.

FIGS. 35-38 show a number of alternative embodiments of heat exchange elements according to the invention, in which the decorative aspect is stressed. In FIGS. 35 and 36 it is shown how the front of the cover 450 of the heat exchange element 100 of FIG. 1 can be provided with a decoration 405-409, which can partly or substantially completely fill this surface and can be located in any random position on the front side 403. FIG. 37 shows a number of other possible decorative embodiments of covers 460-465, the underlying combination of technical part 300 and wall mount 200 being each time substantially the same and being shown in dotted lines. As a result, the covers shown are interchangeable, which forms an additional modular aspect of the invention. Alternatively the cover can also enclose multiple technical parts 300, such as is for example the case in the embodiment of FIG. 5. FIG. 38 shows what one could call a heat exchange statue 480. This heat exchange statue 480 comprises a hollow pole 481, preferably constructed in plastic, with branches onto which each time heat exchange elements 482-487 of different shapes are mounted. The ducts for supply and discharge of the heat exchange fluid extend on the inside of the pole 481 and the branches to the technical parts 300 in the different heat exchange elements 482-487, as well as electrical connections.

FIGS. 53-56 show alternative embodiments of heat exchange elements according to the invention, in which decorative lighting is integrated, for example in the form of a number of lamps or LEDs 490, 491, 492, 493.

Add-on Elements

Figure 39:
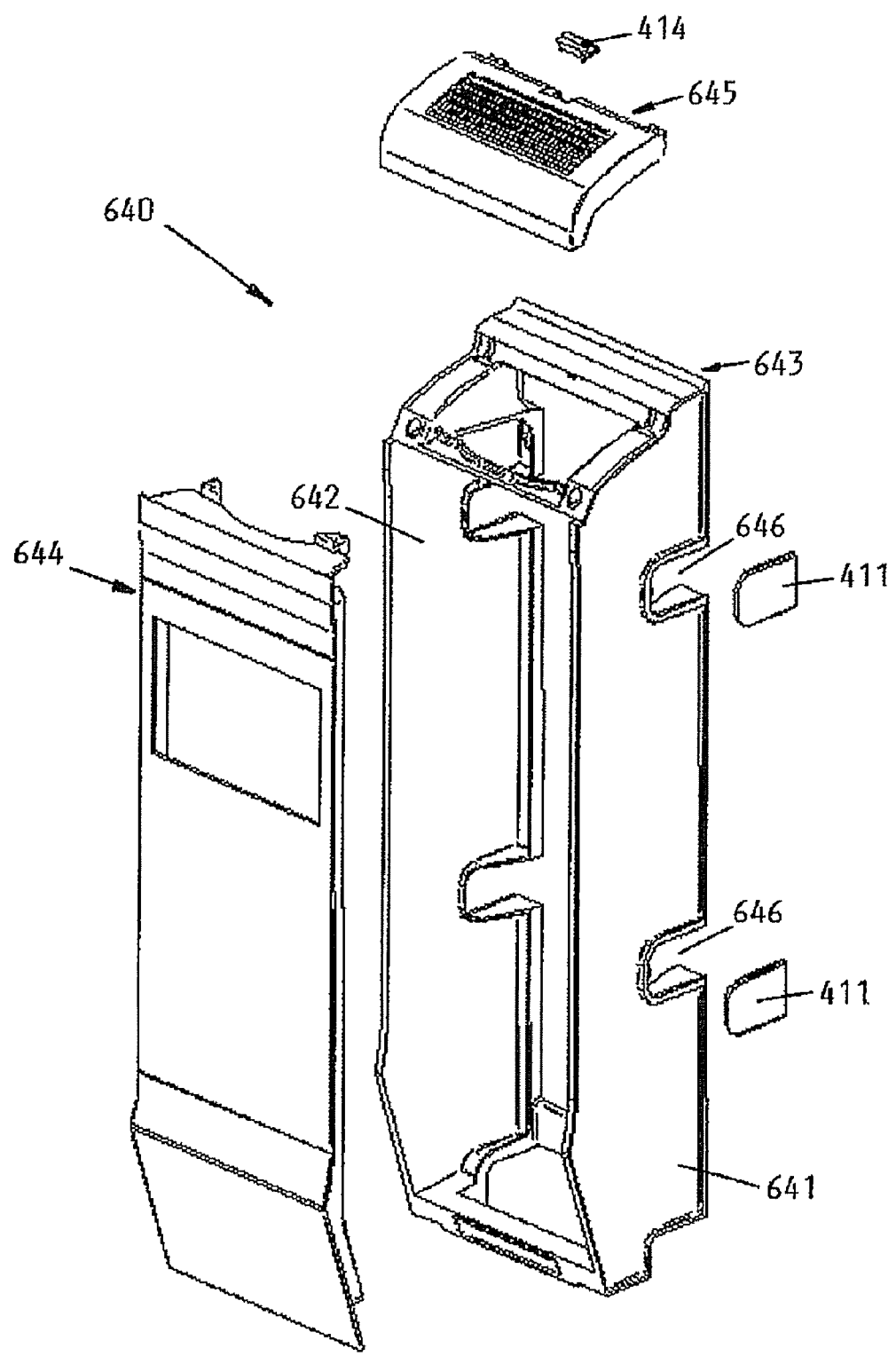
FIG. 39 shows an exploded view of the control unit of FIG. 8.

By means of FIGS. 39-48 it is explained how the add-on elements, like the heat exchange elements, are modularly built up from parts which are partly the same for different possible embodiments and partly different depending on the desired functionality. FIG. 39 shows how each add-on element, in this case the control unit 640 of FIG. 8, is composed of a frame 643, a front plate 644 and a cap part 645. The frame 643 and the cap part 645 are common for a number of add-on elements, while the front plate 644 is specific for each add-on element.

The cap part 645 is removably mounted on the frame 643 and is locked in the closed position by means of the element 414 which is also used in the cap part 412 of the heat exchange element 160. The frame has each time two cut-outs 646 on its lateral sides which correspond to the cut-outs 410 on the cover 400 of the heat exchange element 160. These can be used to bring the heat exchange fluid by means of ducts to/from the heat exchange element 160 from/to the add-on element 640, or for electrical conductors from the control unit 640 to the control valve on the supply duct of the heat exchange fluid and to the ventilator. When these cut-outs 646 are not used, they can be closed off by means of the closure elements 411, like with the cover 400.

Figure 40:
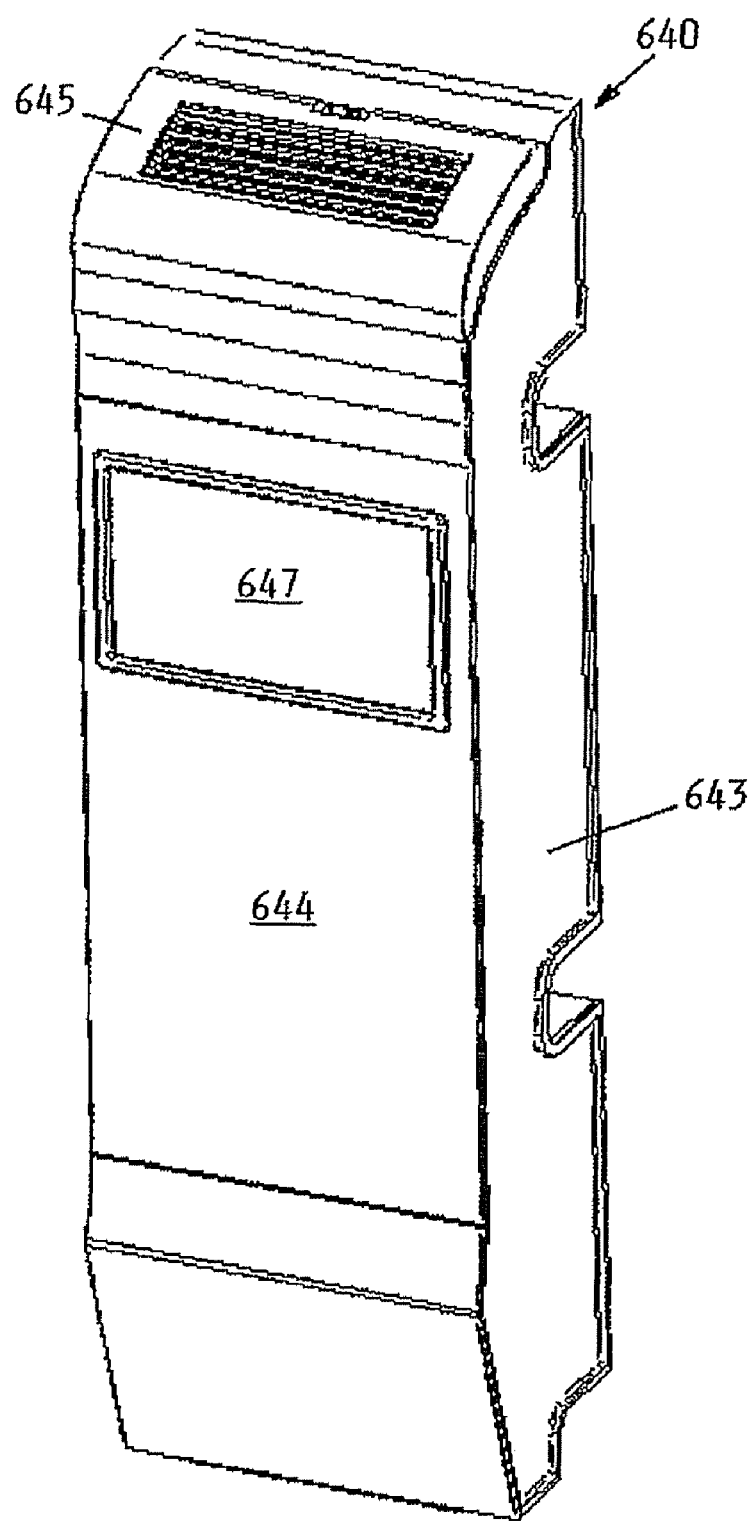
FIG. 40 shows a perspective view of the control unit of FIG. 8.
Figure 57:
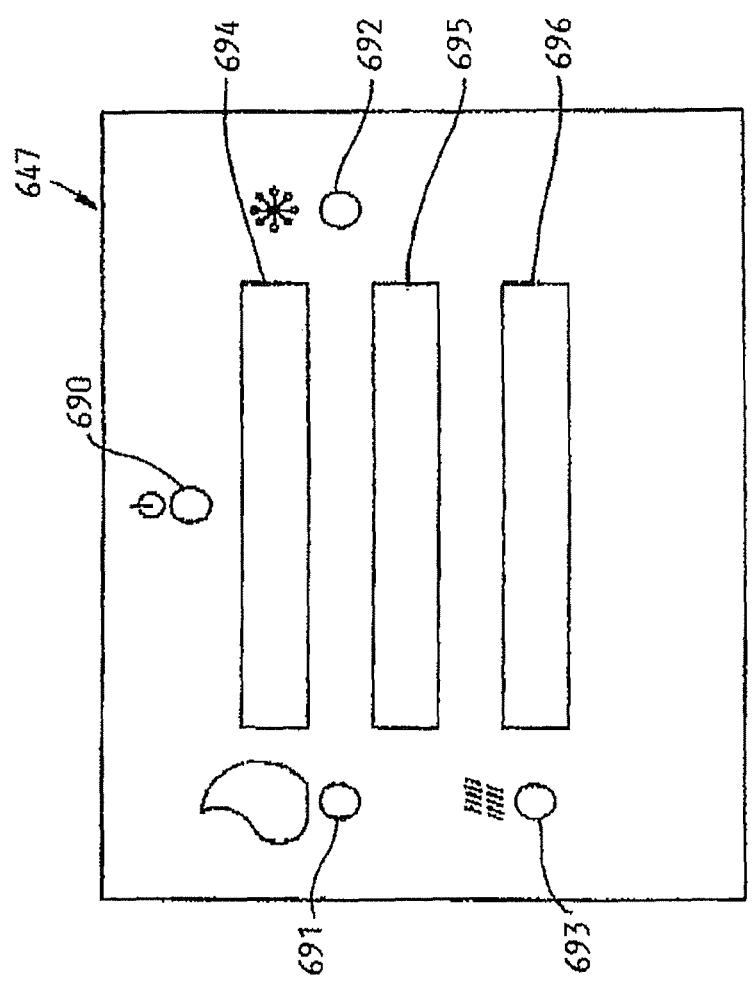
FIG. 57 shows a front view of a display of a control unit according to the invention.

In the control unit 640, shown in FIG. 40, the front plate 644 comprises a display 647 and on the inside the electronics for control. For example the following can be shown on the display 647 (see FIG. 57): an on/off indicator 690, a heating indicator 691, a cooling indicator 692, a humidifying indicator 693, a first numerical part 694 for the current room temperature, a second numerical part 695 for the desired/set room temperature and a third numerical part 696 for the current humidity. Setting the control unit can occur by means of suitable push buttons or the like on the front plate, possibly on the inside to limit accessibility for children, or by means of a remote control.

Figure 41:
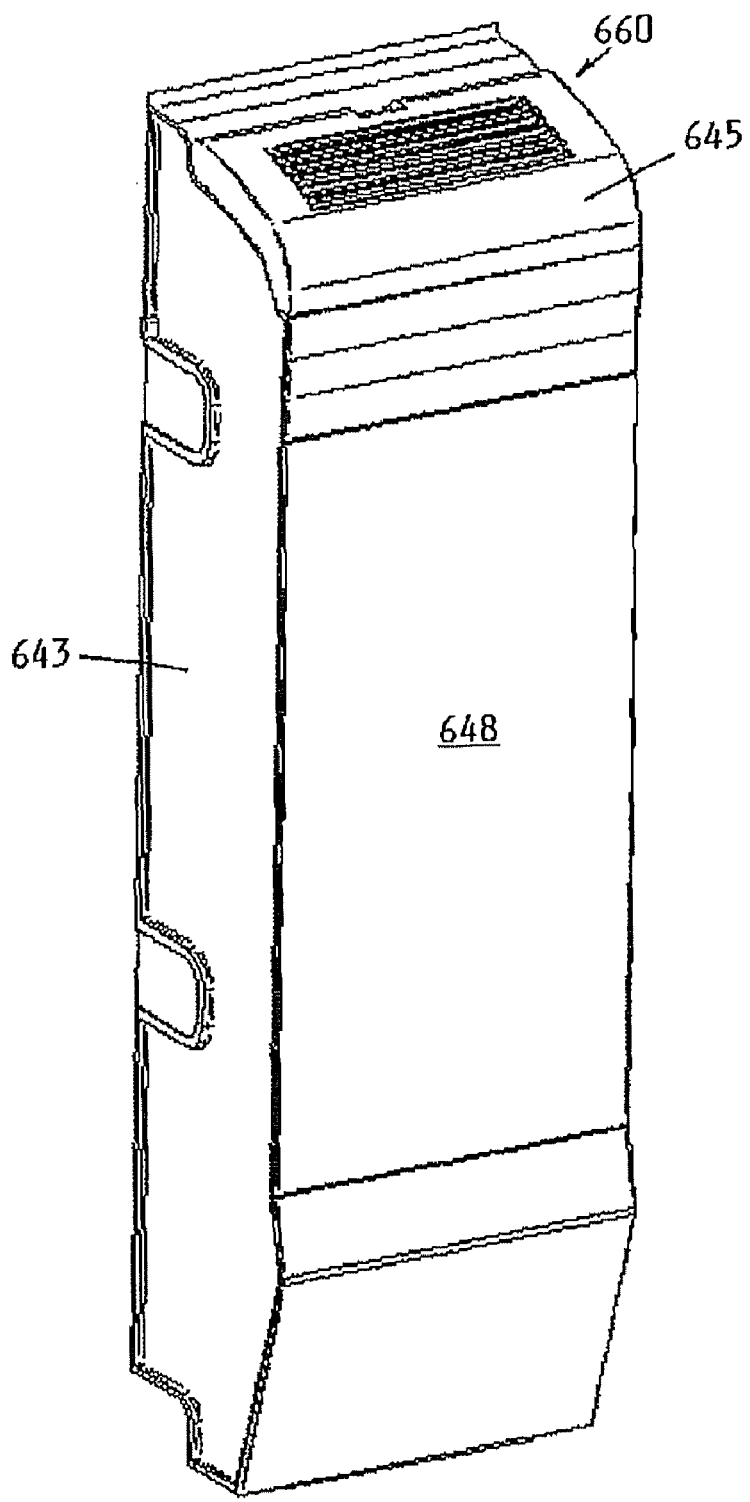
FIG. 41 shows a perspective view of an air humidifying unit, usable as add-on element with the heat exchange element of FIG. 8.

The air humidifying unit 660, shown in FIG. 41 has a different front plate 648 with a reservoir on the inside, which can be heated by means of the heat exchange fluid or in a different way, for example by means of an electrical resistance. The air humidifying unit can for example be controlled by a control unit 640 and (if the heat exchange fluid is water) be coupled to the supply duct with an automatic filling system. The water level is then controlled between two levels, with a sensor for the minimum level and a sensor for the maximum level. The minimum level is chosen such that the electrical resistance in the lower part of the reservoir stays under water at all times.

Figure 42:
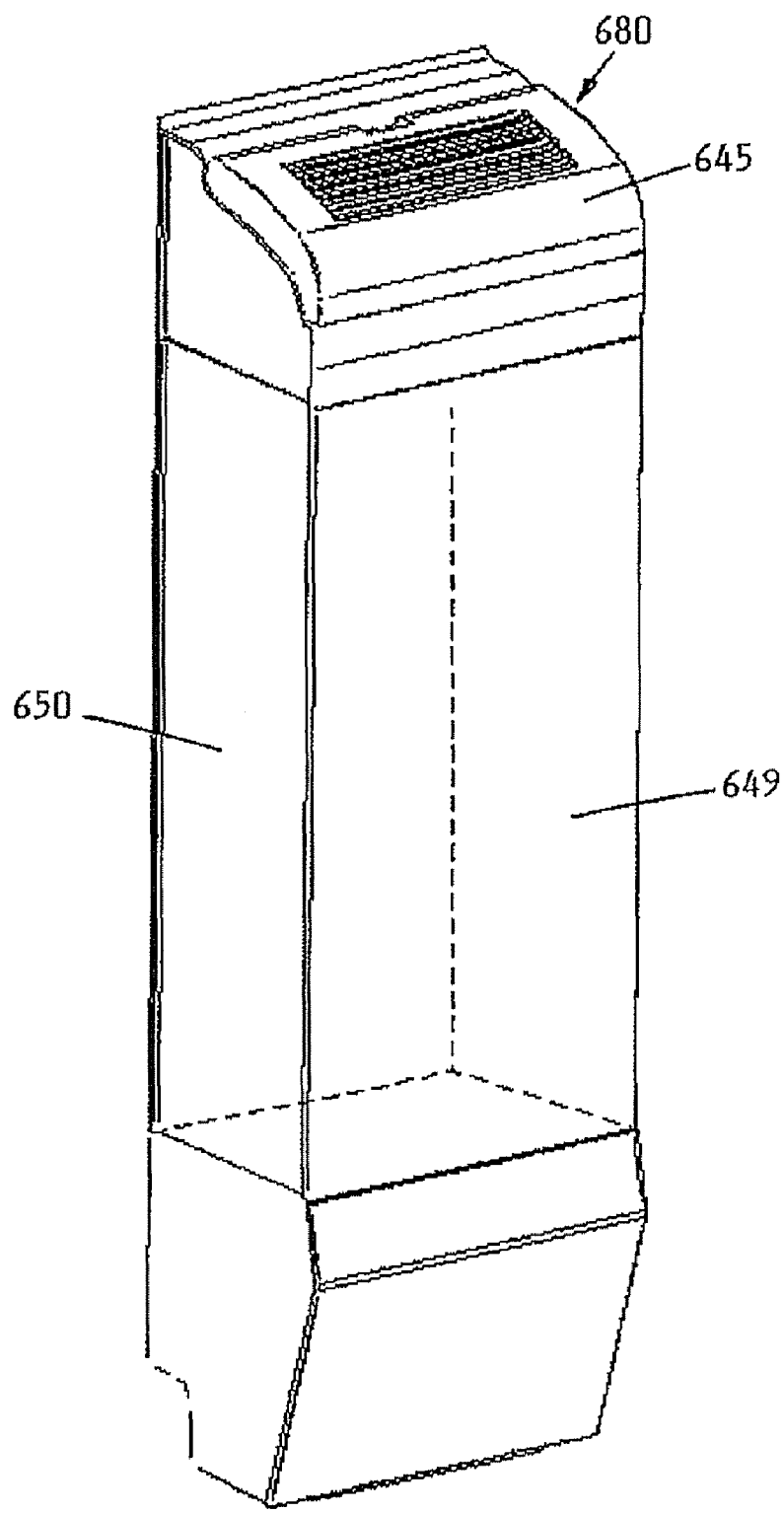
FIG. 42 shows a perspective view of a light unit, usable as add-on element with the heat exchange element of FIG. 8.

The light unit 680, shown in FIG. 42 has a front plate 649 which is at least partly transparent. As shown also the frame 650 can be made transparent correspondingly. The light unit 680 can for example be provided with three lamps which respectively spread foot light, reading light and emergency light. Electricity supply with battery is provided in the bottom part of the light unit, such that in case of interruption of the mains voltage the emergency light is activated.

Figure 43:
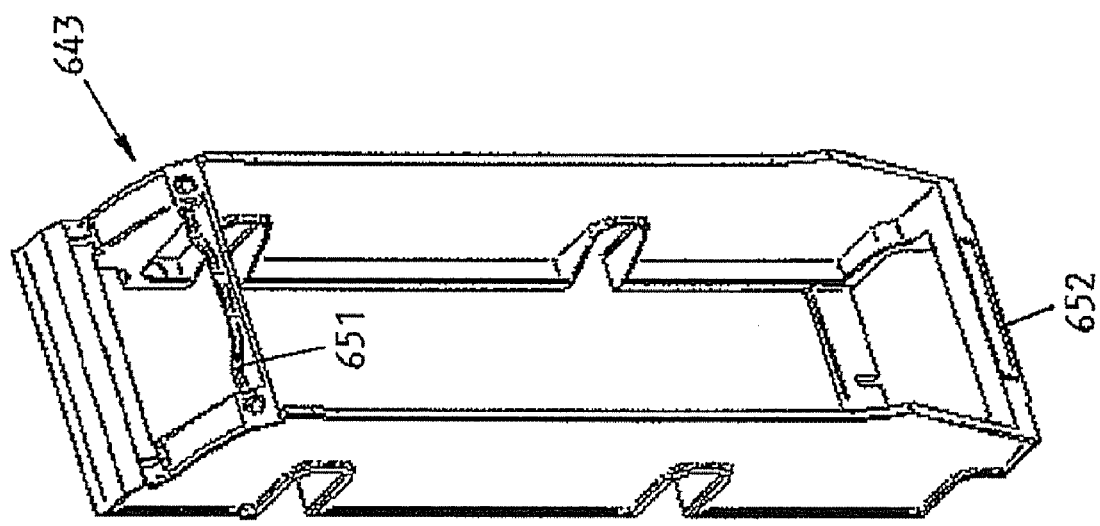
FIGS. 43 and 44 respectively show a perspective view and a technical drawing of a frame as modular part of the add-on elements of FIGS. 39-42.
Figure 44:
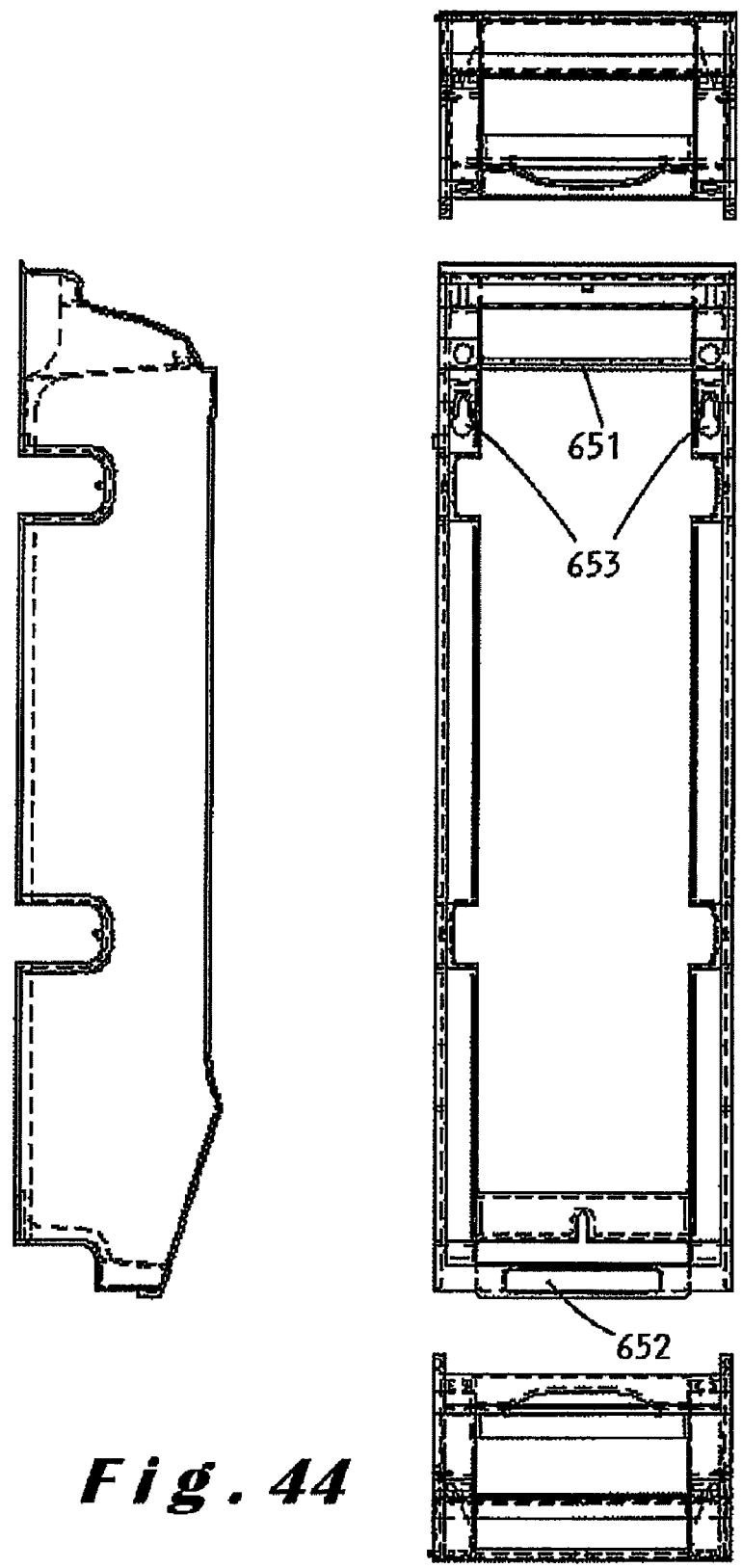

FIGS. 43 and 44 show the frame 643 in detail, respectively in perspective and in a technical drawing. On top and at the bottom fixing elements 651, 652 are provided, complementary to fixing elements 654, 655 on the front plate 644, 648, 649. Further, suspension holes 653 are provided, by means of which the frame 643 is suspended on a wall.

Figure 45:
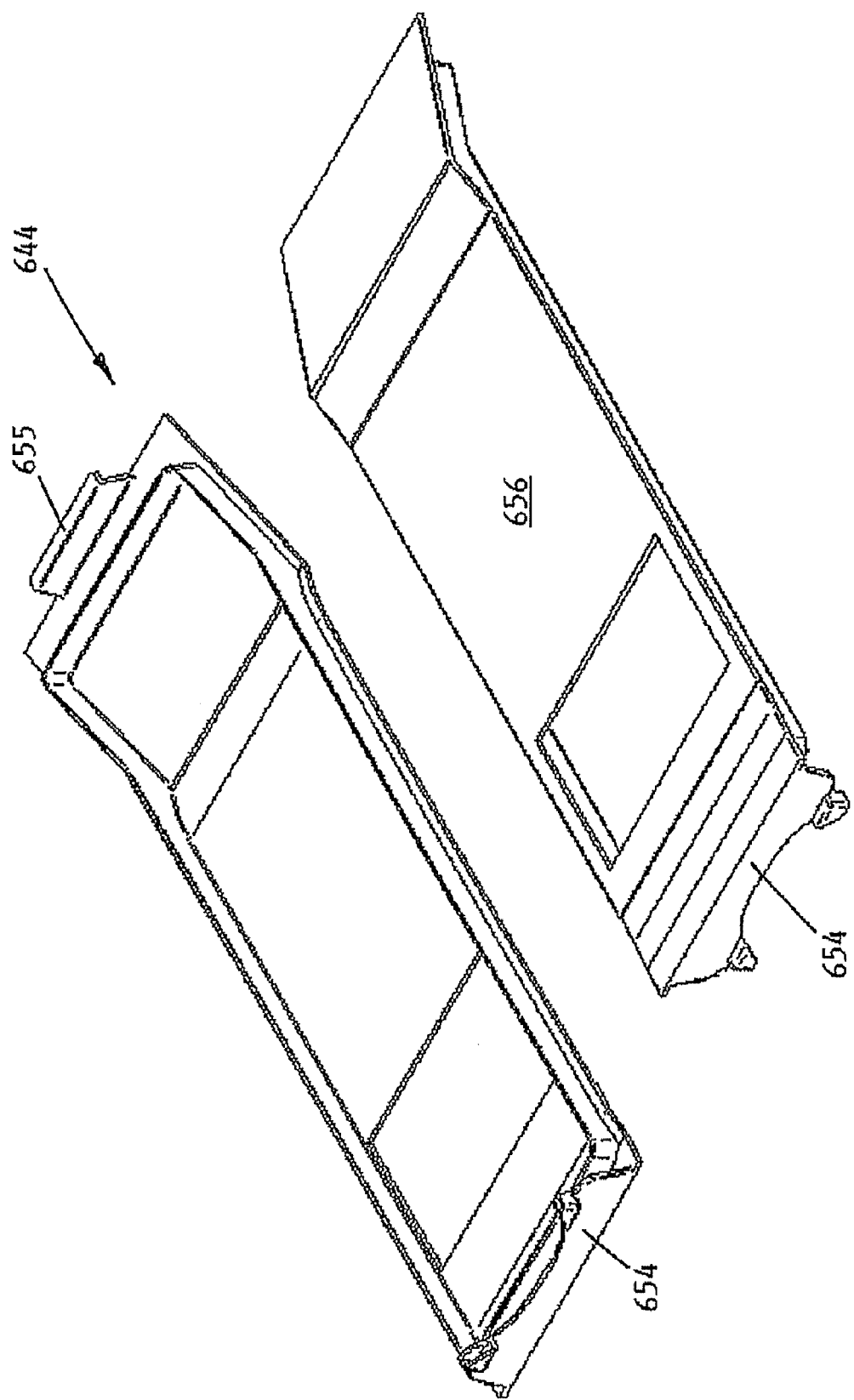
FIGS. 45 and 46 respectively show a perspective view and a technical drawing of the front plate of the control unit of FIG. 40.
Figure 46:
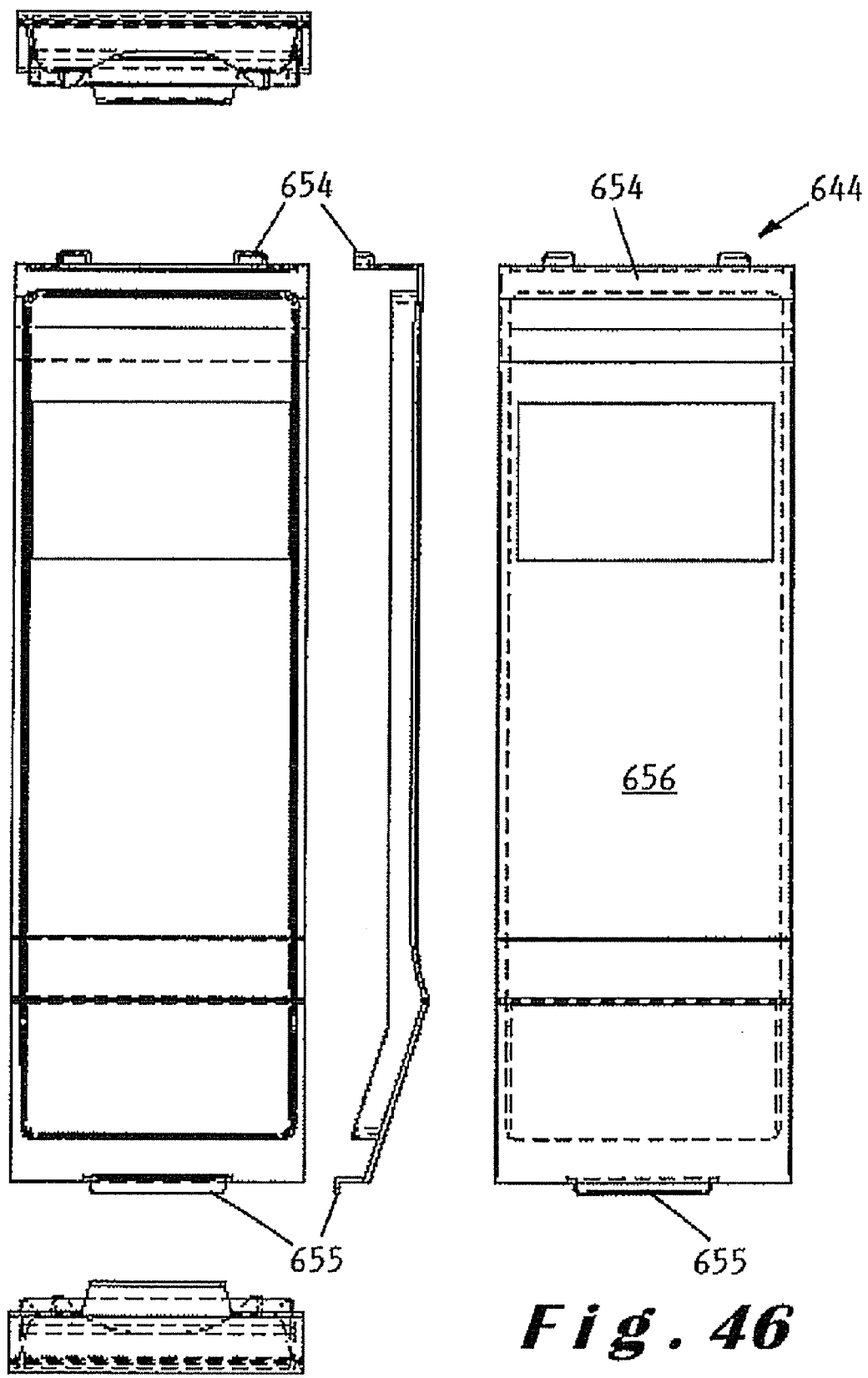

FIGS. 45 and 46 show the front plate 644 in detail, respectively in perspective and in a technical drawing. The fixing elements 654, 655 cooperate with those on the frame 643 to hold the front plate 644 on the frame. In the embodiment shown the front plate 644 can be tilted upwards, for example when the user wants to set the control-unit 640. The front side 656 of the front plate can also be provided with a decoration.

Figure 47:
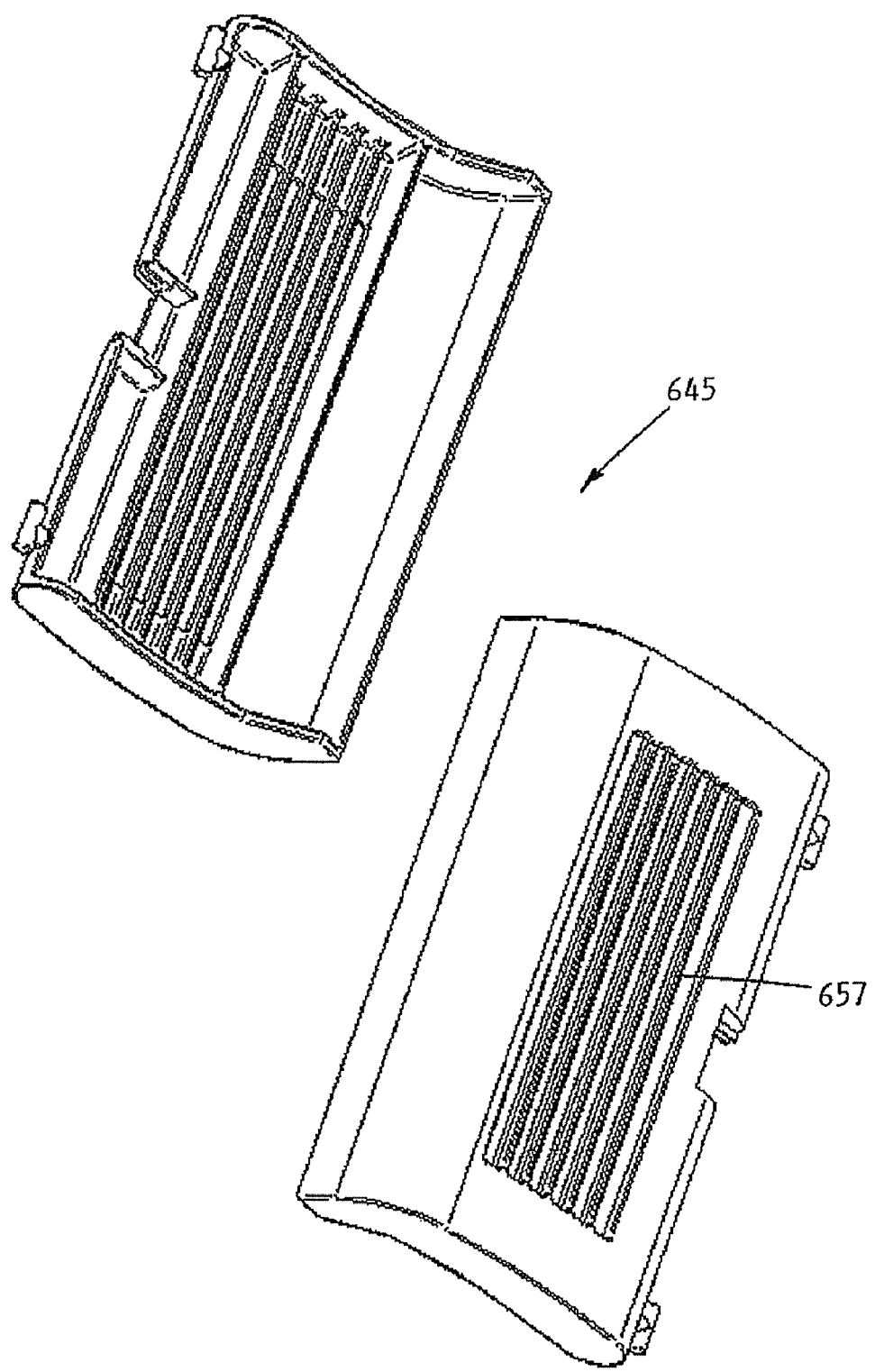
FIGS. 47 and 48 respectively show a perspective view and a technical drawing of the cap part of the add-on elements of FIGS. 39-42.
Figure 48:
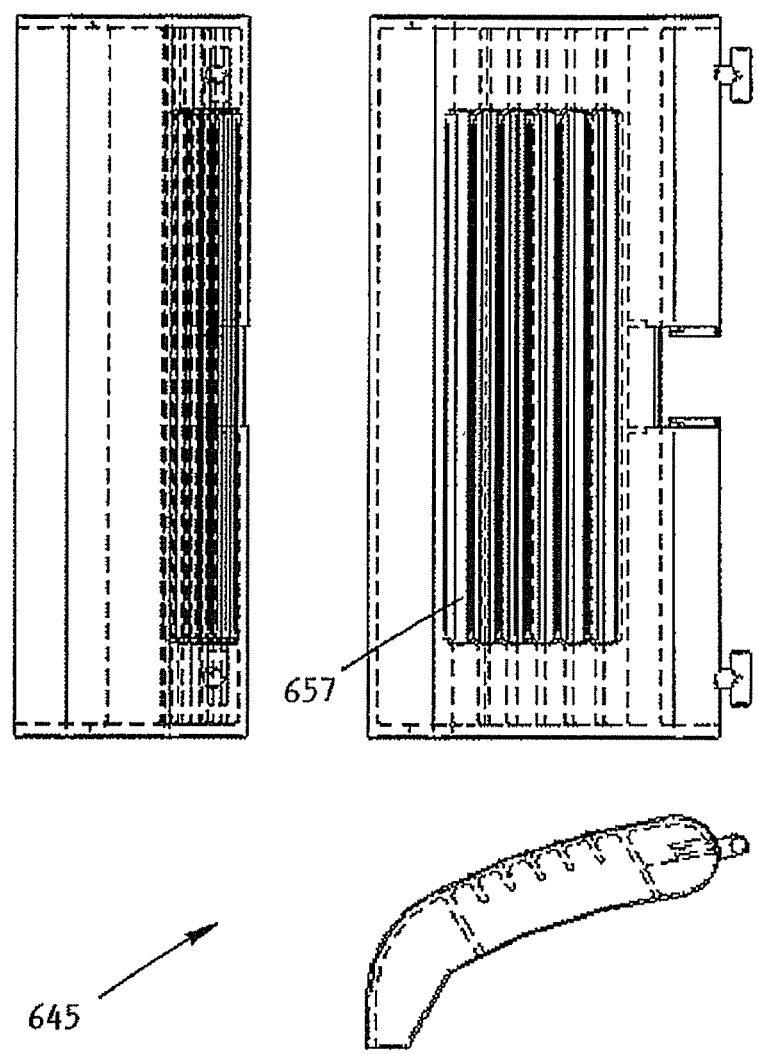

FIGS. 47 and 48 show the cap part 645 in detail, respectively in perspective and in a technical drawing. The fins 657 are in fact only useful in the air humidifying unit 660 for throughput of humidified air and in the light unit 680 for discharge of heat generated by the lamps. It is however preferred to apply this cap part 645 also in the control-unit, because its shape corresponds to that of the cap part of the heat exchange element 160.

Central Heating Installation

Figure 49:
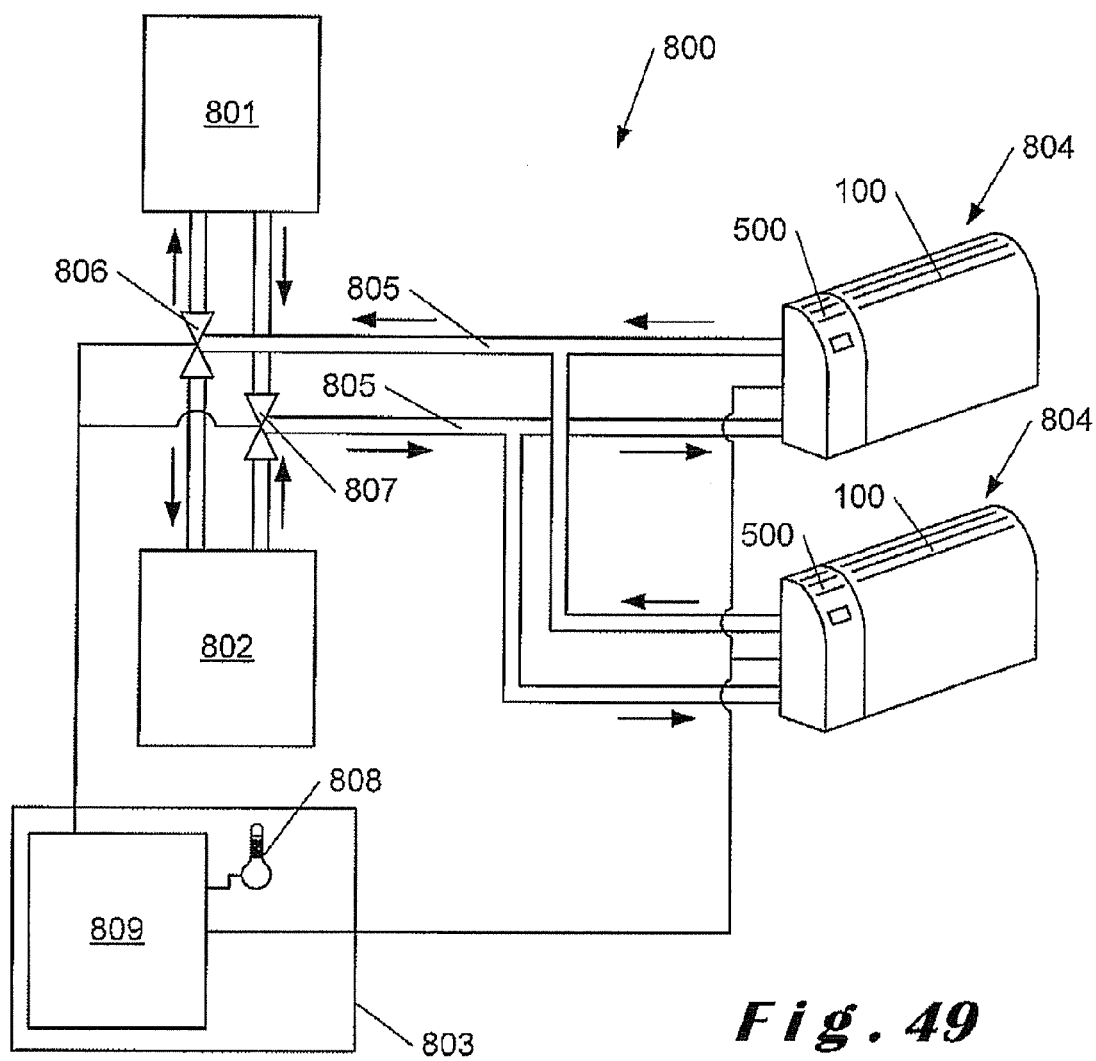
FIG. 49 shows a central heating- and cooling installation according to the second aspect of the invention.

FIG. 49 shows a central heating- and cooling installation 800 according to the invention. This comprises a central heating unit 801 for heating a fluid, a central cooling unit 802 for cooling a fluid, a selection mechanism 803 for switching on the central heating unit or the central cooling unit, a number of heat exchange systems 804 in a number of rooms of the building, and ducts 805 extending from the central units 801, 802 to the heat exchange systems 804 and provided for supplying the fluid from the central units to the heat exchange systems and vice versa. In the embodiment shown, the central heating unit 801 and the central cooling unit 802 are placed in parallel, valves 806, 807 being provided for directing the fluid flow through the heating unit 801 or the cooling unit 802. Alternatively, the heating unit and the cooling unit may also be placed in series with each other.

By providing the central heat exchange installation with the central heating and cooling units, the whole installation can be used for both heating in the winter and cooling or air conditioning in the summer.

The selection mechanism comprises a temperature sensor 808 mounted outside and connected to a central control unit 809 which switches on the central heating unit 801 or the central cooling unit 802 on the basis of the temperature measured by the sensor 808. In this way the operation of the central heating installation 800 can be controlled efficiently and can be automatically switched to cooling/heating on the basis of the outside temperature. Preferably a margin is set between the switching points from heating to cooling and vice versa, which means that for example upon switching to cooling the outside temperature has to drop a few degrees before the installation is switched back to heating, in order to avoid too frequent switching of the installation. For example, two suitable switching points are 18° C. and 25° C.

Each heat exchange system 804 in each room is preferably provided with its own control unit with sensors, so that the temperature in each room can be controlled separately. The desired room temperature can be set in each room by the user, for example by means of a digital control in steps of half a degree at the control unit of the heat exchange system 804 or by means of a remote control. The control unit controls the supply of hot or cold water to the heat exchange unit and the speed of the ventilator. The control unit is programmed to achieve the highest possible efficiency with the least possible energy consumption, both electrically for the ventilator and thermally for the heat exchange unit. During cooling the difference between the room temperature and the outside temperature is preferably limited to 6° C. to avoid thermoshock. The central selection mechanism 803 sends a signal to the various heat exchange systems 804 to indicate cooling or heating. During cooling also the outside temperature is passed on.

Each heat exchange system 804 in each room is preferably provided with an air humidifying unit. This is preferably controlled by the control unit, so that the humidity is controlled automatically without user interference. In this way the control unit can set an optimal humidification in the room depending on the measured temperature and humidity.

The invention claimed is:

1. A modular heat exchange system for use in central heat exchange installations in buildings, comprising
    at least one heat exchange element equipped for exchanging heat between environmental air and a fluid which is conducted through the heat exchange element, said heat exchange element having a predetermined first shape with opposite lateral sides,
    at least one non-heat-exchange add-on element, equipped for adding a given additional functionality to the system, having a predetermined second shape with a complementary lateral side to one of the opposite lateral sides of the heat exchange element, such that when the heat exchange element and the add-on element are fixed adjacent each other with one of said opposite lateral sides and said complementary side facing each other, the first shape of the heat exchange element continues into the second shape of the add-on element;
    said heat exchange element includes a technical part for conducting said fluid, said technical part comprising a front member of a non-heat conductive material, a back member of a heat conductive material and a sealing in between the front and back members for making the technical part substantially fluid-tight;
    said back member comprises a flat base having one side for contacting said fluid and an opposite side provided with a plurality of upstanding fins spaced at regular distances from each other for exchanging heat with said air;
    a wall mount which is adapted for being fixed to a wall and for holding said technical part, said wall mount being constructed in a non-heat conductive material and comprising a layer of soft material for engaging the upstanding fins of the technical part; and
    wherein one of said at least one non-heat-exchange add-on elements comprises a light unit.

2. A modular heat exchange system according to claim 1, wherein registering means are provided on said one of said opposite lateral sides and said complementary side.

3. A modular heat exchange system according to claim 1, wherein said front member comprises fluid conducting ribs forming conduits in between them for conducting said fluid along a single flow path from an inlet of the technical part to an outlet of the technical part, said conduits being open towards said back member for enabling contact between said fluid and said back member, wherein the conduits which are nearest to the outlet in the flow direction are located at the periphery of the technical part.

4. A modular heat exchange system according to claim 3, wherein said ribs have a concave top face, in which a sealing is applied for preventing fluid communication between the conduits other than said single flow path from inlet to outlet.

5. A modular heat exchange system according to claim 1, wherein said fins have substantially parallel corrugated shapes.

6. A modular heat exchange system according to claim 1, further comprising a cover adapted to be mounted over said at least one heat exchange element.

7. A modular heat exchange system according to claim 6, wherein said cover comprises a cap part with openings for conducting said air, said cap part being adapted for opening or removal from said cover.

8. A modular heat exchange system according to claim 7, wherein said cap part is locked in a closed position on said cover by means of locking members at opposite ends of said cap part.

9. A modular heat exchange system according to claim 6, wherein the system comprises a plurality of interchangeable covers.

10. A modular heat exchange system according to claim 1, said heat exchange element comprising a ventilator at a bottom side for drawing air into said heat exchange element.

11. A modular heat exchange system according to claim 1, wherein one of said at least one non-heat-exchange add-on elements comprises a control unit.

12. A modular heat exchange system according to claim 1, wherein one of said at least one non-heat-exchange add-on elements comprises a water evaporating unit.

13. A modular heat exchange system according to claim 1, wherein the add-on elements each comprise a frame and a front plate, the frame being the same for all add-on elements.

\* \* \* \* \*